(12) United States Patent  
Conroy et al.

(10) Patent No.: US 7,393,623 B2
(45) Date of Patent: Jul. 1, 2008

(54) INCORPORATION OF MARKINGS IN OPTICAL MEDIA

(75) Inventors: Jeffrey L Conroy, Rumford, RI (US); Robert S Afzal, Providence, RI (US); Allison Berube, Somerset, MA (US); Nabil M Lawandy, N. Kingstown, RI (US); Dana Lewis, North Kingstown, RI (US); Thomas Pizzuti, Providence, RI (US); Andrei Smuk, Providence, RI (US)

(73) Assignee: Spectra Systems Corporation, Providence, RI (US)

( * ) Notice: Subject to any disclaimer, the term of this patent is extended or adjusted under 35 U.S.C. 154(b) by 103 days.

(21) Appl. No.: 10/702,530

(22) Filed: Nov. 5, 2003

(65) Prior Publication Data

US 2004/0121268 A1 Jun. 24, 2004

Related U.S. Application Data

(63) Continuation-in-part of application No. 10/165,273, filed on Jun. 6, 2002.

(60) Provisional application No. 60/489,945, filed on Jul. 22, 2003, provisional application No. 60/423,888, filed on Nov. 5, 2002, provisional application No. 60/435,647, filed on Dec. 20, 2002, provisional application No. 60/311,160, filed on Aug. 9, 2001, provisional application No. 60/310,914, filed on Aug. 8, 2001, provisional application No. 60/296,308, filed on Jun. 6, 2001.

(51) Int. Cl.
G03F 7/00 (2006.01)
G03F 7/004 (2006.01)

(52) U.S. Cl. .................. 430/270.1; 430/280.1; 430/321
(58) Field of Classification Search .............. 430/270.1, 430/302, 280.1, 321; 235/435
See application file for complete search history.

(56) References Cited

U.S. PATENT DOCUMENTS 3,513,320 A 5/1970 Weldon ...................... 250/219

(Continued)

FOREIGN PATENT DOCUMENTS

EP 0 290 750 B1 1/1994

(Continued)

OTHER PUBLICATIONS

Sonny Jonsson et al., "Secrets of the Dark", Fusion UV Systems, Inc., 4 pgs.

(Continued)

*Primary Examiner*—Amanda Walke
(74) *Attorney, Agent, or Firm*—Harrington & Smith, PC

(57) ABSTRACT

Optical media having markings that are non-interfering, or substantially non-interfering with readout of data from the optical media are disclosed. The optical media make use of certain formulations of color forming coatings described herein. Protective coatings used to enhance the color forming coatings are also presented. Methods for incorporating the coatings into the optical media are included. In preferred embodiments, the marking is formed in a photosensitive coating that is applied to the optical media, and then cured with a first light. A second light, having a substantially separate band of wavelengths from the first light, is used to image a marking into the coating. The coating is robust to many external influences, such as ambient environmental conditions, and physical wear.

48 Claims, 45 Drawing Sheets

U.S. PATENT DOCUMENTS

| | | | | |
|---|---|---|---|---|
| 3,666,466 | A | 5/1972 | Strilko | 430/333 |
| 4,102,893 | A | 7/1978 | Garner et al. | 260/326 |
| 4,343,885 | A | 8/1982 | Reardon, Jr. | 430/270.1 |
| 4,483,884 | A | 11/1984 | Troue | 427/492 |
| 4,485,123 | A | 11/1984 | Troue | 427/54.1 |
| 4,552,830 | A | 11/1985 | Reardon et al. | 430/281.1 |
| 4,582,346 | A | 4/1986 | Caprio et al. | 283/94 |
| 4,659,649 | A | 4/1987 | Dickinson et al. | 430/280.1 |
| 5,024,898 | A | 6/1991 | Pitts et al. | 428/511 |
| 5,028,792 | A | 7/1991 | Mullis | 250/474.1 |
| 5,171,040 | A | 12/1992 | Orndorff | 283/93 |
| 5,223,358 | A | 6/1993 | Yamada et al. | 430/18 |
| 5,267,755 | A | 12/1993 | Yamauchi et al. | 238/86 |
| 5,270,368 | A | 12/1993 | Lent et al. | 524/236 |
| 5,297,815 | A | 3/1994 | Anderson et al. | 283/93 |
| 5,306,746 | A * | 4/1994 | Ida et al. | 523/206 |
| 5,436,115 | A | 7/1995 | Mullis | 430/338 |
| 5,489,768 | A | 2/1996 | Brownstein et al. | 235/462.01 |
| 5,510,160 | A | 4/1996 | Jadamus et al. | 428/36.91 |
| 5,510,163 | A | 4/1996 | Sullivan et al. | 428/64.1 |
| 5,549,953 | A | 8/1996 | Li | 428/64.1 |
| 5,607,188 | A | 3/1997 | Bahns et al. | 283/113 |
| 5,608,718 | A | 3/1997 | Schiewe | 369/275.4 |
| 5,609,990 | A * | 3/1997 | Ha et al. | 430/270.11 |
| 5,631,118 | A | 5/1997 | Gaudiana et al. | 430/270.1 |
| 5,761,301 | A * | 6/1998 | Oshima et al. | 705/57 |
| 5,815,484 | A | 9/1998 | Smith et al. | 369/275.1 |
| 5,885,746 | A | 3/1999 | Iwai et al. | 430/280.1 |
| 5,889,084 | A | 3/1999 | Roth | 523/161 |
| 5,981,638 | A * | 11/1999 | Ida et al. | 524/291 |
| 6,013,601 | A | 1/2000 | Gundjian | 503/201 |
| 6,037,984 | A | 3/2000 | Isnardi et al. | 375/240.21 |
| 6,051,298 | A | 4/2000 | Ko et al. | 428/64.1 |
| 6,120,902 | A | 9/2000 | Van Havenbergh et al. | 428/423.1 |
| 6,138,913 | A | 10/2000 | Cyr et al. | 235/468 |
| 6,140,267 | A | 10/2000 | Gundjian | 503/201 |
| 6,148,534 | A | 11/2000 | Li | 33/769 |
| 6,203,069 | B1 | 3/2001 | Outwater et al. | 283/88 |
| 6,219,329 | B1 | 4/2001 | Tanaka et al. | 369/275.1 |
| 6,226,109 | B1 | 5/2001 | Tompkin et al. | 359/2 |
| 6,240,230 | B1 * | 5/2001 | Szum | 385/100 |
| 6,243,480 | B1 | 6/2001 | Zhao et al. | 382/100 |
| 6,261,738 | B1 * | 7/2001 | Asakura et al. | 430/270.1 |
| 6,269,169 | B1 | 7/2001 | Funk et al. | 382/100 |
| 6,295,262 | B1 * | 9/2001 | Kusumoto et al. | 369/53.37 |
| 6,306,563 | B1 * | 10/2001 | Xu et al. | 430/321 |
| 6,309,794 | B1 * | 10/2001 | Hayashi et al. | 430/270.12 |
| 6,322,868 | B1 | 11/2001 | Bernstam | 428/64.1 |
| 6,338,933 | B1 | 1/2002 | Lawandy et al. | 430/270.1 |
| 6,343,138 | B1 | 1/2002 | Rhoads | 382/100 |
| 6,359,985 | B1 | 3/2002 | Koch et al. | 380/54 |
| 6,373,965 | B1 | 4/2002 | Liang | 382/112 |
| 6,423,478 | B1 | 7/2002 | Ha | 430/321 |
| 6,451,924 | B1 * | 9/2002 | Hahnfeld et al. | 525/338 |
| 6,500,601 | B1 | 12/2002 | Sculler et al. | 430/302 |
| 6,503,593 | B2 * | 1/2003 | Tronche et al. | 428/64.1 |
| 6,531,262 | B1 | 3/2003 | Lawandy et al. | 430/270.15 |
| 6,890,704 | B2 * | 5/2005 | Edwards | 430/321 |
| 2001/0037455 | A1 | 11/2001 | Lawandy et al. | 713/176 |

FOREIGN PATENT DOCUMENTS

| | | |
|---|---|---|
| EP | 0 908 875 A2 | 4/1999 |
| EP | 0 720 053 B1 | 9/2002 |
| JP | 362236867 A | 10/1987 |
| JP | 10106041 | 4/1998 |
| JP | 10334518 | 12/1998 |
| JP | 2000339767 | 12/2000 |
| WO | WO-99/65696 | 12/1999 |
| WO | WO-01/41056 A1 | 6/2001 |
| WO | WO-02/100914 | 12/2002 |
| WO | WO-02/101462 A1 | 12/2002 |

OTHER PUBLICATIONS

"UVT-UV Curing Systems-Why UV?; Quality; Economy" www.UVT.com/trendstips_UV.html, p. 1-1, Apr. 25, 2002.

"Unique Technology-Production-friendly", www.photosec.com/tech2,htm, p. 1-1, Apr. 25, 2002.

"Invisible Ink", www.techreview.com/articles/prototype 40302.asp. pp. 1-3, Apr. 25, 2002.

"SK6400 Sony Technical Data Sheet Liquid Adhesive", Sony Chemicals Corporation, www.sonychemicals.com.

"About UV Curing Technology" Primarc UV Technology, www.primarcuv.com/primarcuv/aboutuv.htm, p. 1, Apr. 25, 2002.

"Invisible Security" Beaver Luminescers U.V. Energized Light-Emitting Organic Compounds, www.luminescers.com/apps1.html. pp. 1-2, Apr. 25, 2002.

He Tian et al., "Positive and Negative Fluorescent Imaging Induced by Napthalimide Polymers", J. Mater. Chem., 2002, 12, 1262-1267.

"Features Common to All Currently Produced Headway Spinners", www.headwayresearch.com/products/machines.htm, pp. 1-3, Aug. 26, 2003.

"PMW32-PS-R790 Spinner System", www.headwayresearch.com/products/pwm32psr790.htm, pp. 1-3, Aug. 26, 2003.

"SA3 Advanced CD-RW Verify Your Rewritable Media", www.audiodev.com/default.asp, pp. 1-4.

* cited by examiner

PRIOR ART

PRIOR ART

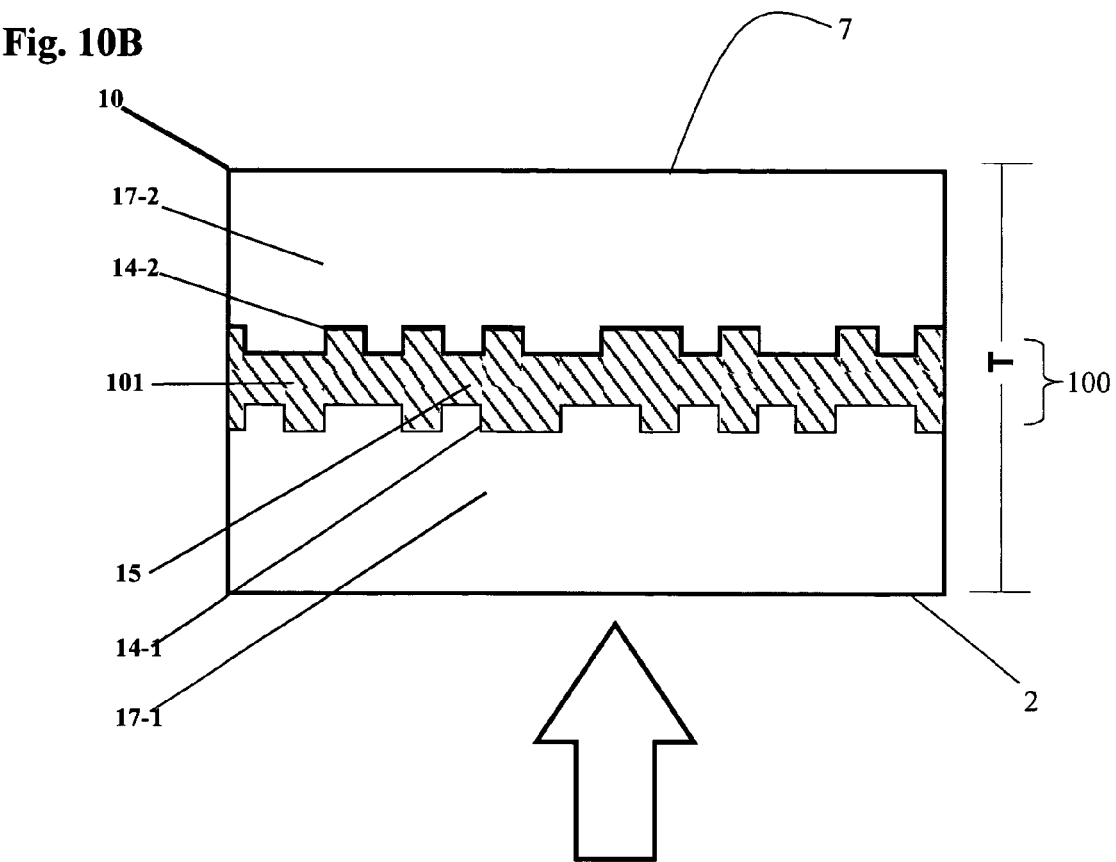

INCORPORATION OF MARKINGS IN OPTICAL MEDIA

CROSS REFERENCE TO RELATED APPLICATIONS

This patent application is filed under 35 U.S.C. §120 as a Continuation-In-Part of and claiming priority to co-pending U.S. patent application Ser. No. 10/165,273 filed Jun. 6, 2002; which in turn claims priority under 35 U.S.C. §119(e) to U.S. Provisional Application Ser. No. 60/296,308 filed Jun. 6, 2001, U.S. Provisional Application Ser. No. 60/310,914 filed Aug. 8, 2001, and U.S. Provisional Application Ser. No. 60/311,160 filed Aug. 9, 2001; this patent application further claiming priority under 35 U.S.C. §119(e) to U.S. Provisional Application Ser. No. 60/435,647 filed Dec. 20, 2002; U.S. Provisional Application Ser. No. 60/423,888 filed Nov. 5, 2002; and, U.S. Provisional Application Ser. No. 60/489,945 filed Jul. 22, 2003. The disclosures of these applications are incorporated by reference herein.

FIELD OF THE INVENTION

This invention relates to a method and apparatus for rapid production of high quality images in various components of optical media.

BACKGROUND OF THE INVENTION

Optical media, as typically used today, includes a variety of supplementary information that is in addition to the data recorded in the optical media. The supplementary information is frequently presented in elaborate form, consistent with the marketing, advertising or other goals of the manufacturer. The supplementary information may be included in various fashions, such as through the use of stick on labels, inks or through other techniques.

Labeling or markings are typically applied to the "non-read" side of a optical disc, such as a Compact Disc (CD) or a Digital Versatile Disc (DVD), for indicating information such as the source of the disc and a listing of the information recorded thereon. The placement of markings on the non-readout side of optical media permits the use of a variety of marking technologies, ranging from simple to complex. Placement of markings on the read-side of optical media, particularly in the area where data is recorded, is a greater challenge, as the markings can interfere with the use of the optical media.

Considering that approximately 1 billion DVDs and more than 4 billion CDs are produced annually (as estimated by the International Recording Media Association), the potential advertising space has been equated to 1 billion magazine advertising pages, 300 million newspaper advertising pages, or 3 million billboards. Accordingly, the value of incorporating markings into optical media, especially the currently unmarked readout side, is very high.

One example of a technique for marking an optical media is disclosed in the International Patent Application Publication No.: WO 99/65696, entitled "Permanent Image Formation," and published on 23 Dec. 1999. The application discloses a method and apparatus for forming a permanent image on a substrate including CD, DVD and packaging (particularly those formed from recycled polycarbonate and/or recycled PET). The application discloses that the printing process therein differs from the prior art in that ink is applied to a substantial portion of a substrate surface, instead of only in the image areas. One skilled in the art will recognize that, in the case of optical media, the ink is limited to providing for images on the non-readout area of the optical media. For example, since pigments used in the ink typically include particles, the ink would likely cause scatter of a readout light (laser), thus inhibiting readout of the data features. Further, the disclosed use of an infrared (IR) laser to impart the image implies the ink would interfere with a normal data readout process since CD and DVD media use near-IR lasers in the readout mechanism.

Prior attempts to place markings on the read side have been made. Reference may be had to U.S. Patents directed towards optical storage systems. For example, U.S. Pat. No. 5,549,953, entitled "Optical Recording Media Having Optically-Variable Security Properties" by Li Li, issued Aug. 27, 1996, discloses a technique to prevent counterfeiting of various substrates through introducing thin film structures having optically variable security properties and encoded optical data. Another U.S. Pat. No. 5,510,160, entitled "Optical Storage Media Having Visible Logos", by Sullivan, et al., issued on Apr. 23, 1996. This patent also discloses a technique to prevent counterfeiting of optical storage media, specifically through producing a visible logo on the read side of the substrate. Although these patents provide for incorporation of markings that may have certain advantages, any advantages are limited. That is, for example, the markings are visible only under certain conditions, and complicated or expensive manufacturing processes are called for to produce finished product. Furthermore, the degree of control, or complexity of the marking may be less than desired for effective advertising or other information bearing schemes.

Other examples involving a coating applied to an optical media can be found in U.S. Pat. No. 6,051,298 "Optical Disc Having Protective Films." This patent discloses an optical disc having a protective film, the film having good transmissivity and high hardness against abrasion, and in U.S. Pat. No. 6,322,868 B1 "Use and Manufacturing Applications of Polymer/Dye-Based Thin Layer Coatings for Enhancement of the Quality of Recording On and Readout From the Optical Storage Media," which discloses use of a thin layer coating for the improvement of the quality of the encoded digital information. Another example includes U.S. Pat. No. 6,338,933 "Methods and Apparatus for Rendering an Optically Encoded Medium Unreadable." This patent discloses including optically activated materials to degrade the reflectivity of a surface.

However, the foregoing patents have not taken advantage of certain advances in materials. For example, reference may be had to International Patent Publication No.: WO 02/101462 A1 "Laser Marking Method" published on 19 Dec. 2002, applied for by Ciba Specialty Chemicals Holding Inc. This publication discloses a method of coloring a polymeric material containing a latent acid, a color former, and optionally further ingredients by irradiation with UV-light. Another International Patent Publication No.: WO 02/100914 A2, applied for by Ciba Specialty Chemicals Holding Inc., is entitled "Polymeric Material, Containing a Latent Acid." This publication discloses a polymeric material containing a latent acid which can be converted to an acid by irradiation by a laser and optionally further ingredients. Another example is disclosed in U.S. Pat. No. 5,028,792 "System for the Visualization of Exposure to Ultraviolet Radiation," issued Jul. 2, 1991 to Mullis. This patent discloses photochemical systems for the direct visualization of exposure to ultraviolet radiation, in which a photoacid is formed upon irradiation with ultraviolet light and causes a dye to undergo a visible color change.

Further patents disclose compounds and techniques for applying colorforming materials as a coating. Consider, for example, U.S. Pat. No. 6,013,601, "Laser Printing Method and Substrate" issued Jan. 11, 2000; and the Continuation thereof, U.S. Pat. No. 6,140,267, issued Oct. 31, 2000. These patents disclose a method and a substrate for printing information wherein at least one coating is applied to a substrate, the coating containing photosensitive colorforming components. When heated with a laser beam, a chromic change occurs in the at least one coating thereby providing for the printing of information.

Patents disclosing colorforming coatings include U.S. Pat. No. 4,552,830, entitled "Carbonylic Halides as Activators for Phototropic Compositions", issued Nov. 12, 1985 to Reardon et al. and U.S. Pat. No. 4,343,885, entitled "Phototropic Photosensitive Compositions Containing Fluoran Colorformer", issued Aug. 10, 1982 to Reardon. Both patents disclose compositions useful for the production of photoresist films for the electronics industry. These compositions are disclosed as containing a polymerizable, crosslinkable or curable component with a photoinitiator, a colorformer, and an activator; where the composition becomes insoluble and change color under the influence of actinic radiation.

It is known to apply radiation sensitive coatings to objects for the visualization of exposure to radiation. Refer to U.S. Pat. No. 5,436,115, entitled "Systems for the Visualization of Exposure to Ultraviolet Radiation," issued Jul. 25, 1995. Likewise, invisible fluorescent images may be developed using similar technology and acid sensitive fluorescent dyes, such as those reported in "Positive and Negative Fluorescent Imaging Induced by Naphthalimide Polymers" by He Tian, Jiaan Gan, Kongchang Chen, Jun He, Qun Liang Songb and XiaoYuan Houb, Journal of Materials Chemistry 2002, 12, 1262-1267.

One further example is disclosed in U.S. Pat. No. 5,885, 746 "Photosensitive Resin Composition, Photosensitive Printing Plate Using the Same and Method of Manufacturing Printing Master Plate," issued Mar. 23, 1999 to Iwai, et al. This patent discloses a photosensitive resin composition comprising a high polymer binder, a monomer, a photopolymerization initiator generating a radical on exposure to visible light, and an optically activated acid generating agent, generating an acid on exposure to wavelengths of 200 nm to 380 nm, with a color former developing color in the presence of an acid. Among other things, this patent discloses use of dispersing agents, which indicate inhomogeneity, a property that would cause laser scatter in an optical media readout system. Also, the initiators disclosed in this patent are sensitive to visible light and require the use of an oxygen barrier layer to affect adequate curing. Use of an oxygen barrier layer is a substantial hindrance to the application of these materials to quantities of optical disc, as manufacturing environments do not typically provide for a dark and/or oxygen free environment. Further such additional steps present economic and production burdens that would serve to limit use of the marking system.

Non-limiting examples of existing embodiments of optical media (prior art) are provided in FIGS. 1-8. In FIG. 1, a prior art optical media 8 is depicted as a compact disc (CD). The CD 8 includes a substrate 17 (typically formed of polycarbonate), a metallized layer 14 (also referred to as a reflecting layer 14), and a protective layer 12. A label is disposed on a label side 7, over the protective layer 12, which is typically formed of a UV curable acrylic. A readout light (as depicted by the upward pointed arrow) penetrates the readout side 2 to provide a readout signal for interpreting data features known as-pits 5 and lands 6. Aspects of other embodiments of optical media 8 are presented in FIGS. 2-8.

Other formats of optical media 8 are presented in order to illustrate variations in architecture. FIG. 2 depicts an optical media 8 as a single sided/single layer embodiment of a Digital Versatile Disc (DVD). In general, DVD 8 includes substrate layers 17, reflective layers 14, and a bonding layer 15. The structure shown in FIG. 2 correlates to aspects of optical media 8 commonly referred to as "DVD-5." FIG. 3 depicts another embodiment of a prior art optical media 8, where a single sided/dual layer embodiment of a DVD is shown. In this embodiment, the reflective layer 14 includes a semi-reflective layer 14-1 and a substantially reflective layer 14-2. The substrate layer 17 includes a first substrate layer 17-1, and a second substrate layer 17-2. This structure correlates to aspects of optical media 8 commonly referred to as "DVD-9." In this embodiment, two layers of data features are provided on the one side of the DVD 8. Other examples of prior art optical media 8 include a dual sided/single layer DVD, as shown in FIG. 4. This structure correlates to aspects of optical media 8 commonly referred to as "DVD-10." A dual sided/dual layer embodiment of a DVD 8 is shown in FIG. 5. This structure correlates to aspects of optical media 8 commonly referred to as "DVD-18." This embodiment of a DVD includes two sides, each with a dual layer format. Both layers of each side are manufactured on a single polycarbonate substrate layer 17, and subsequently bonded together at the bonding layer 15. DVD-18 has the largest capacity of the family but is the most difficult and complex to manufacture. A unique stamper is needed to create each of the four substrate layers 17. DVD-14 is a related format in which only one half of the disc 8 is a dual layer disc 8. This format contains approximately 14 gigabytes of data. DVD-14 is slightly easier to manufacture than a DVD-18, since one side is a DVD-5. Further examples of optical media 8 include a hybrid SACD, as shown in FIG. 6; a hybrid DVD, as shown in FIG. 7; and, a DVD Plus, as shown in FIG. 8.

Combination disc formats, for example combining DVD-ROM on one side with DVD-RAM on the other, are known. Such discs 8 are double sided discs and are read from both sides. Hybrid SACD is a format developed by Philips and Sony and combines a SACD (i.e., physically a DVD layer) with a CD layer. Both layers are read from the same side, which means that the SACD layer must be reflective for a red laser but will transmit an infra red CD laser. Such discs can be played on both a CD player (which will read the CD layer) and a SACD player.

Hybrid DVD is a similar format to the hybrid SACD with a conventional DVD data layer over a CD data layer. DVD Plus refers to a disc comprising a CD bonded to a DVD substrate. The resulting disc allows both DVD and CD data to be read from one disc, like a hybrid DVD, but the disc is read from both sides. Neither format is commonly available as yet.

Each format of optical media 8 is described by certain specifications. For example, for the CD shown in FIG. 1, the specification thickness for the substrate layer 17 is 1.2 mm, while the pits 5 are separated by about 125 nm from the lands 6. In DVD, as shown in FIGS. 2-5, the substrate layers 17 are typically 0.6 mm thick.

This cursory examination of these popular (but few) embodiments of optical media 8 serves to point out that a variety of layers exist within the various formats for optical media 8. These layers each contain a certain amount of material selected for providing certain properties, such as clarity and rigidity. One skilled in the art can surmise that the various layers may be constructed of an assortment of materials, while providing for the functionality of the optical media 8.

The assortment of materials is typically limited by such criteria as for light transmission at a given wavelength, viscosity during application, and other optical properties. Understandably, materials are frequently in development to improve the performance of optical media 8.

Examples of recently developed disc-molding materials include PLEXIGLAS VOD-100 produced by Elf Atochem of North America Inc., Philadelphia, Pa. which is a grade of acrylic thermoplastic specially designed for optical disc manufacturing; a similar material is ACRYLITE DQ501 from CYRO Industries, Rockaway, N.J.; another product is Polycyclohexylethylene (PCHE), from Dow Plastics, Midland, Mich., which is a saturated cyclic hydrocarbon that is derived from styrene monomer, and said to have exceptional optical purity and clarity, with a refractive index of 1.51 and high light transmittance across the full spectrum, including the blue-green range. Further non-limiting examples of disc-molding materials are LEXAN products from General Electric of Pittsfield, Mass., which include models OQ1040L, OQ1050 and OQ1030L.

The wide use of optical media 8 call for advanced marking schemes. This need is growing rapidly with changes in optical media technology and growing demand. For example, the advent of dual sided optical media 8 necessitates the development of a marking scheme that does not interfere, or substantially interfere, with a readout laser.

Such a scheme should provide enhanced marking, identification, authentication and encoding capabilities for optical media. The scheme should provide for rapid production of images, text, or other optically encoded information on the label and/or read side of the optical media. Furthermore, the scheme should further provide for markings that are robust and durable in environments where optical media may be used.

SUMMARY OF THE INVENTION

The foregoing and other problems are overcome by methods and apparatus disclosed herein and in accordance with embodiments of this invention.

Method and apparatus for imparting images upon the readout and/or non-readout side of optical media such as CDs and DVDs are disclosed. Aspects of the invention include, but are not limited to: applying certain materials as a coating, or coatings, onto an optical media; curing the coatings, preferably with a first light, such as long wave ultraviolet (UV) light; addressing each of the coatings with certain wavelengths of a second light, such as short wave UV; and using selective exposure of the coatings to the certain wavelengths of second light to record an image in the collective appearance of the coatings. The preferred use of separate bands of UV light for the curing and imaging steps ensures that the techniques provide for a marking that is non-interfering with data read out, since most current and future optical disc formats utilize IR, NIR, or visible wavelengths for laser readout, and since UV curable materials are used in most of these formats. Accordingly, it is preferred that curing and imaging wavelengths make use of wavelengths in the UV region of the spectrum.

Aspects of the invention include application of the coating, (or coatings), upon the read side or the non-read side of the optical media. Further aspects of the invention include application of a gray scale, single-color or multi-color image, (referred to as a "marking"), formed in the collective appearance of the coatings. The coatings and the markings do not interfere, or substantially interfere, with the use of the optical media. For example, the coatings and the markings are transmissive, or substantially transmissive of wavelengths of interest, such as the wavelengths used by a readout laser for the optical media.

Aspects of the invention may further include, but are not limited to, the use of coatings that absorb or reflect light at predetermined wavelengths, the use of multiple markings, and the use of the markings as security measures. Further aspects of the invention include providing for the use of the read side of the optical media for marking with advertising, branding, and other markings normally associated with the non-readout side of the media.

Disclosed herein is an optical media having at least one layer that includes a formulation formed of at least one set of photosensitive color forming materials, wherein the at least one set of photosensitive color forming materials is adapted for forming at least one marking upon exposure to a source of marking light; wherein, upon formation, the at least one marking is apparent in at least a readout area of the optical media and substantially non-interfering with a readout light for the optical media.

Also disclosed is an optical media having a first layer formed of photosensitive color forming materials for forming a marking in response to illumination with a marking light, and a second layer disposed over the first layer and comprised of a material absorptive of the marking light; wherein, the marking is apparent in at least a readout area of the optical media and is substantially non-interfering with a readout light for the optical media.

Further, an optical media having at least one layer is disclosed, and includes at least one set of photosensitive color forming materials, wherein the at least one set of photosensitive color forming materials exhibits at least one marking in a readout area of the optical media that is substantially non-interfering with a readout light for the optical media.

A method for producing an optical media, is disclosed and includes selecting a formulation having at least one set of photosensitive color forming materials, wherein the at least one set of photosensitive color forming materials is adapted for forming at least one marking upon exposure to a source of marking light, wherein the at least one marking, upon formation, appears in at least a readout area of the optical media and is substantially non-interfering with a readout light for the optical media; and, applying the formulation in at least a portion of at least one layer of the optical media.

Further disclosed is an optical media having at least one first layer formed of about 0.3 weight percent of a polyether modified poly-dimethyl-siloxane; about 10 weight percent of a stable liquid mixture of trimethylbenzoyldiphenylphosphine oxide, α-hydroxyketones, and benzophenone derivatives; about 10 weight percent of a 1,6 hexanediol diacrylate; about 15 weight percent of tetrahydrofurfuryl acrylate; about 32.35 weight percent of ethoxylated (4) pentaerythritol tetraacrylate; about 32.35 weight percent of a highly propoxylated (5.5) glyceryl triacrylate; about 3 weight percent of triphenylsulfonium triflate and a color former having a wavelength absorbance peak of about 540 nm.

Another optical media disclosed herein has a protective layer formed of a formulation having of at least one set of photosensitive color forming materials, wherein the at least one set of color forming materials is adapted for forming at least one marking upon exposure to a source of marking light; wherein, upon formation, the at least one marking is apparent in the optical media.

Another optical media disclosed herein has a bonding layer formed of a formulation having at least one set of photosensitive color forming materials, wherein the at least one set of color forming materials is adapted for forming at least one marking upon exposure to a source of marking light; wherein, upon formation, the at least one marking is apparent in the optical media.

BRIEF DESCRIPTION OF THE DRAWINGS

The above set forth and other features of the invention are made more apparent in the ensuing Detailed Description of the Invention when read in conjunction with the attached Drawings, wherein:

FIGS. 10A-E, collectively referred to as FIG. 10, depicts exemplary embodiments of target layers in a DVD;

DETAILED DESCRIPTION OF THE INVENTION

Figure 1:
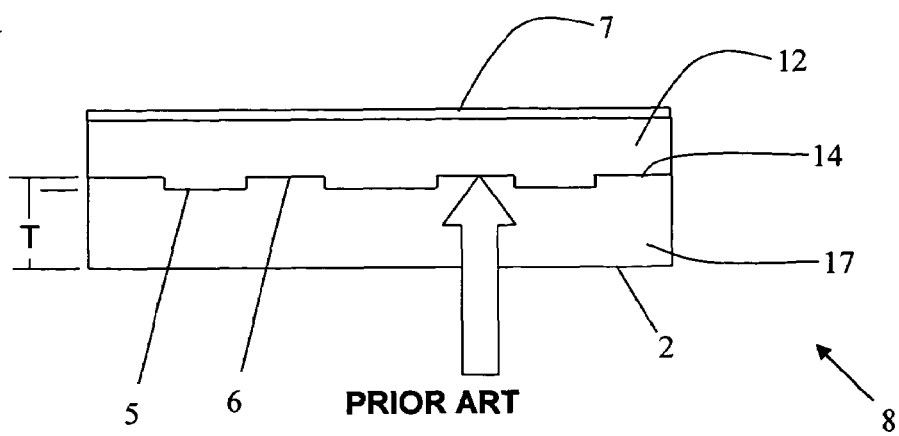
FIG. 1 depicts aspects of a prior art optical media known as a compact disc.

The teachings herein describe optical media including a coating, or a series of coatings, incorporated for retention of at least one gray scale, single color or a multi-color marking into the readout area of the optical media, without interference, or substantial interference with the functionality of the optical media. Aspects of the invention include, but are not limited to: applying certain materials as a coating, or coatings, onto an optical media; curing the coatings, preferably with a first light, such as ultraviolet (UV) light; addressing each of the coatings with certain wavelengths of a second light, such as UV, and using selective exposure of the coatings to the certain wavelengths of second light to record an image in the collective appearance of the coatings.

The disclosure herein is presented in the following sections:

I. Introduction

II. Coating for Optical Media
   A. Single Coating Development
     1. General Formulation
     2. Photoacid Generator Screenings
     3. Considerations for Curing
     4. Oxygen Inhibition
     5. Colors and Imaging
     6. Environmental Influence
     7. Triethyl Amine Fading Study
     8. Accelerated Light Testing
     9. Photoacid Generators Reexamined
     10. Absorbance Spectra of Photoacid Generators and Films
     11. Photoacid Generator Screening For Imaging Speed
     12. Color Enhancing Additives
     13. Spin Coating, Film Thickness and Optical Density.
   B. Multiple Coating Development
     1. Color Coating and Overcoat Development
     2. Initial Testing
     3. Environmental Testing
     4. Adjustments to two coating formulations
     5. Amine Testing
     6. Quantitative Study
     7. Physical properties of the coatings
     8. Viscosity vs. Temperature
     9. Viscosity vs. Shear Rate
     10. Color formation with various lamps.
     11. Photoacid Generator to Color Former Ratio
     12. Lamp Effects
     13. Overcoating: Light Fastness of the Overcoat with Various UV Absorbers
   C. Embodiments of Coatings on Optical Media
     1. Two Layer Coating
     2. Multiple Layer Coating
     3. Multi-Color Disc
     4. Considerations for Use of Coatings in Existing Formats III. Forming a Marking
   A. Curing the Coating
   B. Equipment for Forming a Marking
   C. Types of Markings IV. Coating Inspection
   A. Exemplary Inspection Equipment
   B. Coating Parameters and Radial Noise Study
   C. Inspection Techniques V. Further Embodiments
   A. Direct Incorporation of a Formulation in a Target Layer
   I. Introduction While the teachings herein are described in the context of the presently preferred embodiments, that is, in the context of exemplary embodiments of certain optical media, it should be understood that these teachings may be directed to any optical media that is supportive to the receipt of formulations disclosed herein, and to subsequent exposure to appropriate energy sources. The nature of the at least one marking or image is dependent upon a variety of factors, including but not limited to, needs of the user, composition of the materials in each layer, requirements for functionality of the optical media, and others.

"Optical media" are referred to herein in general terms, as "CD" or "DVD", however, it is considered that existing formats for optical media 8 are presently available, or in development. For example, the many formats of optical media 8 include: DVD 5, DVD 9, DVD 10, DVD 14, DVD 18, DVD-R, DVD-RW, CD-Audio, CD-Video, CD-R, CD-RW, CD-ROM, CD-ROM/XA, CD-i, CD-Extra, CD-Photo, Super-Audio CD, Blu-Ray, Mini-Disc any hybrid of the foregoing, and others. Examples of further formats or structures for optical media include those disclosed in U.S. Pat. No. 5,452,282 and the Continuation-in-part thereof, U.S. Pat. No. 6,011,767, entitled "Optical Data Storage Disc" as well as U.S. Pat. No. 6,160,789, entitled "Optical Data Storage Disc with a Visible Holographic Image and Method for its Manufacture." The foregoing list should therefore only be considered illustrative of the variety of optical media 8 that may support or benefit from the use of the teachings herein, and is therefore neither exhaustive or limiting.

Figure 9:
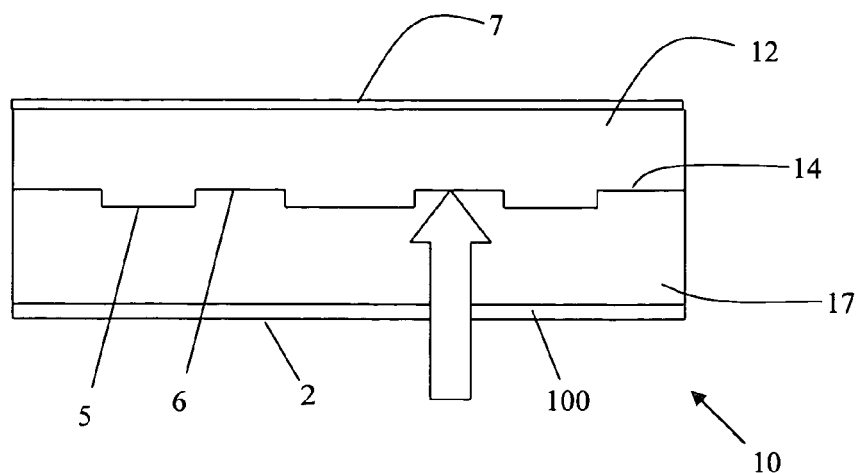
FIG. 9 depicts an optical media having a coating.

Further, certain modifications to these formats may be realized, while not being recognized as a particular "format." For example, in the embodiment of FIG. 9, a coating 100 is applied to a prior art optical media 8, such as a CD, to produce a coated optical media 10. The optical media 10 contains layers as are contained in prior art optical media 8. For example, in this embodiment, the optical media 10 contains the CD substrate layer 17 (also referred to as a "polycarbonate layer"), a metallized layer 14 and a protective layer 12. The addition of the coating 100 presents a modification to the manufacturer's specification for the format for the optical media 8. More specifically, and by way of example, it is realized that the additional coating 100 increases the thickness of the optical media 8. However, the increased thickness, although a modification to the specification for the format (in this case a CD), does not interfere, or substantially interfere, with the functionality of the optical media 10. As such, it is considered that the addition of the coating 100 is a permissible modification or an insubstantial deviation from the architecture for the format. In cases where the thickness of coating 100 would cause a deviation from the specification for thickness of the optical media 10, various compensation techniques may be used. In one embodiment, the thickness of the CD substrate layer 17 is reduced during the molding process to account for addition of the coating 100, and produce a disc 10 which remains in specification.

It is also recognized that a particular format may be characterized by structures (a physical design) that are common to other formats. The teachings herein are not limited to a particular design for an optical media 8. Therefore, the layers or components of a given format are occasionally referred to herein in generic terms. These terms include designations such as, "layer" "structure" and "component." Further, in some instances, a particular layer may be referred to in more specific terms.

As used herein, the term "formulation" generally means the composition of materials applied to an optical media for purposes of forming a visually perceptible contrast within areas of the optical media, thus forming a marking. The formulation may contain materials that are referred to as "color forming," although some embodiments may use color subtractive processes for creating an image. Other embodiments produce images that only appear within the gray scale. Therefore, these materials may also be referred to as "contrast forming." The terms "color forming" and "contrast forming" are therefore interchangeable herein, and refer to the ability of a formulation to form a visually perceptible marking.

Preferably, at least one formulation of at least one energy sensitive color forming material is applied to an optical media 10. The formulation is applied as an integral part of the structure within the optical media 10. In preferred embodiments, the substrate layer 17 that typically appears in an optical media 8 (and it typically formed of polycarbonate) is targeted for addition of the formulation. Other layers may be targeted for replacement or augmentation with a formulation according to aspects as disclosed herein. Given the variety of formats for optical media 8, the term "target layer" is used generally to refer to any layer within an optical media 8 that is, or may be, replaced or augmented by the incorporation of a formulation as disclosed herein.

Accordingly, it is considered that reference herein to conventional designations for layers (e.g., a substrate layer 17, and an acrylic layer 12) within an optical media 8 may be confusing and, in some instances, inadequate for explanation. Therefore, the discussion herein may present some embodiments strictly in terms of "target layers," rather than by way of the conventional designation.

Although a formulation is said to be used "in" a target layer, the formulation may actually be layered in the target layer, used in place of materials conventionally used in a target layer, or in conjunction with the materials conventionally used in a target layer. That is, in this latter example, the formulation may replace a portion of the target layer, or be mixed with materials used in the target layer.

A number of factors may govern the composition and/or use of a formulation in any given target layer. For example, the design criteria for a specific structure of an optical media 8 may dictate certain thickness, clarity or hardness requirements. Other factors may include the operational wavelength for the readout laser. Commonly used readout light wavelengths for optical media 8 include 408 nm, 440 nm, 630 nm, 650 nm, and 780 nm, while other readout wavelengths are possible.

The terms "wavelengths of light" and "wavelength" refer to appropriate wavelengths used for performance of a technique, or to achieve an effect. For example, long wave or short wave ultraviolet (UV) may be used to cure a target layer, to create a marking in a target layer, or to view a marking. In general, wavelengths of light include bands or sets of wavelengths, which may be referred to as one of: UV-A, UV-B, UV-C, UV, visible (VIS), near infrared (NIR), infrared (IR) and longwave infrared (LIR). Further classifications may be applied. As used herein, the terms "wavelengths", "wavelengths of light", "bands of wavelengths", "sets of wavelengths" and "energy source" may include any appropriate form of actinic radiation where that form is useful for achieving the desired affect. The wavelength chosen for a specific purpose is dependent upon various factors such as, and not limited to, the composition of the formulation and the being non-interfering with the laser readout of the optical media. It should be understood that although certain preferred formulations are disclosed herein, with use of a specific wavelengths of UV, one may select wavelength as appropriate to achieve an intended purpose, while remaining within the teachings herein.

Curing of a target layer is typically achieved using a first set of wavelengths of light. However, use of a first light is not limiting. For example, application of a formulation by way of compounding techniques may simply require adequate cooling of the target layer to provide for setting the formulation materials in the target layer. Preferably, in this embodiment, the formulation is cooled to an ambient temperature.

The energy source used to form a marking may include any wavelength of light or combination of wavelengths of light deemed appropriate to form an image in the target layer. In some embodiments, a particle beam (e.g., an e-beam) may be used as the energy source.

Optical changes (e.g., color formation) are initiated in a target layer through the selective and controlled exposure to wavelengths of light, preferably UV wavelengths which are non-interfering with laser readout. A formulation may be used in a single target layer or multiple target layers may be used. Where multiple target layers are used, each one may be sensitive to the same or a different energy source. Each color forming target layer contains at least one formulation. Selective or controlled exposure is typically achieved using known techniques. Examples include the use of a positive or negative photomask, a direct writing laser, or an electronic photomask (such as an LCD display).

In some embodiments, a color forming formulation is used within at least one target layer of the optical media, where the color forming layer provides for development, or dissipation, of a primary color. In embodiments where multiple target layers are used, each one of the multiple layers is preferably associated with at least one color related to an additive or subtractive color schemes. For example, each layer may provide for the appearance of red, green or blue (RGB); alternatively, each layer may provide for the subtraction of cyan, magenta, yellow or black (CMYK). In some embodiments, it may be useful to determine layer appearance based on factors other than a specific color scheme. For example, the availability of certain color forming materials may require deviation from a color scheme, in some instances necessitating use of a different number of layers than called for by a color scheme.

In some embodiments, a color forming layer is applied to an optical media in conjunction with an overcoat layer. In these embodiments, the "two coat system" provides certain versatility not available in the "single coat system" where only layers of color forming formulations are used. As an example, in one embodiment of a two coat application, an overcoat is applied which contains photoabsorptive materials. In this embodiment, the overcoat provides protection of the color forming layer from UV in ambient light, thereby improving aspects of the appearance of a marking. For example, use of UV absorbers may limit growth of background color due to exposure to ambient light, and therefore the longevity of a marking.

The terms "marking," and "image" refer to the optical changes formed in the target layer as a result of exposure to the energy source. The marking may be used as "label." The image may include any form of marking within the contemplation of one forming the image. For example, a marking may include, without limitation, a bar code, text, graphics, alphanumeric characters, and symbols. Likewise, the "content" of the marking may contain any content within the contemplation of one making the marking. For example, content may include, without limitation, instructional, promotional, advertising, branding, authentication, identification, serialization, and/or other types of information.

In some embodiments, the markings may be best viewed from the read side. In others, the markings are best viewed from the non-readout side. Some markings may be viewed equally as well from both sides.

Figure 3:
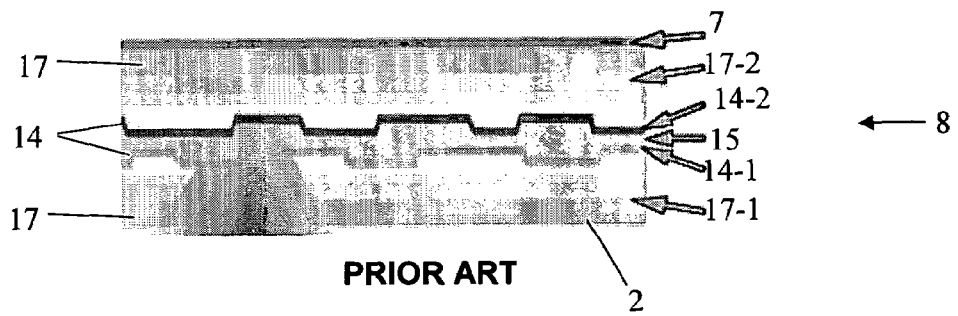

Referring to FIG. 3, a prior art version of a single sided, dual layer optical media 8 is depicted. One example of an optical media 8 using this type of construction is the format referred to as "DVD-9", and as shown in FIG. 3. Starting from the bottom side, the readout side 2, the optical media 8 shown in FIG. 3, a DVD-9, includes a first substrate layer 17-1, a semi-reflective layer 14-1, a bonding layer 15, a reflective layer 14-2, a second substrate layer 17-2, and a label side 7. FIGS. 10A-E, collectively referred to as FIG. 10, provide an introduction to use of coatings in an optical media 10, such as the single sided, dual layer optical media 8 depicted in FIG. 3.

Figure 10A:
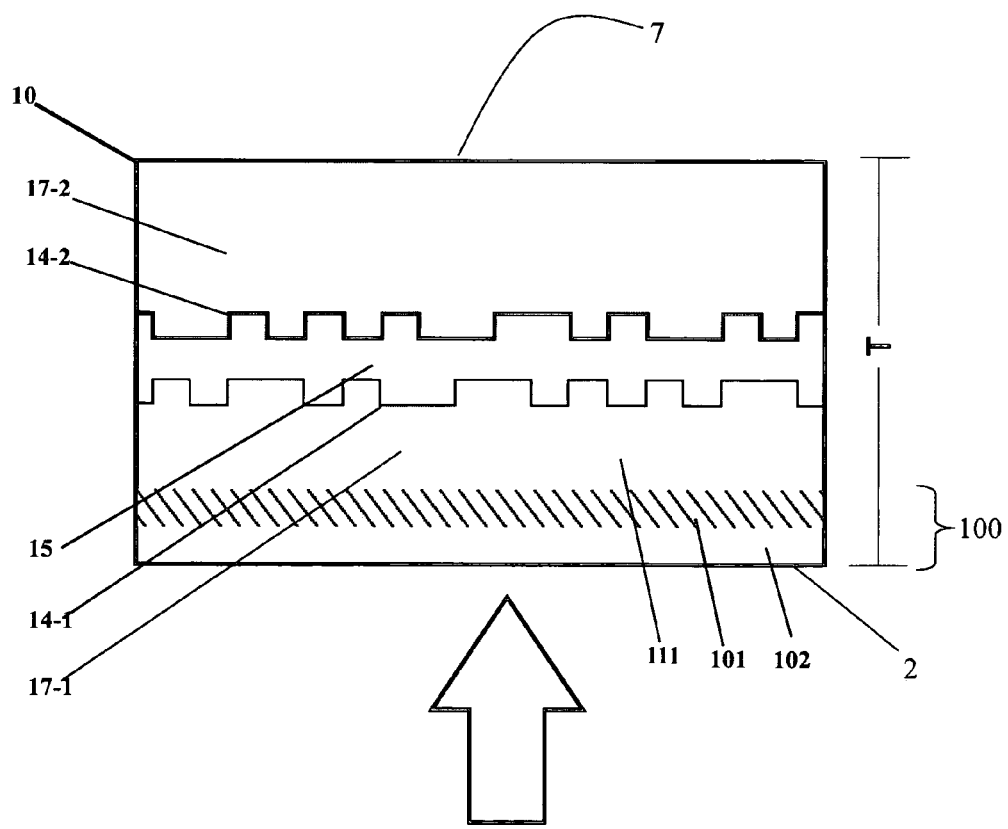

Referring to FIG. 10A, an optical media 10 of thickness T is shown. The thickness T, and other aspects of the optical media 10, correlate to the DVD-9 format. The substrate layer 17-1 is designated as a target layer for incorporation of the coating 100. The coating 100 includes two layers, a single color forming layer 101 and an over coat layer 102. In one embodiment, the first substrate layer 17-1 is manufactured to a reduced thickness 111, to account for augmentation with the coating 100 and production of a coated optical media 10.

In the embodiment shown in FIG. 10B, the entire bonding layer 15 has been replaced by the incorporation of a single color forming layer 101. In the embodiment depicted, the color forming layer 101 has been incorporated without an overcoat layer 102. The remaining portions of the optical media 10 are constructed in accordance with the specifications of the prior art.

Figure 10C:
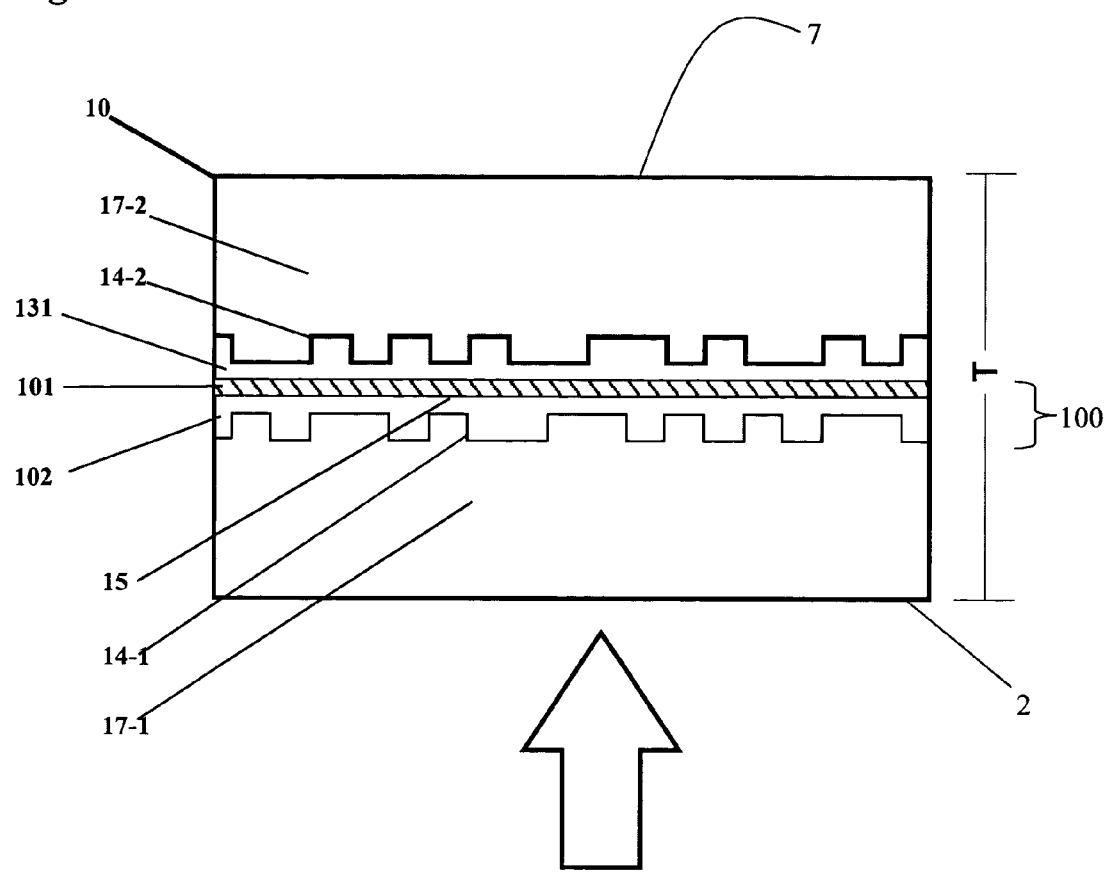
Figure 10D:
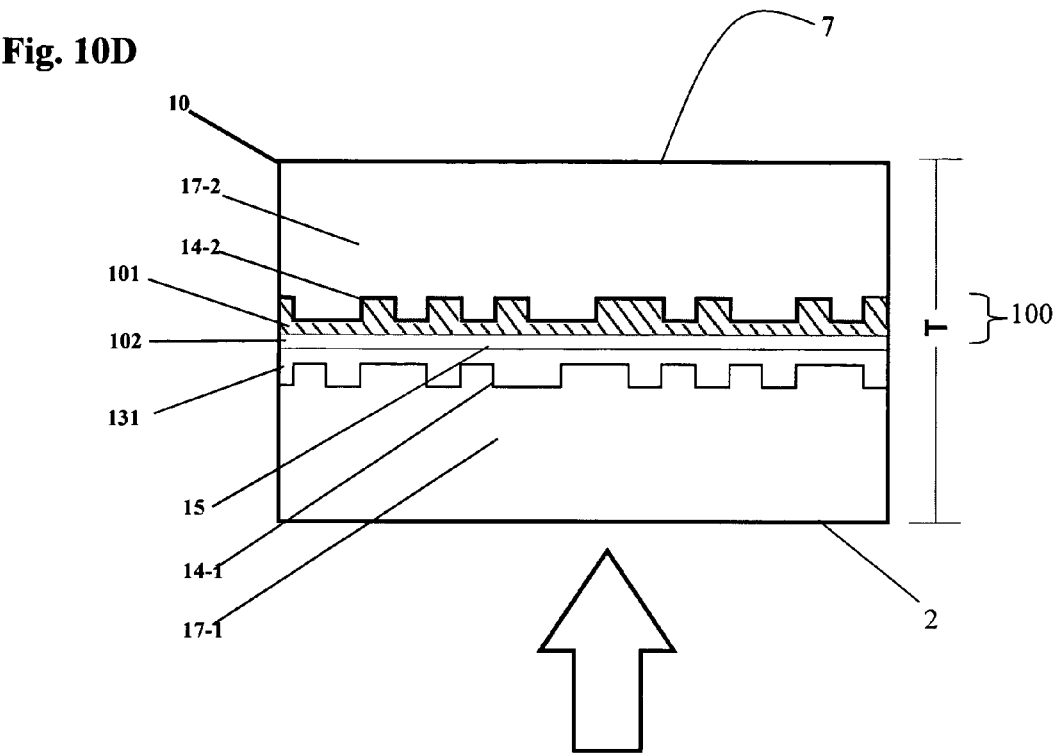

In FIG. 10C, the bonding layer 15 provides a target layer for incorporation of an overcoat layer 102 and a color forming layer 101, where the remaining portion of the bonding layer 15 uses prior art materials (such as UV curable acrylates). FIG. 10D depicts a variation of the embodiment depicted in FIG. 10C.

Figure 10E:
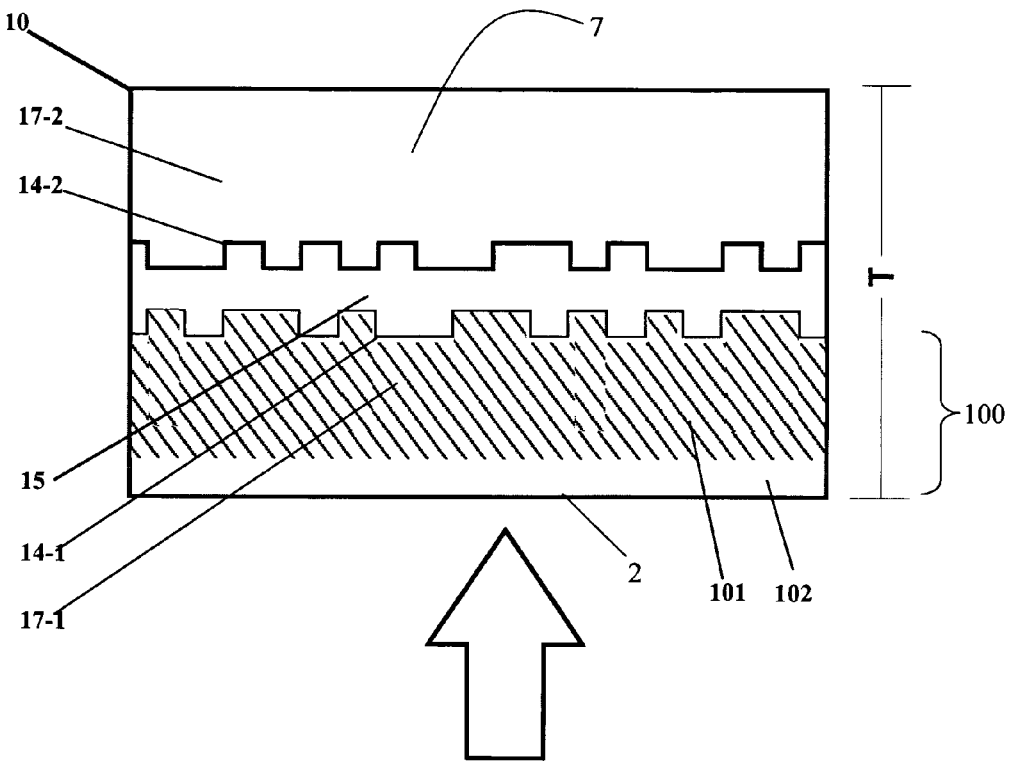

A further embodiment is presented in FIG. 10E. FIG. 10E is discussed further herein. One skilled in the art will recognize that the foregoing embodiments of target layers introduce aspects of combinations that can include a large number of variations. Accordingly, these foregoing embodiments are illustrative and not limiting of the invention.

In the preferred embodiment, formulations are robust to the retention of a color selected and developed during the manufacturing process, and are robust to the physical demands of the application. That is, each formulation is substantially color fast under normal conditions, and substantially durable to normal wear. In some embodiments, a formulation is composed of materials that are disbursed in a polymeric matrix or other suitable equivalent. In some embodiments, the materials are disbursed in an ultraviolet (UV) curable polymer.

Formulations may be applied through any technique that is appropriate for the optical media 10. For example, in one embodiment, a formulation is applied by spin-coating. The step of spin coating the formulation onto the optical media 10 occurs during the mass production of the optical media 10 and preferably follows traditional steps for the manufacture of an optical media 8.

It is within the teachings herein to incorporate the apparatus and techniques disclosed with other techniques for marking optical media 10. For example, a formulation could be included in one target layer, while a surface relief pattern having continuous variations defining a holographic image is incorporated into another layer. In some embodiments, a formulation is used in combination with, or as an overlay to, a surface relief pattern having continuous variations and defining a holographic image. In these embodiments, the combination appears on the non-readout side. Accordingly, one can understand that the teachings herein may be used with a variety of techniques for manufacture of optical media 10.

Development of formulations for use as a color forming layer 101, as well as an over coat layer 102 are now discussed.

II. Coating for Optical Media

Preferably, the coating 100 contains what can be referred to as two "sets" of photosensitive materials. One set of photosensitive materials provides for curing of the coating 100 once the coating 100 is in place. That is, exposure to one set of wavelengths provides for curing of the first set of photosensitive materials. A second set of photosensitive materials in the coating 100 exhibits optical changes upon adequate exposure to a separate set of wavelengths. Thus, the coating 100 may contain photoinitiators to initiate crosslinking. The coating 100 may include, but is not limited to, compounds such as photoacid or photobase generators, acid or base sensitive dyes, leucodyes, metal chelates, fluorescent dyes, or laser dyes. The coating 100 may be colored or colorless to the eye, and may be fluorescent under certain electromagnetic radiation. Fluorescent emission wavelengths may include, but are not limited to, a wavelength in the visible region.

Although disclosed herein in terms of photosensitive materials responsive to wavelengths of ultraviolet light (UV), the coating 100 may include materials that are photosensitive to any band of wavelengths (also referred to as a "set of wavelengths"). For example, the photosensitive materials may be responsive to UV-A, UV-B, or UV-C wavelengths. As one may surmise, having two sets of photosensitive materials provides for use of two sets wavelengths to initiate the changes in the coating 100 as described herein. It is considered that other formulations, not discussed herein, may advantageously make use of wavelength separation over the spectrum of useful wavelengths. Accordingly, the teachings herein are not limited to the exemplary embodiments herein, which merely provide one example of a system for applying markings to optical media.

It should be noted that the term "coating" is taken to mean an application of formulation as disclosed herein. That is, although techniques may be used for application of a formulation as a coating, such as by spin coating, incorporation of formulations are not meant to be limited to coating techniques. Other non-limiting examples of application of one or more formulations include use of compounding techniques, where a formulation is incorporated into other materials, which are applied to the optical media. In general, it is considered that the term "coating" applies to materials included in an optical media in accordance with the teachings herein.

A. Single Coating Development

Aspects of the development of the coating materials have been summarized and are now presented. Some embodiments disclosed herein are results of experimentation. One skilled in the art will recognize that some embodiments provide certain advantages in certain settings over other embodiments. Further embodiments may also be developed. Therefore, it should be recognized that the formulations presented, as well as the processes for making and applying a coating are illustrative and not limiting of the invention herein.

1. General Formulation

Early attempts to make a photosensitive color forming lacquer originated with a combination of acrylates, a photoinitiator, a photoacid generator (PAG), and a color former. One of the first formulations that was considered to show desired properties was composed of about 3% of a photoacid generator (PAG), about 3% of a color former, and about 94% of a mixture, referred to as a "coating base." The coating base was formed of a mixture that included an acrylate and a photoinitiator. Presently preferred embodiments of the coating base are generally a mixture of acrylated monomers and oligomers, wetting agents, and a photoinitiator. The color former and the photoacid generator, referred to as the "imaging components" are added to the coating base. As used herein, the term "coating base" may also be expressed as a "base material."

Initial experimentation with the development of suitable coating base materials involved an acrylate combination where SR-494 and SR-238 were mixed in about equal quantities. A photoinitiator, ESACURE KTO-46, was added to the acrylate combination so as to be about 10% of the first coating base.

The chemical equivalents of these materials being: SR-494 is an ethoxylated (4) pentaerythritol tetraacrylate; SR-238 is a 1,6 hexanediol diacrylate having a low viscosity, fast curing monomer with low volatility, a hydrophobic backbone, and good solvency for use in free radical polymerization; and, ESACURE KTO-46 is a stable liquid mixture of trimethylbenzoyldiphenylphosphine oxide, α-hydroxyketones, and benzophenone derivatives. ESACURE KTO-46 is a liquid photoinitiator that can be incorporated by simply stirring into a resin system, and is insoluble in water and is soluble in most common organic solvents and monomers. KTO-46 may also be referred to as including ESACURE KIP-150 and ESACURE TZT. The equivalent of ESACURE KIP-150 being an: oligo [2-hydroxy-2-methyl-1-[4-(1-methylvinyl) phenyl] propanone]; and ESACURE TZT being an eutectic liquid mixture of: 2,4,6 trimethylbenzophenone and 4 methylbenzophenone.

ESACURE KTO-46, ESACURE KIP-150 and ESACURE TZT are produced by Lamberti Spa, Gallarate-Va., Italy. SR-494 and SR-238 are products of Sartomer Corporation of Exton, Pa. KTO-46 is also marketed by Sartomer Corporation as SARCURE-1135 (therefore, KTO-46 and SR-1135 are used interchangeably herein).

Investigation of the properties of coatings 100 using the first coating base revealed certain disadvantages. That is, it was considered that a finished product formed from the first coating base did not exhibit a desired degree of surface hardness, and had a potential for skin irritation. Therefore, further components were evaluated for use in the coating base. Table 1 shows aspects of the components selected for the coating base, and includes certain performance characteristics thereof.

TABLE 1

Coating Base Components

| Component | Performance Characteristics |
| --- | --- |
| SR-494 | Fast cure response/good hardness |
| SR-238 | Fast cure response/good adhesion |
| SR-285 | Low viscosity/improves color |
| SR-9021 | Fast cure response/excellent hardness |
| KTO-46 | Good surface cure/good through cure |

SR-285 is tetrahydrofurfuryl acrylate that is a low viscosity, polar, monofunctional monomer, which contains a cyclic group, and promotes adhesion to numerous substrates; and SR-9021 is a highly propoxylated (5.5) glyceryl triacrylate, that is a low skin irritation trifunctional monomer offering low viscosity, good flexibility, fast curing, and excellent hardness. SR-285 and SR-9021 are products of Sartomer Corporation of Exton, Pa.

SR-494 and SR-9021 were selected for use in the coating base due to high functionality, low surface tension, fast surface and through cure response, adhesion, and hardness. These components were also considered advantageous as alkoxylation reduced a propensity to irritate skin. In contrast, SR-238 and SR-285 were skin irritants, but did offer desirable solvation of additives and swell polycarbonate for good adhesion. SR-238 and SR-285 also exhibit low viscosity, which provided an opportunity to tailor the viscosity of the coating base. KTO-46 was selected for use as a photoinitiator, as KTO-46 is considered to be substantially sensitive to long wavelengths of ultraviolet light (i.e., above about 320 nm up to about 400 nm).

Experiments further revealed that applying the coating 100 to an optical media 10 could be achieved by various techniques. Preferably, the coating 100 is applied by spin coating. However, during initial applications of the coating 100 by use of spin coating, the edges of the optical media 10 occasionally exhibited coverage that was less than desired. It was determined that this was due to the high surface tension of the lacquer (coating base). Therefore, wetting agents were added to the coating base to improve substrate wetting and lower the surface tension were.

Exemplary systems for spin-coating formulations onto the substrate 17 include those available from Headway Research, Inc. of Garland, Tex. Aspects of a system used herein for applying formulations by spin-coating processes includes: controls for adjusting formulation temperature, controls for varying spin speeds in increments, with a maximum spin speed of at least 10,000 (10K) rpm. Systems may further include aspects such as environmental controls for controlling ambient gases, as well as formulation recovery apparatus for recycling unused formulation. Other systems may be used for spin coating, and may further be integrated into mass production apparatus. One model suited for applications of the formulations herein, at least in small batches, is model PWM32-PS-R790 Spinner System, used for aspects of testing as described herein. As systems for spin coating are known, these systems are generally only described further herein in terms of application of the coating 100, and requirements thereof.

Formulations were made with all of the new components (Table 1) to see how they affected the performance of the coating 100. Wetting agents were included in the new formulations to improve distribution of the formulations over the discs 10. The wetting agents tested were BYK-307 and BYK-333, both agents being polyether modified poly-dimethylsiloxanes, and exhibiting similar properties for reducing surface tension. BYK-307 and BYK-333 are products of BYK-Chemie, of Wesel Germany, and distributed in the US by BYK-Chemie USA, of Wallingford, Conn. Table 2 shows the formulations and results.

TABLE 2

Modified Coating Base Formulations

| Component | Control | 1 | 2 | 3 | 4 | 5 | 6 | 7 | 8 | 9 |
|---|---|---|---|---|---|---|---|---|---|---|
| SR-494 | 45.00 | 32.50 | 32.45 | 32.35 | 32.25 | 32.00 | 31.50 | 32.48 | 32.45 | 32.43 |
| SR-9021 | | 32.50 | 32.45 | 32.35 | 32.25 | 32.00 | 31.50 | 32.48 | 32.45 | 32.43 |
| SR-238 | 45.00 | 10.00 | 10.00 | 10.00 | 10.00 | 10.00 | 10.00 | 10.00 | 10.00 | 10.00 |
| SR-285 | | 15.00 | 15.00 | 15.00 | 15.00 | 15.00 | 15.00 | 15.00 | 15.00 | 15.00 |
| KTO-46 | 10.00 | 10.00 | 10.00 | 10.00 | 10.00 | 10.00 | 10.00 | 10.00 | 10.00 | 10.00 |
| BYK-333 | | | 0.10 | 0.30 | 0.50 | 1.00 | 2.00 | | | |
| BYK-307 | | | | | | | | 0.05 | 0.10 | 0.15 |
| Surface Tension (dynes/cm) | 42.67 | 42.83 | 30.67 | 28.33 | 27.00 | 26.67 | 26.67 | 31.50 | 30.33 | 30.67 |
| Viscosity (cP) | 36.50 | 51.50 | 46.40 | 48.00 | 49.90 | 53.80 | 53.80 | 47.70 | 48.30 | 49.60 |

In Table 2, the composition of a total of ten formulations is shown. The first coating base is shown as the Control, with subsequent formulations shown as mixtures 1-9. Quantities of each component in each of the ten compositions are expressed in weight percent of the total mixture.

The results show that the formulations including wetting agents exhibited reduced surface tension over formulations without a wetting agent. This was considered to be advantageous since formulations having lower surface tensions should coat the substrate 17 better than those formulations with higher surface tension. It was noted that after the addition of 0.3% BYK-333 and after 0.05% BYK-307, the surface tension of the formulation did not change significantly. Therefore, formulations 3 and 7 were tested physically by spincoating the coating base onto various discs 10 and inspecting the edges of the substrate 10. Upon inspection, formulation 3 was found to coat the discs 10 the best while increasing the surface slip significantly. It was noted that the viscosities of the various formulations did not change drastically between samples 1 through 9. As a result, formulation 3 was selected as a preferred coating base.

Shortly after this experiment, it was found that SR-9021 could be used interchangeably with SR-9020, since both had similar properties. This was considered to be advantageous since SR-9020 offers higher thermal stability than SR-9021. Therefore, SR-9020 was substituted into formulation 3. SR-9020 is a 3 mole propoxylated glyceryl triacrylate, that is a trifunctional monomer offering low viscosity, good flexibility, fast curing, and excellent hardness. SR-9020 is a product of Sartomer Corporation.

At about the same time, a number of formulations with different acrylates were made in order to find a lacquer that would produce a harder coating. New components for formulations and aspects of their performance are shown in Table 3, while the formulations and viscosity results are shown in Table 4.

TABLE 3

Possible New Formulation Components

| Component | Performance Characteristics |
|---|---|
| SR-9020 | Higher Tg version of SR-9021 |
| SR-454 | Fast cure response/good hardness high Tg |

TABLE 3-continued

Possible New Formulation Components

| Component | Performance Characteristics |
|---|---|
| SR-368 | Adhesion promoter/abrasion resistance |
| SR-355 | High Tg replacement for SR-494 |
| CN-983 | A hard urethane acrylate |

The components given in Table 3 are trade names of the Sartomer Corporation used for: propoxylated (3) glyceryl triacrylate (SR-9020); ethoxylated (3) trimethylolpropane triacrylate (SR-454); tris (2-hydroxyethyl) isocyanurate triacrylate (SR-368); di-trimethylolpropane tetraacrylate (SR-355); and, urethane acrylate (CN-983).

TABLE 4

Possible Formulations and Viscosity Results for Improved Hardness

| Component | Control (3) | 10 | 11 | 12 | 13 | 14 | 15 | 16 |
|---|---|---|---|---|---|---|---|---|
| BYK-333 | 0.3 | 0.3 | 0.3 | 0.3 | 0.3 | 0.3 | 0.3 | 0.3 |
| KTO/46 | 10 | 10 | 10 | 10 | 10 | 10 | 10 | 10 |
| SR-238 | 10 | 10 | 10 | | | 10 | 10 | |
| SR-285 | 15 | 15 | 15 | 10 | 10 | 15 | 15 | 15 |
| SR-494 | 32.35 | 32.35 | 32.35 | 34.85 | 34.85 | | | 25 |
| SR-9021 | 32.35 | | | | | | | |
| SR-9020 | | 32.35 | | | 34.85 | | 32.35 | |
| SR-454 | | | 32.35 | 34.85 | | 32.35 | | 29.7 |
| SR-368 | | | | 10 | 10 | | | |
| SR-355 | | | | | | 32.35 | 32.35 | |
| CN-983 | | | | | | | | 20 |
| Viscosity (cP) | 42.65 | 41.61 | 37.92 | 76.85 | 82.95 | 45.36 | 57.33 | 96.95 |

Upon inspection of spun coat, cured samples, it was found that formulations 10 and 14 were significantly harder than the control (formulation 3) while still exhibiting similar viscosities. Formulations 10 and 14 were then subjected to a number of tests, which made up a New Formulation Screening Test shown in Table 5. In preferred embodiments, each formulation must pass this screening to be considered as a possible base for the coating 100. Table 5 shows the tests involved as well as the criteria.

TABLE 5

New Formulation Screening Tests

| Test | Description | Uncured | Cured | Notes |
|---|---|---|---|---|
| UV-VIS | 190-800 nm, quartz | X | X | Background color (<0.05 AU at peak) |
| Viscosity | ASTM | X | | <100 cP @ 25 C |
| Surface Tension | Tensiometer | X | | <33 dynes/cm |
| Pencil Hardness | ASTM | | X | >=2B |
| Curing Time | Xenon lamp ~1" away with filter | X | | <3 secs to full hardness |
| Color Formation Time | Xenon lamp ~10" away without filter | | X | <10 secs to 0.5 AU at peak, 3% CF/PAG |

Two new formulations passed the New Formulation Screening Test as Table 6 shows. Formulation samples 10 and 14 were considered for future use and more in-depth tests.

TABLE 6

Two Formulations Passing the New Formulation Screening Tests

| Test | 10 | 14 |
|---|---|---|
| UV-VIS | 0.0315 AU at 3 sec | .0189 AU at 2 sec |
| Viscosity | 41.61 cP | 45.36 cP |
| Surface Tension | 28.83 dynes/cm | 28.33 dynes/cm |
| Pencil Hardness | 2B | 2B |
| Curing Time | 3 sec | 2 sec |
| Color Formation | 0.5501 AU at 10 sec | 0.5579 at 10 sec |

2. Photoacid Generator Screenings

Photoacid generators (PAGs) are added to develop the color in the coating 100 once exposed to wavelengths of light. This process involves generation of acid by the PAG when exposed to the wavelengths of light. In turn, an acid sensitive color former (CF) interacts with the acid, and forms color. Preferably, the PAG is sensitive to ultraviolet light.

A number of photoacid generators were examined to find one that would work appropriately in the coating 100. In order to compare the various PAGs, each formulation was prepared the same way. Sought after aspects of PAG performance included adequate acid production for desired color formation, and stability in post color formed environments.

Figure 11:
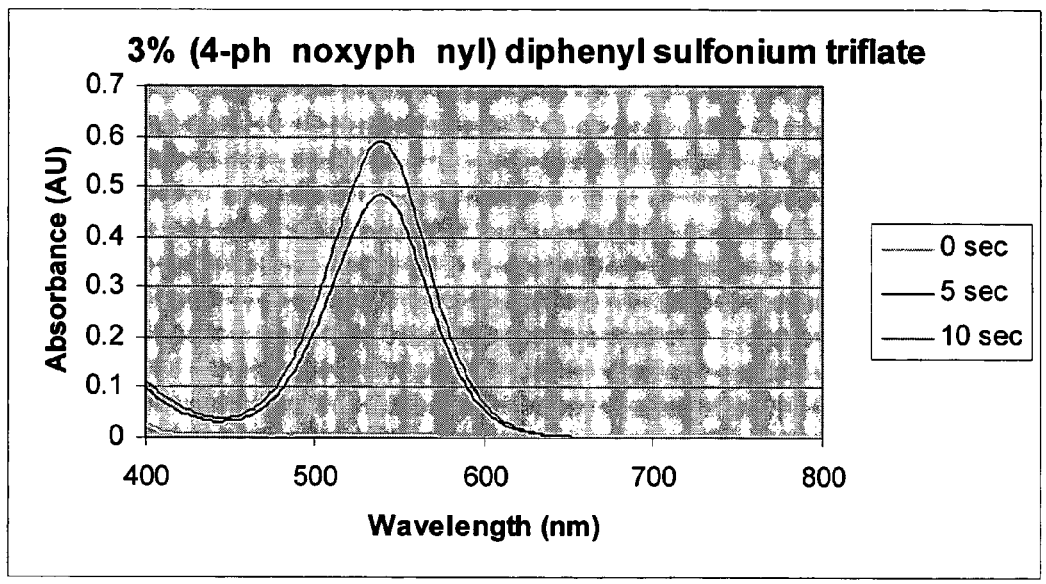
FIG. 11 depicts an absorbance curve for a color former in a coating formulation.

Coating base samples were made by mixing the original control formulation (45% SR-494, 45% SR-238, and 10% KTO/46). This mixture was added at 94% to a 3% concentration of COPIKEM 16 Red (a color former) and a 3% concentration of each of the photoacid generators to be investigated. The lacquers were spun coat onto blank, un-metallized polycarbonate substrate 17 for 15 seconds at 4K rpm. Each disc 10 was then placed under a pulsing XENON lamp with a double paned window glass filter for 5 seconds. The resultant disc 10 had a coating that was clear, dry, and hard. A portion of the disc 10 was then exposed for 5 seconds. Another portion of the disc 10 was exposed for 10 seconds. This produced a red color on the clear disc 10 with intensities varying between the different portions of the disc 10. To quantitatively measure the intensity of the color formed in the exposed discs 10, absorbance curves were recorded on a spectrometer. The spectrometer used was a UV/VIS model called LAMBDA 2, produced by Perkin Elmer Corporation, of Boston, Mass. The data produced revealed that the absorbance peaks of formulations containing COPIKEM 16 Red occur at about 540 nm. A typical absorbance curve is shown in FIG. 11. The results are shown in Table 7. Note that in Table 7, zero seconds measured the intensity of the background color.

TABLE 7

Photoacid Generator Results Using Control Formulation

| 3% Photoacid Generator | AU, 540 nm 0 sec | AU, 540 nm 5 sec | AU, 540 nm 10 sec |
|---|---|---|---|
| Bis (4-tert-butylphenyl) iodonium p-toluenesulfonate | — | 0.0834 | 0.0864 |
| (tert-Butoxycarbonylmethoxynaphthyl) diphenyl sulfonium triflate | 0.0151 | 04896 | 0.6639 |
| (4-phenoxyphenyl) diphenyl sulfonium triflate | 0.0037 | 0.4826 | 0.5899 |
| (4-tert-Butylphenyl) diphenyl sulfonium triflate | 0.0047 | 0.3759 | 0.5262 |
| Diphenyliodonium hexafluorophosphate | | Turned red immediately | |
| Diphenyliodonium triflate | | Turned red and insoluble | |
| Triphenylsulfonium triflate | — | 0.5496 | 0.5989 |
| 2-methyl-4,6-bis(trichloromethyl)-s-triazine | | Color fades within 24 hrs | |
| tris(2,4,6-trichloromethyl)-s-triazine | | Color fades within 24 hrs | |
| 2-phenyl-4,6-bis(trichloromethyl)-s-triazine | | Color fades within 24 hrs | |
| 2-(4-chlorophenyl)-4,6-bis(trichloromethyl)-s-triazine | | Color fades within 24 hrs | |

The results showed that (tert-Butoxycarbonylmethoxynaphthyl) diphenyl sulfonium triflate, (4-phenoxyphenyl) diphenyl sulfonium triflate, triphenylsulfonium triflate, and (4-tert-Butylphenyl) diphenyl sulfonium triflate were decreasingly intense. However, since 0.5 AU was considered sufficiently visible, other factors such as cost were considered in selecting a preferred photoacid generator. Triphenylsulfonium triflate was selected as the preferred choice for the coating 100. It was noted that all the photoacid generators were soluble at 3% except Bis (4-tert-butylphenyl) iodonium p-toluenesulfonate and Diphenyliodonium triflate. Bis (4-tert-butylphenyl) iodonium p-toluenesulfonate required filtering to remove a substantial portion of the insoluble photoacid.

Table 8 shows the results for three photoacid generators (PAG). The three PAG were incorporated in the modified coating base formulation 10 (94% of 32.35% SR-494, 32.35% SR-9020, 15% SR-285, 10% SR-238, 10% KTO/46, and 0.3% BYK-333). A 3% concentration of each photoacid generators was mixed with the color former PERGASCRIPT Red I-6B. The comparative solubility for of the three photoacid generators being (4-tert-butylphenyl) diphenyl sulfonium triflate is more soluble than (4-methylphenyl) diphenyl sulfonium triflate and is more soluble than triphenylsulfonium triflate. As the formulation for PERGASCRIPT Red I-6B is proprietary, this is not presented herein. However, further herein, various color formers suited for use with the teachings herein are presented.

TABLE 8

Photoacid Generator Results in Formulation 10

| 3% Photoacid Generator | AU, 540 nm 0 sec | AU, 540 nm 5 sec | AU, 540 nm 10 sec |
|---|---|---|---|
| Triphenylsulfonium triflate | 0.0176 | 0.4027 | 0.5289 |
| (4-tert-butylphenyl)diphenyl sulfonium triflate | 0.0093 | 0.3893 | 0.4908 |
| (4-methylphenyl)diphenyl sulfonium triflate | 0.0138 | 0.3921 | 0.4741 |

3. Considerations for Curing

Curing at this point warranted further investigation, so other photoinitiators were investigated, and were substituted in place of the 10% concentration of KTO/46. Table 9 shows the results of a first set of experiments with varying amounts of photoinitiators. Each sample was prepared by spincoating, then cured by illumination with a XENON lamp with a window glass filter for five seconds. The samples were then exposed under the XENON lamp for ten seconds. Each entry in Table 9 is given in the weight percentage of the photoinitiator as a part of the 94% coating base. The degree of cure was established by attempting physical smudging of the coating, with the scale for the degree of curing as follows: E (excellent)>G (good)>D (decent)>P (poor).

TABLE 9

Photoinitiator Experiment I

| Photoinitiator | Formulation No. | | | | | | | | |
|---|---|---|---|---|---|---|---|---|---|
| | 10 | 17 | 18 | 19 | 20 | 21 | 22 | 23 | 24 |
| ESACURE KTO-46 | 10 | 5 | | | | | | | |
| DAROCUR 4265 | | | 10 | | | | | | |
| IRGACURE 819 | | | | 5 | 5 | 7 | 9 | 10 | |
| IRGACURE 369 | | | | | | | | | 5 |
| ESACURE TZT | | 5 | | | | | | | |
| Degree of cure | G | P | P | D | G | G | — | — | G |

The results show that samples 20, 21, and 24 cured well. However, sample 24, with 5% IRGACURE 369 does not produce any color upon exposure to UV light. Also, samples 20 and 21, with 5% and 7% IRGACURE 819 cured slightly pink. Note that formulations 22 and 23 were thrown out because they turned red in lacquer form, in addition to being insoluble.

DAROCUR 4265 is a mixture of 50% 2,4,6-Trimethylbenzoyl-diphenyl-phosphineoxide and 50% 2-Hydroxy-2-methyl-1-phenyl-propan-1-one. IRGACURE 369 is 2-Benzyl-2-dimethylamino-1-(4-morpholinophenyl)-butanone-1, which is a highly efficient UV curing agent which is used to initiate the photopolymerisation of chemically prepolymers—e.g. acrylates—in combination with mono- or multifunctional monomers. IRGACURE 819 is Bis(2,4,6-trimethylbenzoyl)-phenylphosphineoxide, which is a versatile photoinitiator for radical polymerization of unsaturated resins upon UV light exposure. It is especially suited for white pigmented formulations, the curing of glass fiber reinforced polyester/styrene systems and for clear coatings subjected to outdoor use in combinations with light stabilizers. Thick section curing is also possible with this photoinitiator. All three are products of Ciba Specialty Chemicals of Basle, Switzerland, and Tarrytown, N.Y.

In order to further improve samples 20 and 21, CN-384, an amine synergist was added at 0.5% and 1%, respectively. These new additions succeeded in producing a very clear cured coating. However, at 1%, the exposed areas were not intense enough. Unfortunately, with the addition of CN-384, it was found that the exposed areas of the discs 10 exhibited considerable fading after about twenty four hours at room temperature. (CN-384 is a difunctional amine coinitiator which, when used in conjunction with a photosensitizer such as benzophenone, promotes rapid curing under UV light. Additional benefits include reduced odors, both at press side and in the cured film, and reduced blooming. CN-384 is a product of Sartomer Corporation of Exton, Pa.).

Another set of experiments was conducted with different combinations of the above experiment, as well as further photoinitiators. Again, the coating base was generally equivalent to formulation 10, with exceptions being that the photoinitiator KTO/46, was replaced as indicated in Table 10.

TABLE 10

Photoinitiator Experiment II

| Photoinitiator | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|
| ESACURE KTO-46 | 7.5 | | | | | | | | | | | | 10 | | |
| IRGACURE 819 | | 3 | 6 | 2.25 | 1.5 | 0.75 | 4.5 | 3 | 1.5 | | | | | | |
| IRGACURE 2959 | | | | 0.75 | 1.5 | 2.25 | 1.5 | 3 | 4.5 | | | | | | |
| DAROCUR 4265 | | | | | | | | | | 5 | 7 | 10 | | | |
| SARCURE SR-1124 | | | | | | | | | | | | | | 2 | |
| ESACURE TZT | | | | | | | | | | | | | | | 10 |
| ESACURE KIP100F | | | | | | | | | | | | | | 10 | |
| Degree of cure | D | D | G | P | P | P | G | G | P | P | P | D | E | P | D |

IRGACURE 2959 is 1-[4-(2-Hydroxyethoxy)-phenyl]-2-hydroxy-2-methyl-1-propane-1-one, which is a highly efficient non-yellowing radical photoinitiator for the UV curing of systems comprising of unsaturated monomers and pre-polymers. It is especially suited where low odor is required and for use in water-borne systems based on acrylate or unsaturated polyester resins. The active hydroxy group can be reacted with suitable functionalized unsaturated resins; SARCURE 1124 is isopropyl thioxanthone, a photoinitiator that is used in combination with a suitable coinitiator, e.g., ethyl 4-(dimethylamino) benzoate (SARCURE SR1125), to initiate UV free radical polymerization. SARCURE SR1124 is used in inks, varnishes, and decorative coatings. ESACURE KIP 100F is a liquid mixture of about 70% Oligo [2-hydroxy-2-methyl-1-[4-(1-methylvinyl) phenyl] propanone and about 30% 2-hydroxy-2-methyl-1-phenyl propan-1-one.

Figure 12:
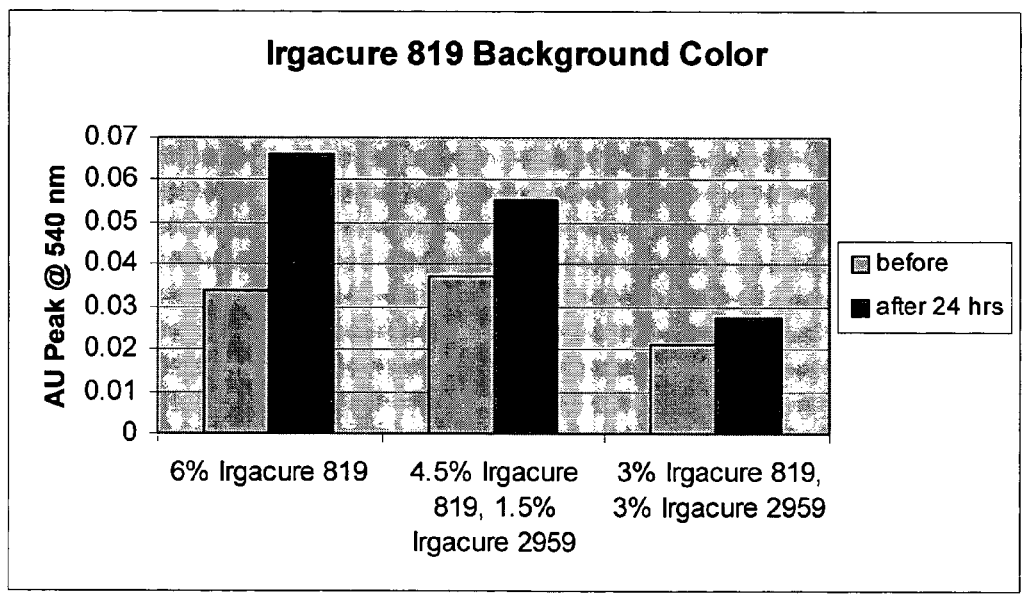
FIG. 12 compares background color formation in various compositions.

This experimental data in Table 10 shows that samples 27, 31, 32 and 37 cured well and warranted further investigation. Since samples 20 and 21 had cured to a slightly pink appearance, spectra were collected for selected formulations using IRGACURE 819 of the cured area immediately after the cure and twenty four hours later, as shown in FIG. 12.

This experiment shows that as the amount of IRGACURE 819 increases in the formulation, the color intensity of the cured coating increases and will continue to increase. It is theorized that the IRGACURE 819 may act as a sensitizer for the photoacid causing an increased sensitivity to longer wavelength light, leading to undesired color formation. Consequently, formulations 27 and 31 were disregarded because of the intensity of the cured background color.

Sample 37 cured quickly but was considered to have an undesirable amount of color formation after curing. Therefore, another formulation was made with a lower concentration of SR-1124. Other formulations were made with the addition of SR-1124, since SR-1124 seemed to promote rapid curing. Combinations for the third photoinitiator experiment are shown in Table 11.

TABLE 11

Photoinitiator Experiment III

| Photoinitiator | 40 | 41 | 42 | 43 |
|---|---|---|---|---|
| ESACURE KTO/46 | 5 | | | |
| IRGACURE 819 | | | 3 | |
| IRGACURE 2959 | | 5 | | |
| SARCURE SR-1124 | 1 | 2 | 1 | 5 |
| Degree of cure | D | P | G | P |

Experiment III shows that samples 41 and 43 do not cure well. Sample 43 also turned pink very quickly. Although certain formulations containing SR-1124 appeared to so show promise, the sensitizing action of SR-1124 on the photoacid generator was considered a drawback to other properties, such as UV stability of the image. However, from these experiments conducted as set forth in Tables 9-11, potential combinations of photoinitiators were developed, and available in the case that the preferred use of KTO-46 (formulation 10) displayed drawbacks in future testing.

It is important to note additional aspects of curing the coatings 100 disclosed herein. These aspects include accounting for the filter spectra, the curing environment, and aspects of the curing lamp(s), some of which are now discussed.

Figure 13:
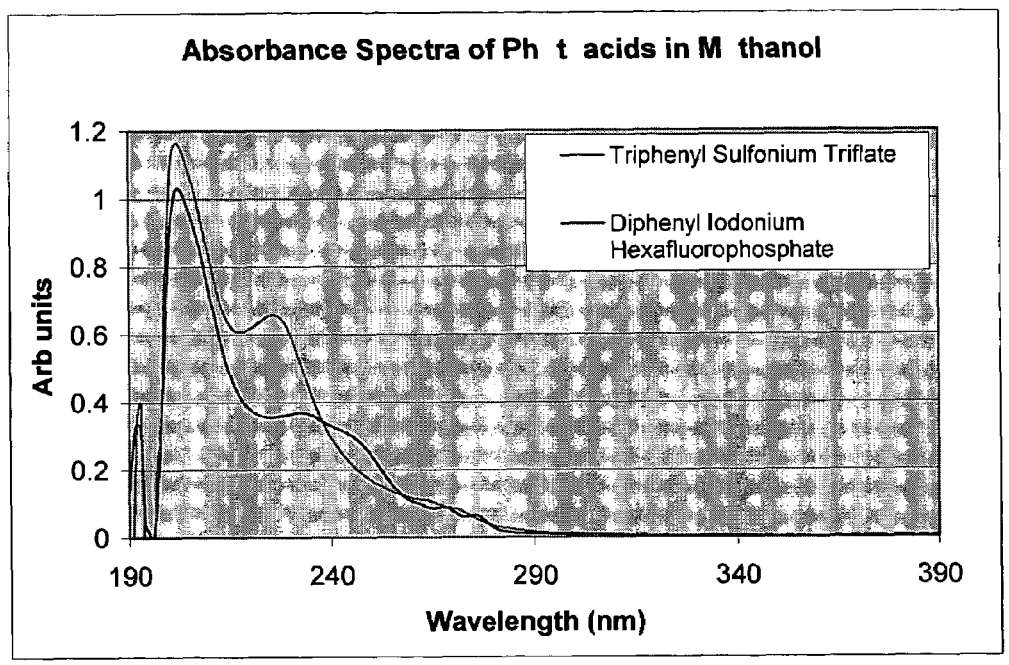
FIG. 13 depicts absorbance spectra for two photoacid generators.

It is considered that an important aspect of achieving both curing and imaging using lies in the ability to resolve areas of the spectrum that can be used for the respective steps. As stated elsewhere herein, preferably both curing and imaging are completed using wavelengths of ultraviolet light. It is recognized that other formulations than those disclosed herein may exhibit better response at other wavelengths, and therefore use of wavelengths specified herein on only exemplary. In preferred embodiments, deep UV light (wavelengths below about 320 nm) is used for imaging because photoacid generators are available which operate in this area and because deep UV light is not typically found at high intensities in natural illumination (sunlight, fluorescent or incandescent lighting). This tends to provide for a more durable image under ambient conditions when in use. For example, the absorbance spectra of two commercially available photoacid generators having little absorption above 290 nm are depicted in FIG. 13.

Figure 14:
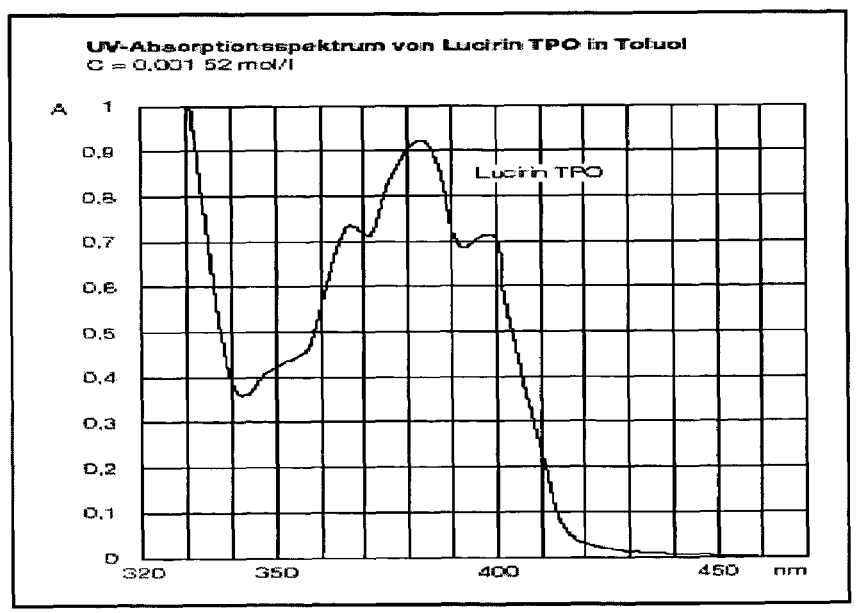
FIG. 14 depicts a UV absorption spectra for a first photoinitiator.
Figure 15:
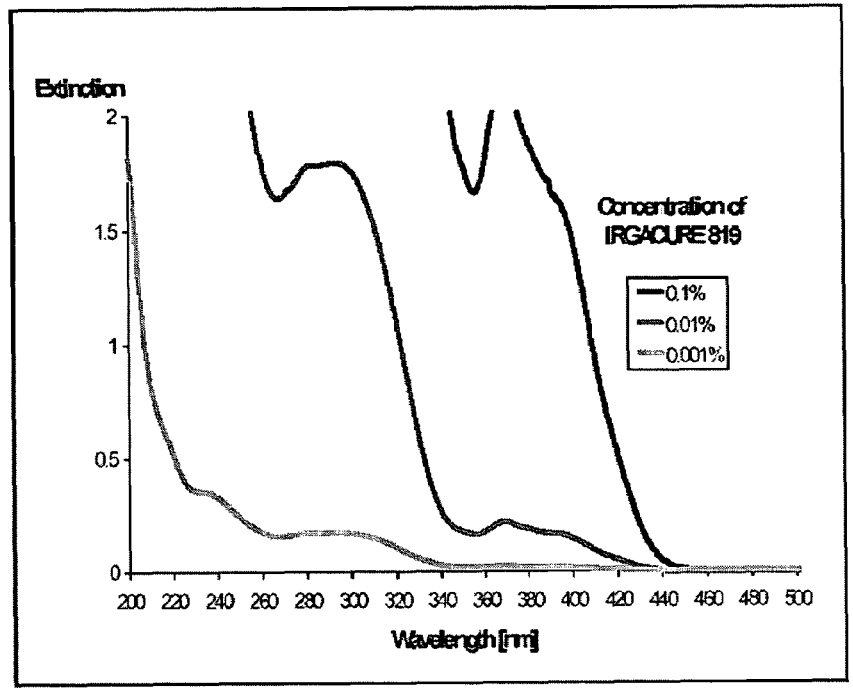
FIG. 15 depicts a UV absorption spectra for a second photoinitiator.

There are a number of commercially available photoinitiators whose primary absorption bands lie at wavelengths greater than 300 nm. Most notably, the phosphine oxide functionalized photoinitiators such as LUCIRIN TPO from BASF Corporation of Charlotte N.C., (the main component in KTO46) and IRGACURE 819, whose spectra are shown in FIGS. 14 and 15, respectively. Other photoinitiators may be used which also exhibit absorption for wavelengths above about 300 nm. It should also be noted that these initiators are of the direct fragmentation type of unimolecular initiators.

Bimolecular initiators typically consist of a sensitizing molecule capable of absorbing light and transferring it to a synergist molecule capable of forming a radical upon the energy transfer. One of the most common sensitizers to absorb visible light is ITX, or isopropylthioxanthone. ITX is commonly used with an amine synergist such as ethyl-p-dimethyl amino benzoate (EDAB) or octyl-p-dimethyl amino benzoate (ODAB). Both EDAB and ODAB are capable of forming radicals upon energy transfer from the ITX. These components are not considered appropriate for use in the coating for two reasons. The first is the ITX sensitizer also sensitizes the photoacid to visible light, thereby eliminating the spectral resolution between curing and writing. (To some extent this also happens when using certain unimolecular photoinitiators such as IRGACURE 819, which also causes a slight sensitization of the photoacid generate to long wave UV light). The second reason is that typical synergists such as amines (and to a lesser extent alkoxylated monomers such as SR-494, SR-9020, SR-9021) significantly reduce or even eliminate color formation or image stability through neutralization of the acid generated by the photoacid generator.

For a discussion of photoinitiator types and processes, reference may be had to: Chapters I and II in "Chemistry & Technology of UV & EB Formulation for Coatings, Inks, & Paints, Volume III Photointiators for Free Radical Cationic & Anioninc Photopolymerization" 2nd Edition, J. V. Crivello and K. Dietliker Eds, WILEY/SITA Series in Surface Coatings Technology, John Wiley and Sons, 1998.

In addition to a requirement for having the absorption spectra of the photoacid generators and the photoinitiators resolved (substantially separate from one another), mass production demands that sufficient intensity of the light in each band must be high enough to provide for curing and imaging in a minimum amount of time. Popular light sources for curing UV curable coatings include continuous wave (CW) sources such as metal and metal halide arc lamps (from Honle UV America, Inc of Marlboro, Mass.), as well as pulsed arc lamps such a XENON gas arc lamps (Xenon Corporation, of Woburn Mass.).

One advantage of using light filters, or other techniques, is that a narrow band of wavelengths may be produced, or that unwanted wavelengths may be substantially removed. Such techniques provide for better resolution (separation of curing and imaging wavelengths), thus increasing the availability or selection of photoinitiators and photoacid generators and combinations thereof.

Figure 16:
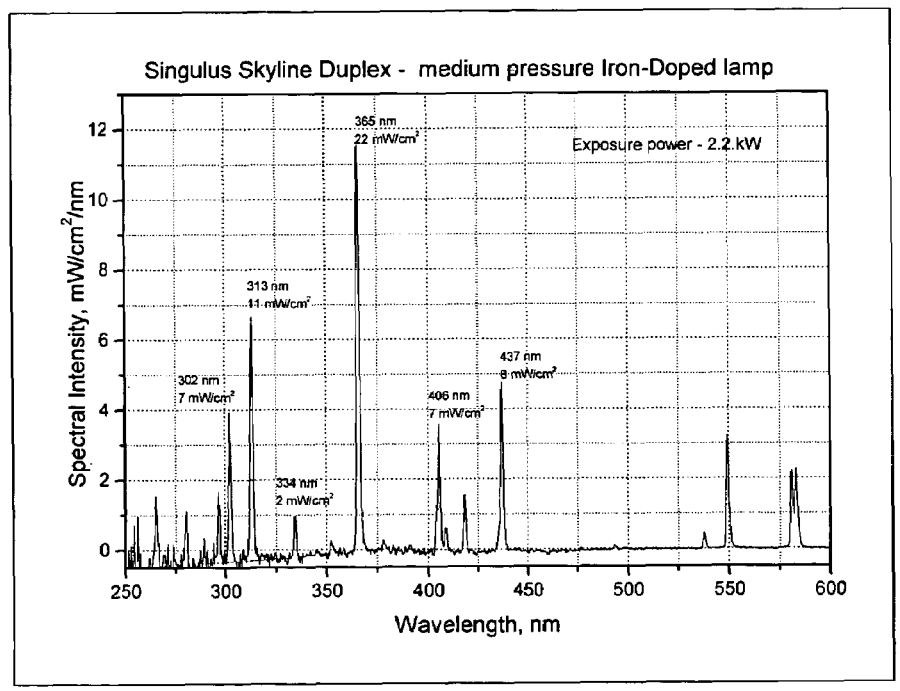
FIG. 16 depicts a line spectrum for a medium pressure iron-doped lamp.
Figure 17:
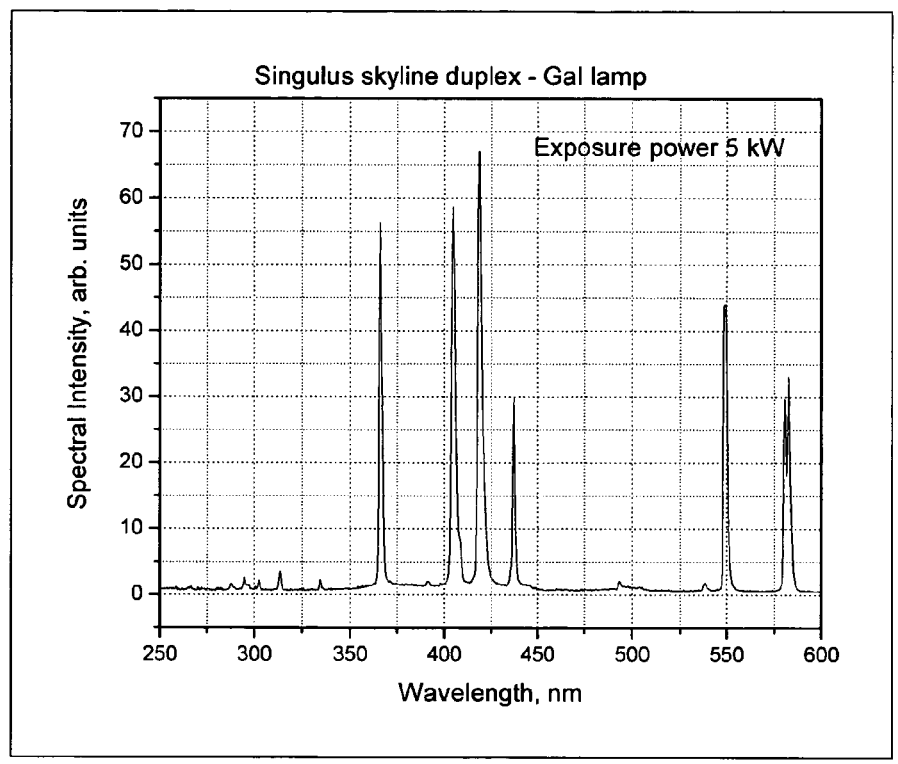
FIG. 17 depicts a line spectrum for a gallium iodide lamp.

A typical mercury vapor lamp produces a spectrum that is predominately a line spectrum. For example, the spectrum in FIG. 16 shows the output from a medium pressure iron-doped mercury lamp typically used for UV curing lacquers applied to of optical media 10. Once can see how the majority of the output comes from discrete lines associate with electronic transition of the lamp dopant. A similar spectrum for a different metal halide lamp, gallium iodide, with different transition lines, is shown in FIG. 17.

Figure 18:
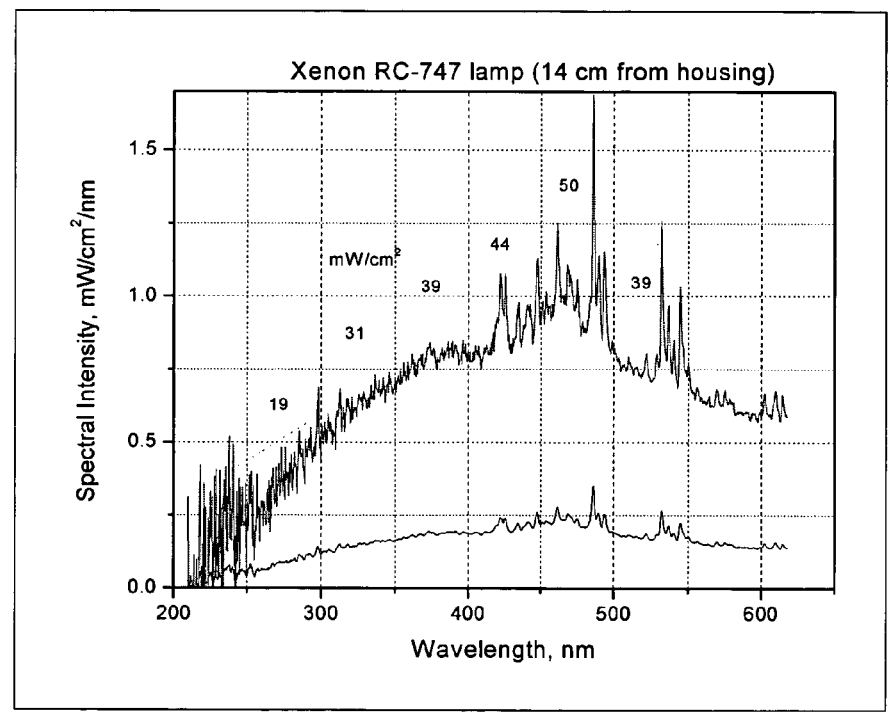
FIG. 18 depicts a line spectrum for a xenon gas filled lamp.

These lamps typically work well for UV curing because the major lines are compatible with the photoinitiators used in UV curing systems. Another popular lamp is the pulse XENON gas filled lamp, such as those made by XENON Corporation of Woburn Mass. The spectrum for these lamps are much more "blackbody" in nature, with a spectrum derived from the color temperature of the plasma formed in the lamp during the pulse. A typical spectrum from a XENON RC-747 gas filled lamp is depicted in FIG. 18.

Figure 19:
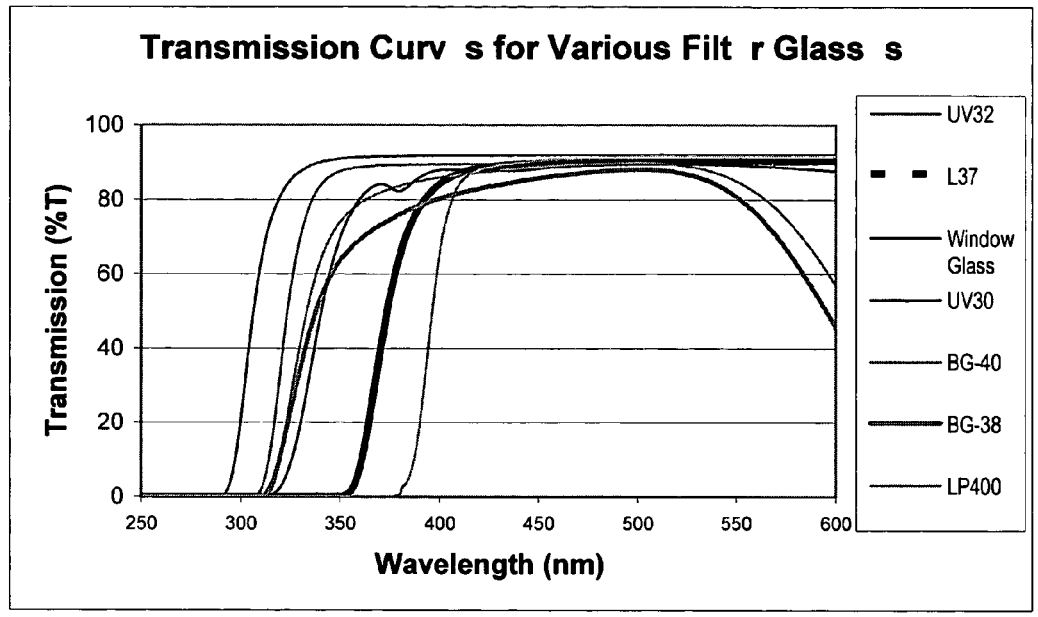
FIG. 19 depicts transmission curves for various filters.

In addition to having an appropriate source of UV light, separation of the long UV from the short UV portion of the spectrum must be achieved in order to first cure the coating 100 without prematurely causing color formation. Preferably, this is achieved through the use of absorptive filters such as those whose transmission curves are shown in FIG. 19. During the development of the coating 100, a series of experiments were performed to find an acceptable combination of a lamp, a filter, and photoinitiators to provide for an adequately short cure time, where no premature color formation took place. As shown in FIG. 19, the L37 filter was substantially transmissive above about 370 nm.

The preferred method for curing the coating consists of using the KTO-46 photoinitiator with a combination of a XENON bulb and an L37 filter glass. Typical mercury line lamps did not produce an intensity of light that was adequate in comparison to the XENON lamps, where both were outfitted with an L37 filter. As the high intensity of the XENON pulsed lamps leads to better properties in a cured coating, the XENON lamps were selected for curing of the coating 100.

In actual practice, filtering of wavelengths for curing could also be performed through the use of cold mirror technology, where a mirror which selectively reflected a portion of the UV spectrum and allowed the visible and infrared portions to pass would thus provide only the desired wavelengths. This technique would provide a benefit of reducing thermal loading in the coating 100, as well and the thermal management required to cool an absorptive filter. Another approach that is considered useful for curing would be to use different types of glasses with different UV transmission as the bulb material, thereby keeping the thermal load in the lamp housing. This is a well known approach used by most bulb manufacturers including Xenon Corporation, which offers five bulb types that differ only in the type of glass used.

4. Oxygen Inhibition

During UV curing of free radical systems, the presence of oxygen can have a detrimental effect on the cure response, especially for thin-film coatings. Accordingly, it is considered preferable to inhibit the ambient oxygen (air) in the curing environment. Oxygen inhibition is known, and described by Crivello and K. Dietliker (see chapter 2 page 83). When curing the coating 100 in ambient air, oxygen reacts with the free radical and forms peroxy radicals by reaction with the photoinitiator, monomer or propagating chain radical. The reactivity of the peroxy radicals is insufficient to continue the free radical polymerization process, leading to chain termination and resulting in an under cured system. Methods to overcome oxygen inhibition include (1) adding more photoinitiator or (2) increasing curing time. As the photoinitiator selected is relatively expensive, option (2) is considered to be preferable over option (1).

A further solution to the oxygen-inhibition problem is to replace the ambient air environment with an inert gas, such as nitrogen. This enables all the free radicals produced by UV exposure to be used in the polymerization process. Unfortunately, use of a purge gas, such as nitrogen, has a correlative economic impact due to the large volume of nitrogen needed. The expense of using a purge gas must therefore be weighed against various other requirements, such as the cure time, and desired end product.

A further method of overcoming oxygen inhibition is to use photoinitiators which are less reactive with oxygen. These initiators tend to require shorter UV light to work (<320 nm). Alternatively, the photoinitiators may include the sensitizing molecule and a synergist described earlier. As described earlier, the sensitizers also sensitize the photoacid generators to visible light. This has a propensity to reduce the spectral resolution between the bands of wavelengths for curing and for writing. Typical synergists, such as amines (and to a lesser extent alkoxylated monomers such as SR-494, SR-9020, SR-9021), significantly reduce or even eliminate color formation or image stability through neutralization of the acid generated by the photoacid generator. Therefore, this technique is not preferred for use with the coating 100.

A preferred method to overcome oxygen inhibition is to increase the intensity of the curing light, such as using a high intensity pulsed source, such as the model RC-747 lamp available from Xenon Corporation of Woburn Mass. In preferred embodiments of pulsed UV curing, the energy of each flash of light is so intense that very high concentrations of free radicals are created. This approach produces enough free radicals so that the oxygen at the surface of the coating 100 is depleted and additional free radicals are available for curing. In this approach, energy intensity is an important factor to provide for instantaneous curing. More information on the effect of light intensity on curing and overcoming oxygen inhibition may be obtained by reference to a technical paper "Secrets of the Dark," produced by Fusion UV Systems, Inc. of Gaithersburg, Md.

The use of pulsed light has proven advantageous for curing of the coating 100 disclosed herein, because it provides high intensity light in a region of the spectrum that is compatible with the color formation process. Furthermore, use of pulsed light has reduced the oxygen inhibition problem greatly, so that nitrogen environments or excessive amounts of photoinitiators are not required while keeping curing time to as short a time as possible.

5. Colors and Imaging

A number of different color formers were explored for use in the coating 100. To provide for comparison of the color formers and their respective intensities, formulations were made by mixing a base coating of the original control formulation (45% SR494, 45% SR238, and 10% KTO/46). This coating base mixture was added at 94% to a 3% concentration of triphenylsulfonium triflate and a 3% concentration of the color former to be investigated. Since there was a wide-range of colors, absorbance peaks occurred at various wavelengths. FIG. 11 shows a typical curve recorded from the LAMBDA 2 UV-VIS spectrometer. Table 12 displays the significant results.

TABLE 12

Colorformer Experiment Results in SR494/SR238

| 3% Colorformer | nm peak | AU, nm peak 5 sec | AU, nm peak 10 sec |
|---|---|---|---|
| Copikem 16 Red | 540 | 0.3600 | 0.4607 |
| Copikem 6 Green | 440, 600 | 0.2069, 0.1722 | 0.2211, 0.1807 |
| Copikem 34 Black | 464, 586 | 0.2551, 0.2267 | 0.2757, 0.2448 |
| Pergascript Red I-6B | 540 | 0.4846 | 0.5729 |
| Pergascript Orange I-G | 493 | 0.1580 | 0.1600 |
| Pergascript Green I-2GN | 440, 602 | 0.1956, 0.1628 | 0.2290, 0.1862 |
| Pergascript Blue I-2RN | 613 | 0.0577 | 0.0677 |
| Pergascript Black I-2R | 460, 586 | 0.2871, 0.2553 | 0.2830, 0.2476 |
| BK-305 Black | 464, 586 | 0.2757, 0.2439 | 0.2730, 0.2350 |
| S-205 Black | 464, 586 | 0.3049, 0.2704 | 0.2975, 0.2623 |
| BK-400 | 464, 586 | 0.2605, 0.2314 | 0.2684, 0.2598 |
| Red 520 | 525 | 0.3070 | 0.4031 |

The reference to COPIKEM materials in Table 12 is considered to be illustrative of materials that may be introduced into formulations for the practice of these teachings. Practically, as these materials are no longer commercially available, these materials are not preferred. BK-305 Black, S-205 Black, BK-400 and Red 520 are color former materials available from Yamada Chemical Co., Ltd. Of Japan and Arlington, Va. Preferred embodiments include the use of various PERGASCRIPT color formers, the structure and formulations of these color formers being proprietary. However, examples of color forming materials that are suited for practice of these teachings are disclosed in U.S. Pat. No. 4,102,893, "Process for Manufacture of Color Formers of Indoles and Anhydrides of Aromatic or Heteroaromatic, Vicinal Dicarboxylic Acids, New Color Formers of These Classes of Substance and Their Use," Jul. 25, 1978, Garner et al. The disclosure of U.S. Pat. No. 4,102,893 is incorporated herein by reference in its entirety. For example, one color forming material disclosed in U.S. Pat. No. 4,102,893, that of the formulation in Table 1, the sixth compound down, was tested in accordance with some of the experiments set forth herein, and shown to have at least some of the desired properties of color forming materials.

These results show that the red color formers, COPIKEM 16 Red and PERGASCRIPT Red I-6B, produced the best color intensities. Therefore, preferred embodiments of the coating 100 use a red color former, although it should be recognized that the above color formers, and other color formers not discussed herein, can be used to produce adequate color formation.

Further experiments primarily used the PERGASCRIPT Red I-6B color former. It was noted that in some instances, that the solubility of some color formers became an issue when added at 3%. The black and green color formers exhibited some solubility problems in the coating base used, and therefore, these formulations were filtered, reducing their concentration to slightly below 3%. However, it is considered that further testing of the green and black color formers, perhaps with various coating base formulations, will likely produce improved results. In addition to the color formers in Table 12, PERGASCRIPT Yellow I-3R was tested. However, this color former exhibited some color formation upon curing, and therefore it is considered that effective use of PERGASCRIPT Yellow I-3R will require further investigation.

The base formulation of the coating 100 was then changed to formulation 3 (0.3% BYK-333, 10% KTO/46, 10% SR-238, 15% SR-285, 32.35% SR-494, and 32.35% SR-9020). The color formers that worked well were then tested again to ensure the color formation was the same. Color formation differed only slightly with the results shown in Table 13.

TABLE 13

Color former Experiment Results in Formulation 3

| 3% Colorformer | Nm peak | AU, nm peak 5 sec | AU, nm peak 10 sec |
|---|---|---|---|
| Pergascript Red I-6B | 540 | 0.4027 | 0.5289 |
| Pergascript Orange I-G | 493 | 0.1937 | 0.2186 |
| Pergascript Green I-2GN | 440, 602 | 0.2046, 0.1716 | 0.2126, 0.1704 |
| Pergascript Blue I-2RN | 613 | 0.0814 | 0.0899 |
| Pergascript Black I-2R | 460, 586 | 0.2636, 0.2404 | 0.3016, 0.2696 |
| Red 520 | 525 | 0.4044 | 0.4888 |

Tables 14 and 15 show that in the 3% color former, 3% photoacid generator and 94% base coating (formulation control or formulation 3, respectively) the intensity of some colors was higher than others. The intensity of the colors, however, was not fixed. It was considered that it should be possible to increase the color intensity through various methods, such as increasing the concentration of the photoacid generator and/or color former, and by adding color enhancers.

Modifications to color intensity were then investigated. First, the amount of color former, COPIKEM 16 Red, was increased from 3% to 6% and to 9%. This was done while keeping the amount of photoacid generator fixed at 3%, with the coating base of the control formulation making up the remainder of the mixture. Absorbance curves were obtained using the UV-VIS LAMBDA 2 spectrometer. The results shown in FIG. 20 depict the absorbance peaks at 540 nm.

Figure 20:
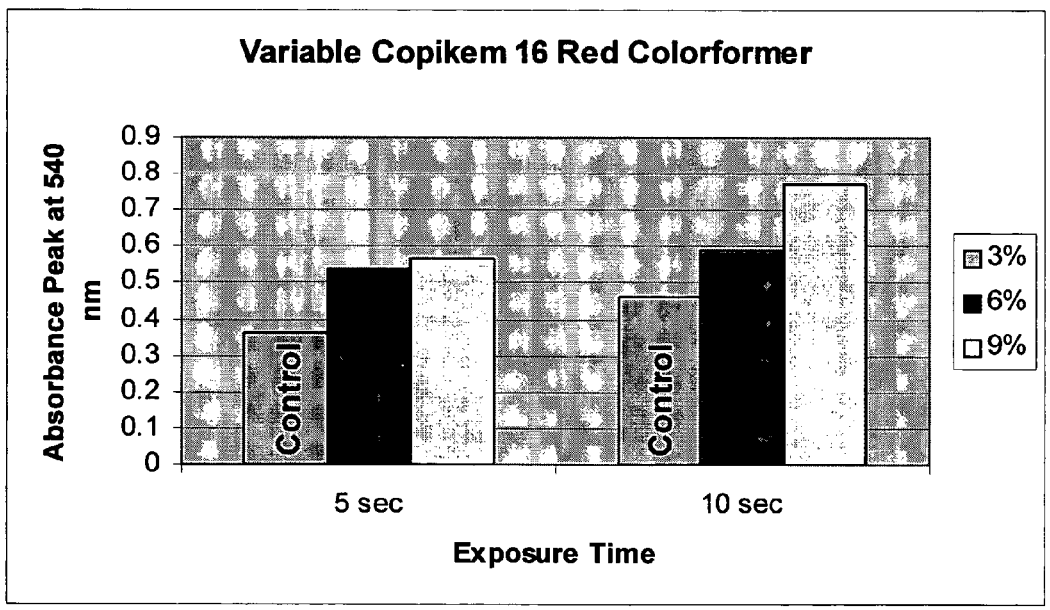
FIG. 20 depicts absorbance peaks at 540 nm for various concentrations of a color former.

From FIG. 20, it was possible to determine that the 9% COPIKEM 16 Red, 3% triphenylsulfonium triflate, and 88% coating base at 10 seconds exposure, exhibits the highest optical density (OD). Only up to 9% COPIKEM 16 Red was tested, however, at 10 seconds. The results demonstrated that, at least to some extent, it was possible to increase the intensity of the color by adding more color former. Since different color formers behave differently at the same loading, specific experiments with other color formers are warranted to further examine changes in color intensity. However, it is considered that similar changes in color intensity should be realized so long as the color formers used are soluble.

Figure 21:
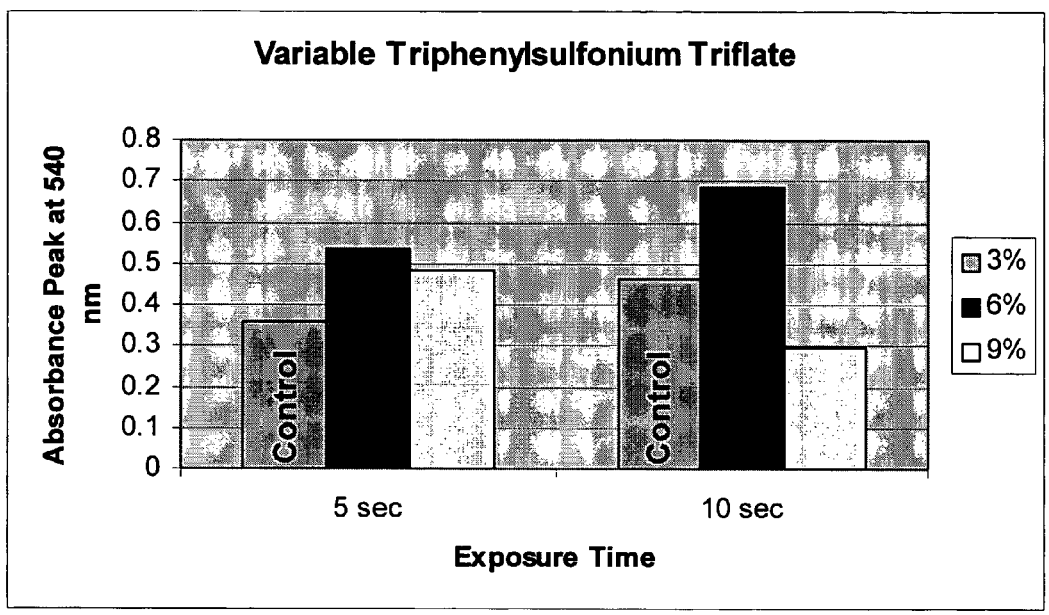
FIG. 21 depicts absorbance peaks at 540 nm for various concentrations of triphenyl sulfonium triflate.

In another experiment, the amount of photoacid generator was increased in the same manner as the color former experiment. FIG. 21 depicts effects in color intensity after increasing the amount of photoacid generator (in this experiment, triphenylsulfonium triflate was used) in the coating 100. FIG. 21 shows that the combination using 6% photoacid generator, 3% color former, and 91% coating base formulation, with an exposure time of 10 seconds, produced the most color. It may also be possible to increase the optical density (OD), in this case by adding more than the 6% photoacid generator. However, with 9% photoacid generator, the color intensity exhibited a marked decrease. For that reason, it might prove favorable to test concentrations of triphenylsulfonium triflate (TPST) between 6% and 9%. Overall, it appears that adding more color former than photoacid generator produces preferable results, and is more economic.

In a further experiment, photoacid generators and color formers were increased simultaneously at 6% and at 9%, with an 88% and 82% coating base, respectively. However, these formulations were not soluble and no further investigation was completed.

6. Environmental Influence

Initial studies performed showed that the coating 100 is susceptible to environmental influence. More specifically, the imaged or colored areas of the disks 10 fade upon significant exposure to humidity and temperature. Therefore, another study was performed to quantitatively measure color reduction resulting from environmental influence.

Eight different formulations were tested for color reduction and their formulations are shown in Table 14. (Note that formulations are generally identified and referred to herein according to the constituents of the base coating formulation). Samples of each formulation were spun coat onto three disks 10 for 15 seconds at 4000 rpm. The disks 10 were then cured under the L37 filter for 2 seconds in the presence of nitrogen. Half of each disk 10 was then exposed for 10 seconds. Absorbance curves of each disk 10 were taken prior to and after the test to reflect the average color reduction. The humidity and temperature test involved placing the disks into an environmental oven at 70° C. with 90% humidity for 96 hours.

TABLE 14

Formulations for Environmental Study I

| | Base Coat Formulation No. | | | | | | |
|---|---|---|---|---|---|---|---|
| | 3 | 10 | 14 | 44 | 45 | 46 | 47 |
| | | | | Formulation Name: | | | |
| | 9021 | 9020 | 3% 4TB | 454/355 | 5% KTO | 983 | 368 |
| COMPONENT | | | | | | | |
| Wetting Agent BYK-333 | 0.3 | 0.3 | 0.3 | 0.3 | 0.3 | 0.3 | 0.3 |
| Photoinitiator KTO/46 | 10 | 10 | 10 | 10 | 5 | 10 | 10 |
| Diluents | | | | | | | |
| SR-238 | 10 | 10 | 10 | 10 | 10 | 10 | 10 |
| SR-285 | 15 | 15 | 15 | 15 | 15 | 15 | 15 |
| SR-506 | | | | | | | |
| Main Components | | | | | | | |
| SR-494 | 32.35 | 32.35 | 32.35 | | | | |
| SR-9021 | 32.35 | | | | | | |
| SR-9020 | | 32.35 | 32.35 | | | | |
| SR-454 | | | | 32.35 | 34.85 | 27.35 | 27.35 |
| SR-368 | | | | | | | 10 |
| SR-355 | | | | 32.35 | 34.85 | 27.35 | 27.35 |
| CN-983 | | | | | | 10 | |
| CN-120 | | | | | | | |
| TOTAL | 100 | 100 | 100 | 100 | 100 | 100 | 100 |
| Photoacid generator | | | | | | | |
| TPST | 3 | 3 | | 3 | 3 | 3 | 3 |
| t-butylphenyl DPST | | | 3 | | | | |
| Color former | | | | | | | |
| Pergascript Red 6B | 3 | 3 | 3 | 3 | 3 | 3 | 3 |
| Fading % | 66.74 | 64.5 | 65.0 | 52.3 | 51.8 | 47.6 | 45 |
| Viscosity (cP) | 58.5 | 58.7 | | 72.0 | 67.8 | 109.9 | 90.7 |

Figure 22:
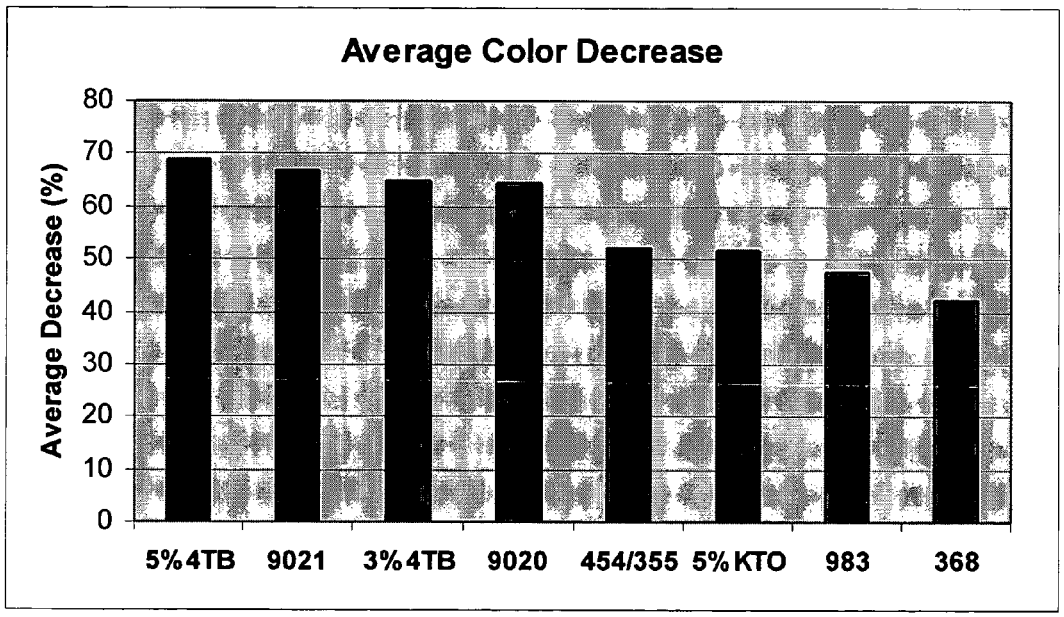
FIG. 22 average color decrease in a first environmental study.

The test results shown in FIG. 22 demonstrate that some formulations retain their color better than others in the presence of temperature and humidity. Specifically, the addition of non-alkoxylated monomers such as SR-355 (formulation 14), CN-983 (formulation 45), and SR-368 (formulation 46) all increase performance. This could be as a result of decreased alkoxy content (decreased hydrophilicity), and increased Tg or crosslink density. The use of the tert butyl derivative of triphenylsulfonium triflate (TPST) or higher concentrations of the photoacid generator did not impact performance significantly.

A second set of formulations were designed and prepared to expand upon the previous observations. The second set is described in Table 15. All base components were added and mixed before the addition of the photoacid generator and color former. Components SR-368, CN-983 and CN-120 were liquefied on a hot plate prior to addition. Once the base components were mixed and homogeneous, 3% photoacid generator was added to each batch. Formulations 53, 55 and 57 would not go in to solution and these batches were discarded. Components of the formulation based on the base coating formulation 10 did not dissolve as readily as others, but these did eventually go in to solution. Once all of the photoacid generator was dissolved, the color former was added to an amount of 3% total weight for each batch. All formulations went in to solution without difficulty, and there were no mixing issues with the addition of color former. Each formulation was then filtered through a 5 micron nylon syringe filter. Initially, all formulations had a pale to light rose or yellow color.

SR-506 is isobornyl acrylate, which is an excellent reactive diluent for oligomers. CN-120 is a difunctional bisphenol A based epoxy acrylate. Both are products of Sartomer Corporation.

Five clear polycarbonate disks 10 were coated by hand with each formulation. Each disk 10 was then cured under a Xenon pulse lamp at a distance of about 5 inches using a nitrogen environment and an L-37 filter. Formulation 56 was extremely thick but coated nicely. Formulation 10 cured in 2 seconds. The remaining samples of formulations were cured for 4 seconds as they contained only 5% photo-initiator. Half of each disk 10 was then exposed under the lamp for 10 seconds to form a red color. All disks 10 were subsequently scanned (both cured and exposed sides) using a UV-Spectrometer to measure the optical density at 540 nm.

TABLE 15

Formulations for Environmental Study II

| Component | 10 9020 | 48 355-5% | 49 355-Tego | 50 983 | 51 368-1 | 52 368-2 | 53* 368-3 | 54 368-4 | 55* 506-1 | 56** 506-2 | 57* 506-3 | 58 120-1 | 59 120-2 |
|---|---|---|---|---|---|---|---|---|---|---|---|---|---|
| Wetting Agent |  |  |  |  |  |  |  |  |  |  |  |  |  |
| BYK-333 | 0.3 | 0.3 |  |  |  |  |  |  |  |  |  |  |  |
| TEGO RAD 2200 N |  |  | 1 | 1 | 1 | 1 | 1 | 1 | 1 | 1 | 1 | 1 | 1 |
| Photoinitiator |  |  |  |  |  |  |  |  |  |  |  |  |  |
| KTO/46 | 10 | 5 | 5 | 5 | 5 | 5 | 5 | 5 | 5 | 5 | 5 | 5 | 5 |
| Diluents |  |  |  |  |  |  |  |  |  |  |  |  |  |
| SR-238 | 10 | 10 | 10 | 15 | 15 | 24 | 10 | 50 | 10 | 10 | 10 | 15 | 20 |
| SR-285 | 15 | 15 | 14 | 15 | 15 |  |  |  |  |  |  | 15 |  |
| SR-506 |  |  |  |  |  |  | 50 |  | 24 | 24 | 24 |  | 14 |
| Main Components |  |  |  |  |  |  |  |  |  |  |  |  |  |
| SR-494 | 32.35 |  |  |  |  |  |  |  |  |  |  | 22 |  |
| SR-9021 |  |  |  |  |  |  |  |  |  |  |  |  |  |
| SR-9020 | 32.35 |  |  |  |  |  |  |  |  |  |  | 22 |  |
| SR-454 |  | 34.85 | 35 | 22 | 22 | 40 |  |  | 35 | 25 | 25 |  |  |
| SR-368 |  |  |  |  | 20 | 30 | 44 | 44 |  |  | 20 |  |  |
| SR-355 |  | 34.85 | 35 | 22 | 22 |  |  |  | 35 | 25 | 25 |  | 30 |
| CN-983 |  |  |  | 20 |  |  |  |  |  | 40 |  |  |  |
| CN-120 |  |  |  |  |  |  |  |  |  |  |  | 20 | 30 |
| TOTAL | 100 | 100 | 100 | 100 | 100 | 100 | 110 | 100 | 110 | 130 | 110 | 100 | 100 |
| Photoacid |  |  |  |  |  |  |  |  |  |  |  |  |  |
| TPST | 3 | 3 | 3 | 3 | 3 | 3 | 3 | 3 | 3 | 3 | 3 | 3 | 3 |
| t-butylphenyl DPST |  |  |  |  |  |  |  |  |  |  |  |  |  |
| Colorformer |  |  |  |  |  |  |  |  |  |  |  |  |  |
| Pergascript Red 6B | 3 | 3 | 3 | 3 | 3 | 3 | 3 | 3 | 3 | 3 | 3 | 3 | 3 |
| Fading % | 56.95 | 43.22 | 49.42 | 48.19 | 45.85 | 41.92 |  | 44.04 |  | 44.46 |  | 54.25 | 21.01 |
| Viscosity (cP) | 56.7 | 65 | 68 | 113.4 | 82.8 | 106.7 |  | 72.6 |  | 385 |  | 116.5 | 370.9 |
| Optical Density | 0.42 | 0.49 | 0.50 | 0.62 | 0.56 | 0.61 |  | 0.61 |  | 0.75 |  | 0.65 | 0.79 |
| Film Thickness (um) | 3.6 | 3.9 | 3.7 | 4.6 | 4.6 | 4.5 |  | 4.8 |  | 8.9 |  | 5.0 | 8.9 |

*Remained insoluble even after addition of 238
**Did not cure well

Figure 23:
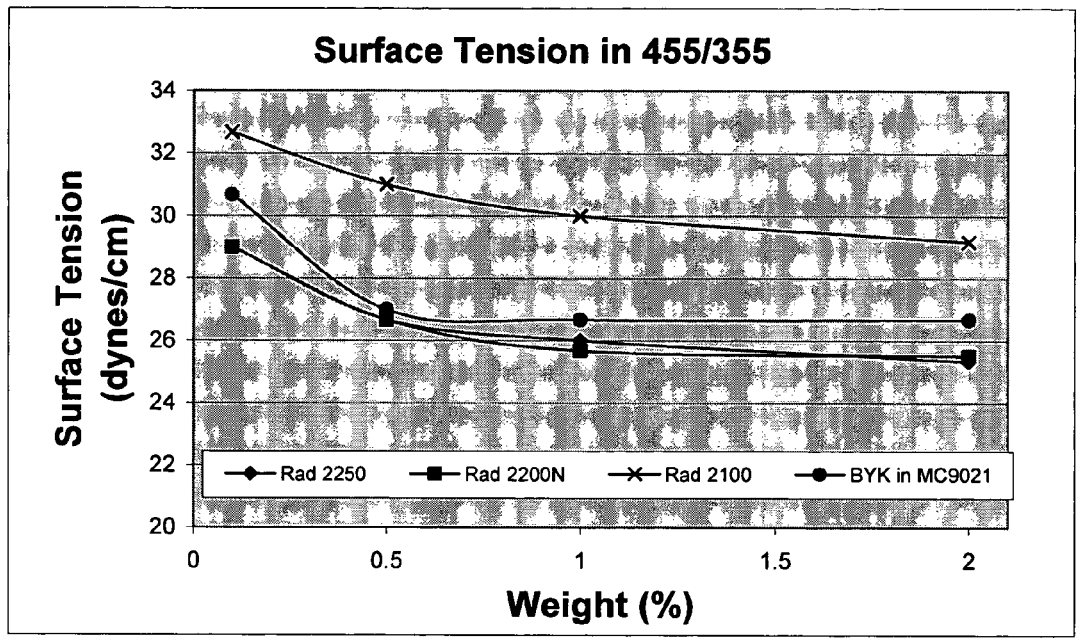
FIG. 23 depicts reductions in surface tension as a function of concentrations of various wetting agents.

This study also evaluated changing the wetting agent from BYK-333 to a crosslinkable siloxane. Several candidate reactive wetting agents were examined, including three RAD products from TEGO (RAD 2250, RAD 2200N, RAD2100). The performance of these products was examined using formulation 48. TEGO RAD 2200N was selected as it gave the best surface tension reduction and clarity performance. Results of the examination are shown in FIG. 23. TEGO RAD 2250 and RAD 2200N are each a crosslinkable silicone polyether acrylate, while TEGO RAD 2100 is a crosslinkable silicone acrylate. TEGO products are available from Tego Chemie Service GmbH, and distributed in the United States by Degussa Tego Coating & Ink Additives of Hopewell, Va.

Figure 24:
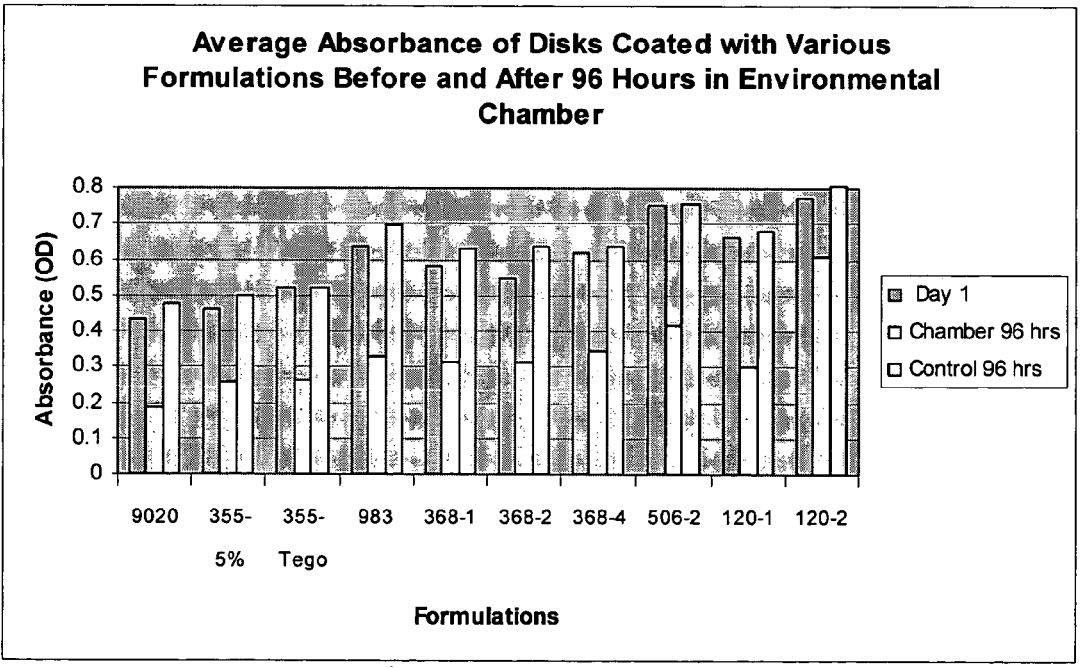
FIG. 24 depicts average absorbance of various formulations after environmental testing.
Figure 25:
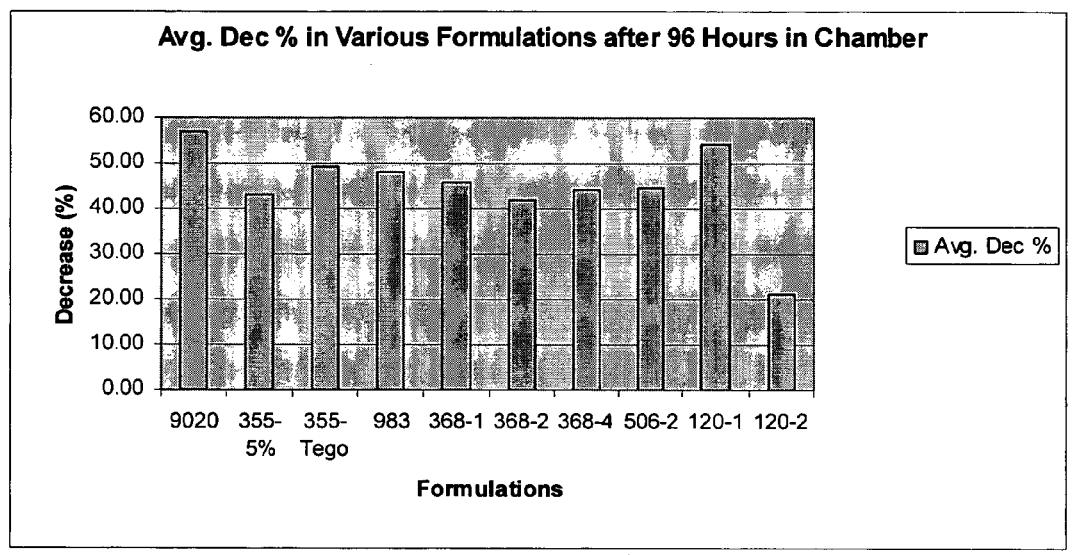
FIG. 25 depicts average decrease in optical density for various formulations after environmental testing.

Three discs 10 of each formulation were placed in an environmental chamber for 96 hours, at 70° C. and 100% relative humidity. Disks 10 containing formulations 4 and 5 were stored in an opaque disk container as controls. Once the disks 10 were removed from the chamber, all disks 10 of each formulation (10, 48-51) were again scanned at 540 nm to measure any differences in optical density. Comparative data is provided in FIGS. 24 and 25.

From the data, it was clear that variation of the viscosity played a role in film thickness and the color generated for a constant exposure. Therefore, it is considered that color reduction is not necessarily a clear indicator of performance since a thicker, and therefore darker coating 100, may fade more but still retain more color than a thin application of the coating 100. However, to a first approximation, the percentage color reduction is an indicator of the relative stability of the imaging chemistry in the particular matrix.

Formulation 59, based on bisphenol A diacrylate and SR-355 (Di-TMPTA), was considered to exhibit the best performance from the group tested. Once applied, a coating 100 formed from formulation 59 should be highly crosslinked, high Tg, film with no alkoxylation. All the remaining formulations contained significant amount of alkoxylated monomers which lead to lower Tg's, hydrophilicity, and possibly basic environments. Accordingly, a third set of formulations was designed to explore the CN-120 formulation and the effect of alkoxylation on image stability.

The best non-CN-120 containing formulations were tested side by side with a series of CN-120 formulations. Aspects of the compositions of these formulations, and their respective performance, are depicted in Table 16. Also tried was CN-132, a low viscosity aliphatic diacrylate manufactured by Sartomer Corporation. Finally, CN-983, an aliphatic urethane acrylate was tested to determine if it could be used like CN-120. The results show that only the CN-120 formulations give the outstanding image retention. Of particular interest was formulation CN-120-4, the only formulation to use an alkoxylated monomer, SR-454. The formulation did not perform well, again indicating alkoxylation as a negative for image retention. CN-132 as a rule failed, and the CN-983 formulation did not give results like CN-120. CN-132 is a low viscosity aliphatic diacrylate oligomer, and is a product of Sartomer Corporation.

From this study, formula 61 was selected for further development because it gave an excellent combination of cure speed, film hardness, and outstanding image stability. The CN-120 and SR-368 monomers were difficult to work with, so liquid versions CN-120-B60 (60% CN-120 in SR-238) and SR-368D (approximately 85% SR-368 in TMPTA) were substituted for ease of handling and subsequent manufacturing.

TABLE 16

Formulations for Environmental Study III

| | Base Coating Fomulation No. | | | | | | | | | | | | |
|---|---|---|---|---|---|---|---|---|---|---|---|---|---|
| | 49 | 60 | 58 | 59 | 61 | 62 | 63 | 64 | 65 | 66 | 67 | 68 | 69 |
| | Formulation Name | | | | | | | | | | | | |
| Component | 355/454 | 355/454-2 | 120-1 | 120-2 | 120-3 | 120-4 | 120-5 | 132-1 | 132-2 | 132-3 | 132-4 | 132-5 | 983-1 |
| Wetting Agent | | | | | | | | | | | | | |
| TEGO RAD 2200 N | 1 | 1 | 1 | 1 | 1 | 1 | 1 | 1 | 1 | 1 | 1 | 1 | 1 |
| Photoinitiator | | | | | | | | | | | | | |
| KTO/46 | 5 | 5 | 5 | 5 | 5 | 5 | 5 | 5 | 5 | 5 | 5 | 5 | 5 |
| Diluents | | | | | | | | | | | | | |
| SR-238 | 10 | 24 | 20 | 34 | 34 | 34 | 44 | 24 | 30 | 30 | 40 | 40 | 44 |
| SR-285 | 14 | | | | | | | | | | | | |
| SR-506 | | | 14 | | | | | | | | | | |
| Main Components | | | | | | | | | | | | | |
| SR-454 | 35 | 20 | | | | 30 | | | | | 20 | | |
| SR-368 | | | | | 30 | | | | | | | 20 | |
| SR-355 | 35 | 50 | 30 | 30 | | | | 35 | 14 | 50 | | | |
| CN-983 | | | | | | | | | | | | | 50 |
| CN-120 | | | 30 | 30 | 30 | 30 | 50 | | | | | | |
| CN-132 | | | | | | | | 35 | 50 | 14 | 34 | 34 | |
| TOTAL | 100 | 100 | 100 | 100 | 100 | 100 | 100 | 100 | 100 | 100 | 100 | 100 | 100 |
| Photoacid | | | | | | | | | | | | | |
| TPST | 3 | | 3 | 3 | 3 | 3 | 3 | 3 | 3 | 3 | 3 | 3 | 3 |
| t-butylphenyl DPST | | | | | | | | | | | | | |
| Colorformer | | | | | | | | | | | | | |
| Pergascript Red 6B | 3 | | 3 | 3 | 3 | 3 | 3 | 3 | 3 | 3 | 3 | 3 | 3 |
| Fading % | 57 | 56 | 30 | 36 | 22 | 52 | 31 | 57 | 69 | 53 | 69 | 68 | 51 |
| Viscosity (cP) | 66 | 96 | 375 | 315 | 504 | 177 | 330 | 197 | 162 | 112 | 67 | 116 | 260 |
| Optical Density | 0.45 | 0.50 | 0.63 | 0.59 | 0.60 | 0.56 | 0.55 | 0.58 | 0.60 | 0.50 | 0.42 | 0.54 | 0.68 |
| Film Thickness (um) | 3.7 | 4.3 | 7.8 | 6.9 | 9.3 | 5.3 | 8.9 | 5.7 | 4.3 | 4.0 | | | 6.5 |

Could not remove film from 67, 68

Optical denisties all measured after same exposure interval

The final development of the CN-120 formulation coincided with the initiation of an effort to reduce the sensitivity of the coating to sunlight and fluorescent lighting by the optimization of the photoacid generator concentration and addition of UV absorbers (the addition of UV absorbers is described further elsewhere herein). Accordingly, a fourth environmental study included several formulations which varied photoacid generator concentration and UV absorber concentration for subsequent light exposure testing. Aspects of the compositions of these formulations are presented in Table 17.

In addition, two spin speeds (4 k and 6K) were used to examine the effect of varying the coating 100 thickness on image stability. In addition to being darker, it was expected that thicker film of the coating 100 would give better color retention in the environmental testing. The formulations without UV absorbers were prepared as before, which included being cured for two seconds in a nitrogen environment, with a L37 filter glass under the XENON "C" bulb at a distance of about 1 inch. The disks 10 were imaged by illumination for about 10 seconds at a distance of about 5 inches. Formulations with UV blockers were imaged for a total of about 30 seconds (15 seconds×2 imaging sessions), also at a distance of about 5" from the lamp. These formulations were given a longer exposure time due to their slower color formation time.

The results show that substitution of the liquid components (CN-120-B60 and SR-368D) have substantially little effect on image stability or color formation at either 2% or 3% loadings of the photoacid generator. It was noted that a lower photoacid generator concentration did appear to give better percentage of color retention, although the higher loadings lead to more intense color at all times. The addition of UV stabilizers appeared to lead from substantially little degradation of environmental stability (at 5% loading) to mild degradation of environmental stability (at 10% loading). However, the ultimate color of these formulations was less intense.

SR-368D, is tris (2-hydroxy ethyl) isocyanurate triacrylate, and is a clear liquid triazin compound which is used in free radical polymerization. CN120B60 is a difunctional bisphenol A based epoxy acrylate blended with 40% SR-238, hexane diol diacrylate. CN120B60 provides a good balance of water properties and high reactivity. Both are products of Sartomer Corporation.

TABLE 17

Formulations for Fourth Environmental Study

| | Base Coating Fomulation No. | | | | | | | | | |
|---|---|---|---|---|---|---|---|---|---|---|
| | 70 | 71 | 72 | 73 | 74 | 75 | 76 | 77 | 78 | 79 |
| | | | | | Formulation Name: | | | | | |
| Component | Base-2 | Base-3 | 368D3 | 368D2 | 368D1.5 | UV1 | UV2 | UV3 | UV4 | UV5 |
| Wetting Agent | | | | | | | | | | |
| TEGO RAD 2200 N | 1 | 1 | 1 | 1 | 1 | 1 | 1 | 1 | 1 | 1 |
| Photoinitiator | | | | | | | | | | |
| KTO/46 | 5 | 5 | 5 | 5 | 5 | 5 | 5 | 5 | 5 | 5 |
| UV Blockers | | | | | | | | | | |
| UV-24 | | | | | | 5 | | 2.5 | 5 | 10 |
| MC80 | | | | | | | 5 | 2.5 | 5 | |
| Diluents | | | | | | | | | | |
| SR-238 | 18 | 18 | 18 | 18 | 18 | 13 | 13 | 13 | 14 | 14 |
| Main Components | | | | | | | | | | |
| SR-368 | 10 | 10 | | | | | | | | |
| SR-368D | | | 10 | 10 | 10 | 10 | 10 | 10 | 10 | 10 |
| CN-120 | | | | | | | | | | |
| CN120B60 | 66 | 66 | 66 | 66 | 66 | 66 | 66 | 66 | 60 | 60 |
| TOTAL | 100 | 100 | 100 | 100 | 100 | 100 | 100 | 100 | 100 | 100 |
| Photoacid | | | | | | | | | | |
| TPST | 2 | 3 | 3 | 2 | 1.5 | 2 | 2 | 2 | 2 | 2 |
| Colorformer | | | | | | | | | | |
| Pergascript Red 6B | 3 | 3 | 3 | 3 | 3 | 3 | 3 | 3 | 3 | 3 |
| Absorbance | | | | | | | | | | |
| 4K | 0.38 | 0.5 | 0.5 | 0.38 | 0.25 | 0.33 | 0.55 | 0.43 | 0.25 | 0.23 |
| 6K | 0.32 | 0.47 | 0.43 | 0.31 | 0.22 | 0.33 | 0.43 | 0.38 | 0.25 | 0.23 |
| Fading % | | | | | | | | | | |
| 4K | 19.3 | 25.5 | 25 | 26 | 16.3 | 22.3 | 27.2 | 24.1 | 30.5 | 38.6 |
| 6K | 27 | 40 | 40 | 30 | 29 | 28 | 36 | 34 | 39 | 35 |

2 seconds under L37 Xenon "C" lamp with nitrogen environment, imaged for 10 seconds at 5 inches, UV blockers 30 sec (15 × 2)

7. Triethyl Amine Fading Study

It was noted that the exposed color of the formulation based on SR-9021 (formulation 3) faded when in a basic environment. This was first realized when coated commercial disks were put back into their original packaging. Due to the basic nature of the paper and/or inks, the acid in the coating 100 that turns on the color neutralized thus making the color fade drastically. Another problem was noted when labels produced in an ink jet printer were put onto the label side of a coated disk 10 and into a storage case. Again, the images faded. Therefore, to quantitatively measure the amount of fading, a test was devised where a coated disk 10 would be put into the presence of triethyl amine (TEA) to simulate a basic environment. The disks 10 could then be measured to reveal the amount of fading.

Five disks 10 having a coating base including SR-9021 were spun coat, cured, and exposed for 10 seconds with L37 filter and nitrogen. Absorbance curves for each of the disks 10 were collected. The disks 10 were then put into storage cases 180 where filter paper 181 was placed in the open corners and center, as FIG. 26 shows.

Figure 26:
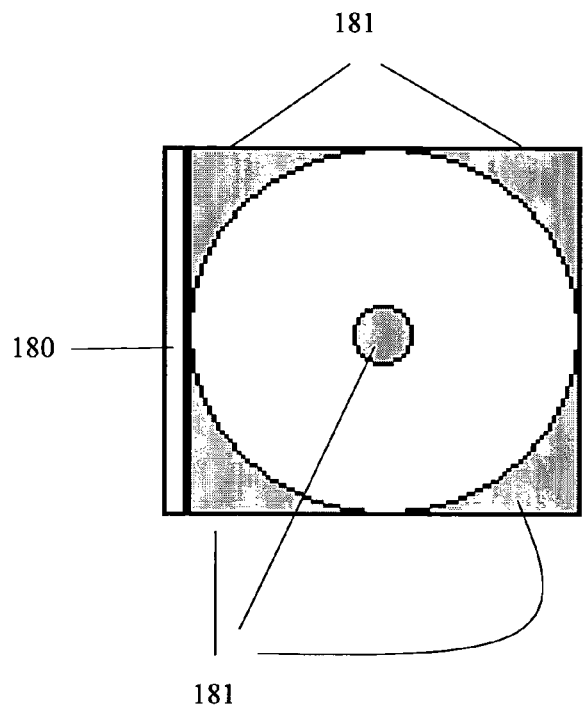
FIG. 26 depicts a storage case laden with filter paper.

FIG. 26 depicts a typical storage case 180 for an optical media wherein the grey areas denote locations where filter paper 181 was placed. One hundred μL of triethyl amine was deposited onto each section of the filter paper 181. Each case 180 was then closed and put into a dark drawer for 2 hours, after which time absorbance curves were taken to determine the amount of fading that had taken place.

Figure 27:
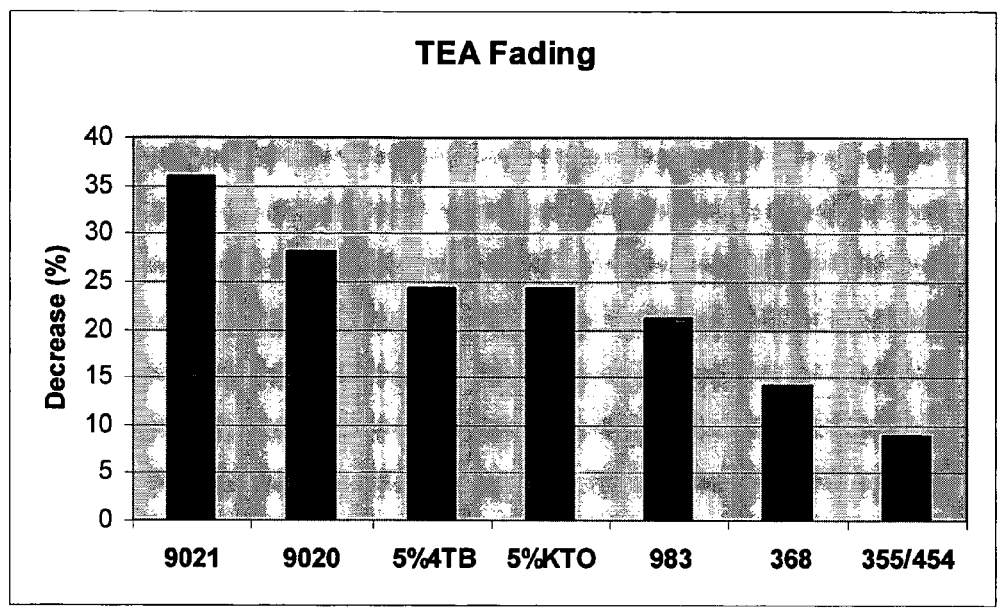
FIG. 27 depicts fading in color resulting from TEA exposure.

The results showed that the average amount of fading in the formulation tested was 36.0%. Since this was considered to be less than desired, other formulations were examined to determine if better results could be achieved. The formulations tested were based on 9020, 355/454, 5% 4TB, 5% KTO, 368, and 983 and the results are shown in FIG. 27. Note that all the formulations have 3% triphenylsulfonium triflate present except for 5% 4TB, which has 5% (4-tert-butylphenyl) diphenyl sulfonium triflate. FIG. 27 shows that some formulations are more resistant to fading in a basic environment, and that they generally trend with the environmental performance

8. Accelerated Light Testing

It was noted that the background color of the discs 10 having a coating 100 containing 9020 turned slightly red over time when in the presence of fluorescent room light. Therefore, another set of experiments was devised to evaluate the effect of ambient lighting upon images in the coating 100.

First, a test fixture consisting of a four foot long two-bulb fluorescent lamp fixture was fabricated. The lamp used was a Philips ECON-O-WATT F40-CW 37 watt, from Philips Lighting Co. of NJ. The fluence produced was approximately 250 mw/m$^2$ in the UV-A band, as measured by commercially available equipment.

Figure 28:
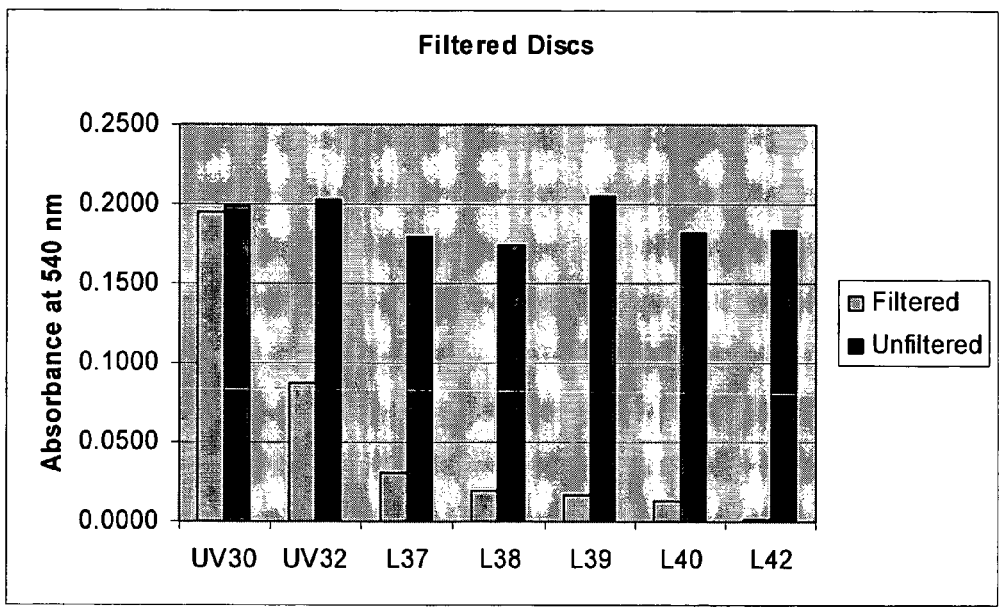
FIG. 28 depicts the development of color as a function of exposure wavelength.

To examine which wavelengths of light most effected background color formation, a set of discs 10 were prepared using formulation 10, based upon SR-9020. The discs 10 were cured and left unexposed to imaging wavelengths. The discs 10 were then set under the fluorescent light fixture with a portion of each disc 10 covered by a 2"×2" filter glass to determine which wavelengths of light led to the greatest color formation. The discs 10 were then exposed to develop about 0.2 AU in an uncovered region. As shown in FIG. 28, the most damaging wavelengths appear to have been below about 370 nm, with wavelengths below about 320 nm being the most problematic. This seemed to indicate that the UVB portion of the spectrum was the bandwidth where UV protection would be most beneficial. FIG. 28 depicts results of illuminations, where UV-30, L-37, L-38, L-39, L-40 and L-42 denotes model names for commercially available UV filters from HOYA Corporation of Tokyo Japan.

In general, the name of the cutoff filter describes the 50% transmission point. For example, the UV-30 filter, which is rated for wavelengths at 300 nm, has a 50% transmission point at 300 nm. It is recognized that the 50% transmission point is approximate and can move slightly with thickness, so a thin piece of a L-37 filter might look very similar to a thick piece of UV-36, etc. So, while a 1 mm thick L-37 is generally preferred for applications herein, (having about 50% transmission at 370 nm), a thicker UV-36 filter can also work well, as well as a UV-34 filter in addition to some of the other filters. UV-32 is considered to be at about the lower limit, and above UV-39, curing becomes slow. Therefore, preferred cutoff filters provide for 50% transmission between about 320 nm to about 380 nm, and, most preferably, between about 340 nm to about 370 nm.

In an effort to fix color formation by background light, photoabsorptive materials were added to samples of the formulation to see if color formation would slow or cease when the samples were subjected to ambient room light. For the formulations being studied, the photoabsorptive materials selected for testing were UV absorbers. The UV absorbers used were TINUVIN 327, TINUVIN 171, TINUVIN 213, and TINUVIN 571. TINUVIN 327 is 2,4-di-tert-butyl-6-(5-chlorobenzotriazol-2-yl) phenol; TINUVIN 171 is (2-(2H-benzotriazol-2-yl)-6-dodecyl-4-methyl-phenol); TINUVIN 213 is a mixture of reaction products of methyl 3-(3-(2H-benzotraizole-2-yl)-5-t-butyl-4-hydroxyphenyl) proprionate/PEG 300; and TINUVIN 571 is branched and linear 2-(2H-benzotriazol-2-yl)-6-dodecyl-4-methylphenol. The TINUVIN products are produced by Ciba Specialty Chemicals.

Figure 29:
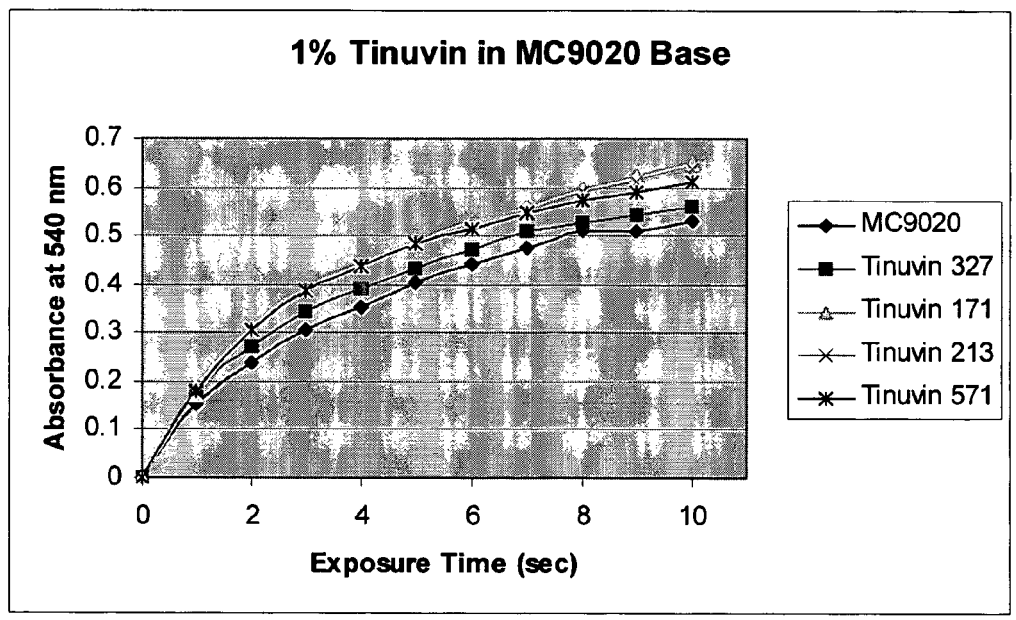
FIG. 29 depicts development of color in samples containing UV absorbers.

Each of the samples of TINUVIN were in liquid form, with the exception of TINUVIN 327 which was a powder. Testing was performed by adding one percent of each UV absorber to formulation 10, except one sample was made with 5% TINUVIN 171. However, since the point of the UV absorbers was to slow color formation, another step was performed to ensure that each sample could still produce enough color when imaged. FIG. 29 shows that the samples produced adequate color. In fact, samples incorporating UV absorbers produced more color than the sample without any UV absorbers (denoted as MC9020 in FIG. 29). Color formation in the sample containing 5% TINUVIN 171 was not confirmed, but a quick check was performed after 10 seconds of exposure, and showed that the absorbance at 540 nm was 0.40 OD.

Three cured (background color) disks 10 of each formulation were then illuminated by the fluorescent light test fixture. Absorbance curves were collected for the samples before the start of illumination, and throughout the test, usually daily, to monitor the background color formation. The condensed results are shown in FIG. 30, which depicts effects of adding UV absorbers as determined in an accelerated fluorescent light study.

Figure 30:
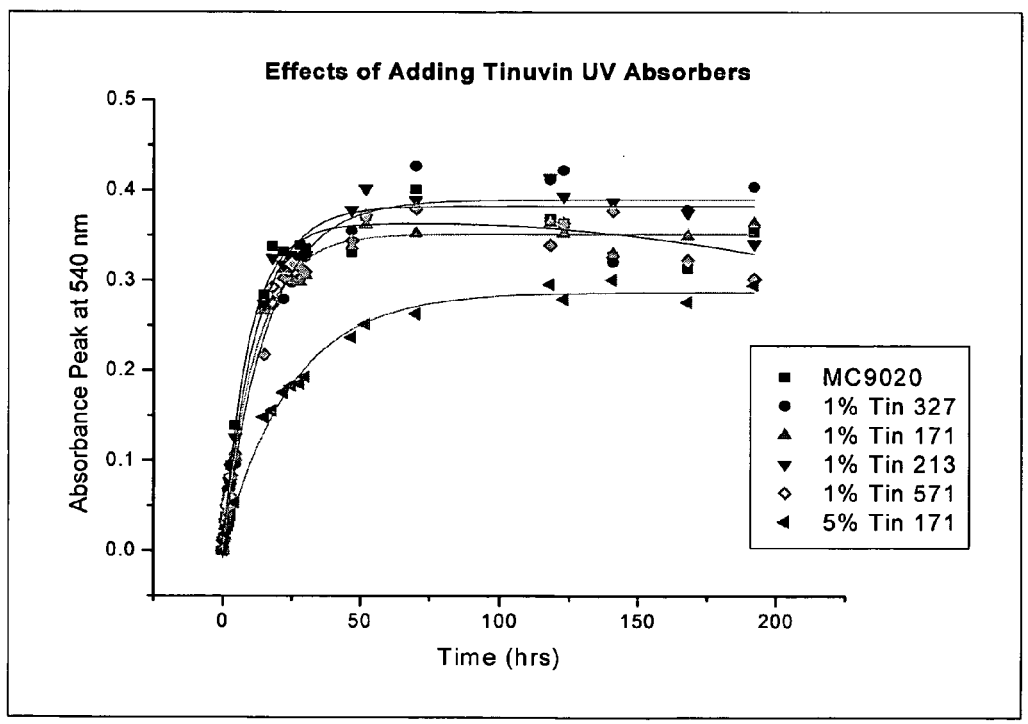
FIG. 30 depicts the effect of adding UV absorbers on color generation.

FIG. 30 shows some types of TINUVIN work better than others but the comparative difference at 1% concentration is minimal. The sample containing 5% concentration of TINUVIN 171 exhibited better performance at reducing the color formation, but the difference was considered to be only a moderate effect. Use of the 5% concentration also caused a significant increase in the writing time required to produce an image. Attempts were made to prepare a formulation containing 10% of TINUVIN 171, however, the materials bloomed after curing (displayed color formation without exposure to an imaging light). The sample containing a 5% concentration of TINUVIN 171 showed the same effect after a longer time.

Therefore, TINUVIN 171 was ruled out as most likely not being a good candidate for use as a UV absorber.

Combined with results from environmental testing, UV absorbers were tested in what was becoming the preferred formulation, one based upon CN-120 and SR-368. A series of three UV absorbers were used at 5% loading as shown in Table 18. Discs 10 were coated with formulation 80-82 by spincoating at a speed of 6K rpm, cured for two seconds about one inch away from the lamp, in a nitrogen environment. The discs 10 were exposed through a L37 filter for ten seconds, also about one inch away from the lamp. These discs 10 were compared to the base 9020 formulation without stabilization.

TABLE 18

Formulations for Testing of UV Absorbers

| COMPONENT | 80 MC80 | 81 UV-24 | 82 UV-531 |
|---|---|---|---|
| TEGO RAD 2200 N | 1 | 1 | 1 |
| KTO/46 | 5 | 5 | 5 |
| SR-238 | 44 | 44 | 44 |
| SR-368 | 10 | 10 | 10 |
| CN-120 | 40 | 40 | 40 |
| TOTAL | 100 | 100 | 100 |
| MC80 | 5 | | |
| UV24 | | 5 | |
| UV-531 | | | 5 |
| TPST | 2 | 2 | 2 |
| Perg I-6B | 3 | 3 | 3 |

UV-24 is the shortened name for CYASORB UV-24, which is 2,2'-dihydroxy-4-methoxybenzophenone. UV-531 is the shortened name for CYASORB UV-531 FLAKE, which is 2-Hydroxy-4-n-octoxybenzophenone. Both are products of Cytec Corporation of Stamford, Conn. MC80 is the shortened name for UVINUL MC80, which is octyl methoxycinnamate, and is a product of BASF Corporation of Japan.

Figure 31:
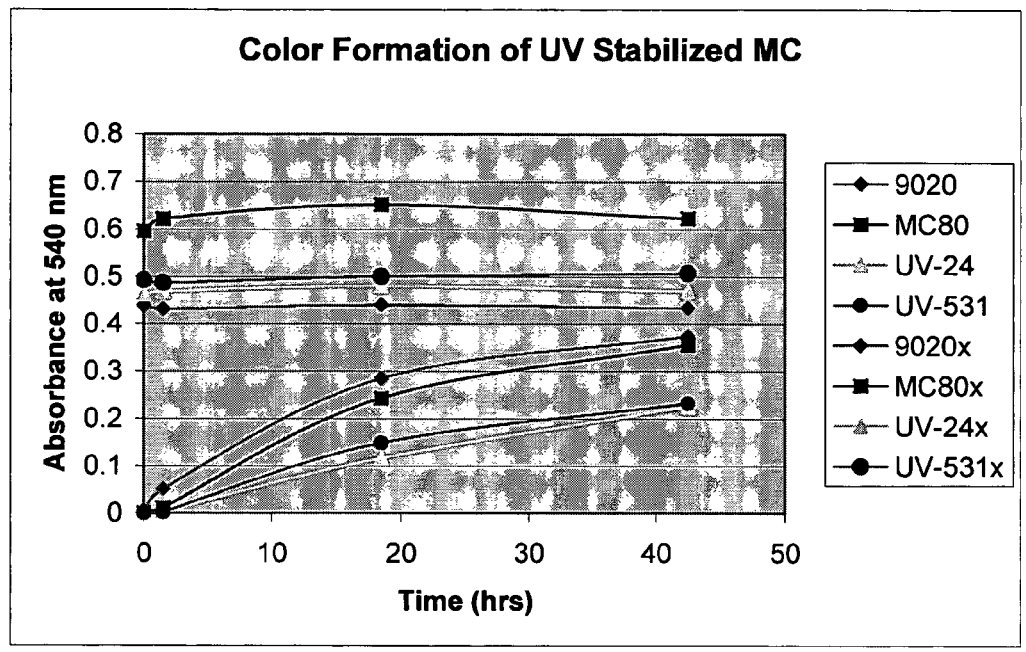
FIG. 31 depicts color formation in UV stabilized formulations.
Figure 32:
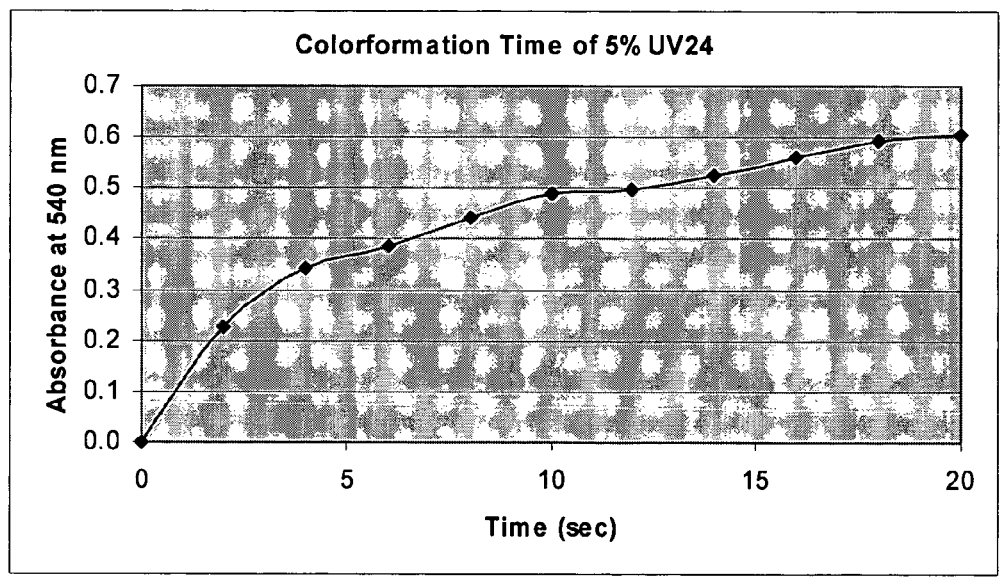
FIG. 32 depicts color formation in a particular sample of a UV stabilized formulation.

The UV stabilized formulations exhibited slower color formation times with lower ultimate colors for equivalent UV dose compared to unstabilized formulations. Results are depicted in FIG. 31. However the longer color formation time (or higher fluence) was considered to be outside of the required cycle time for the manufacturing specification. Furthermore, the high fluence rates required to write into these coatings caused some undesired physical deformations (such as shrinkage and warp), as well as differences in the properties of the coating between exposed and unexposed areas. As an example, the color formation time of formulation 81 is shown in FIG. 32. Even at about one inch away from the XENON lamp, exposure times of more than ten seconds were required to obtain color formation greater than 0.5 AU.

9. Photoacid Generators Reexamined

Figure 33:
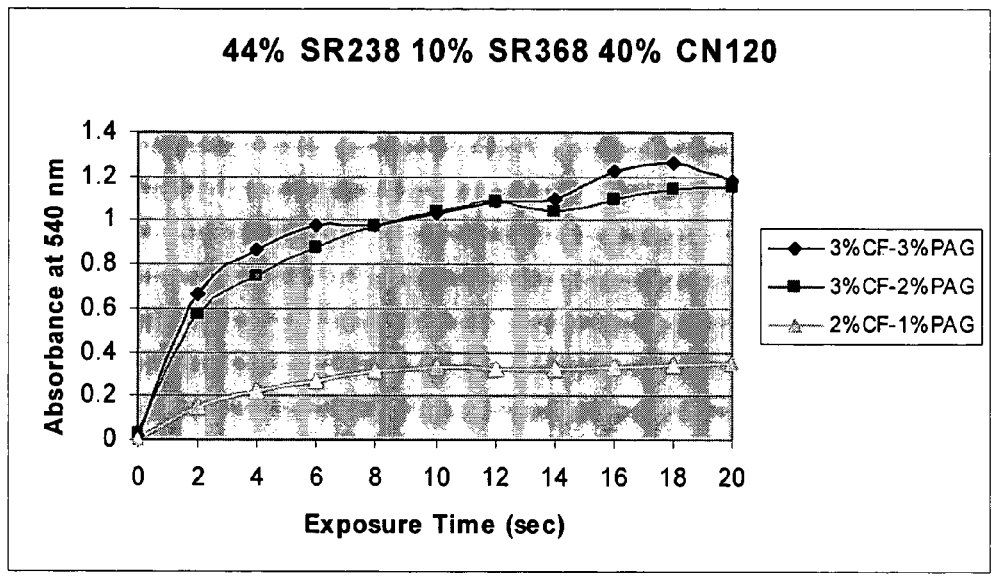
FIG. 33 depicts results of a study adjusting ratios of color former and photoacid generators.

Since the addition of UV absorbers directly into the coating 100 was causing long writing times for only minimal gain in light stability, re-examination of various photoacid generators and their concentrations was undertaken. It was noted that higher concentrations of photoacid generators tended to lead to faster writing times for a fixed color former concentration. It was considered that the photoacid generator could potentially be controlled to provide for generation of a desired color level in an acceptable cycle time. However, for various reasons (including economic), use of a minimal amount of photoacid generators was desired. One of the first steps was to optimize color formation versus a ratio of photoacid generator to color former and coating 100 thickness. Results of a study are depicted in FIG. 33, and show that a ratio of 3:2 colorformer:TPST is preferable over a 1:1 ratio.

Figure 34:
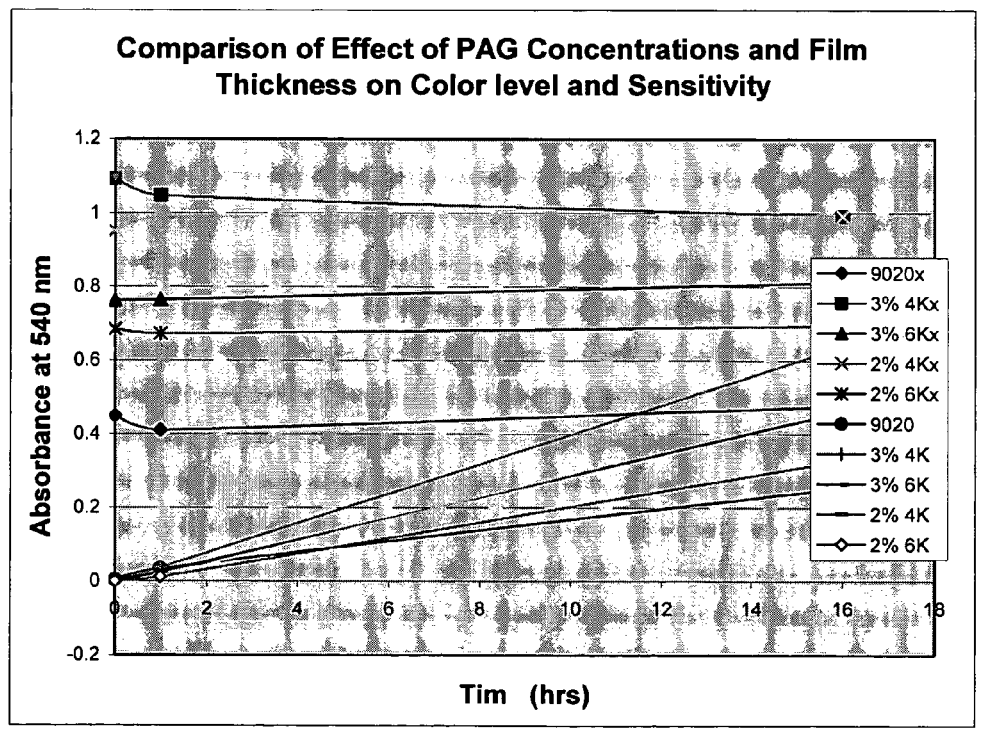
FIG. 34 depicts color level and sensitivity as a function of photoacid generator concentration and film thickness.

Results of a study (shown in FIG. 34) shows that the thickness of the coating 100 plays a role in color formation and light sensitivity. In the study, samples of a formulation were coated onto discs 10 by spincoating at 4K rpm and 6K rpm. This resulted in coatings 100 of different thicknesses. Discs 10 were cured for two seconds, about one inch away from the lamp, in a nitrogen environment. Exposed regions were imaged for ten seconds, also at about one inch away from the XENON lamp. Control samples based on a formulation including SR-9020 were produced using spincoating at 4K rpm. The control samples were exposed for 10 seconds at a distance of five inches from the lamp (since higher fluence was determined to cause fading in the formulation including SR-9020).

The results indicate that color formation takes place throughout the thickness of the coating 100, rather than with a heavy bias towards the surface. Therefore, it was considered desirable to optimize viscosity and spin speed to provide for the desired optical density with a minimum film thickness. This study provided a collateral benefit of also confirming that for 3% color former, 2% and 3% concentration of photoacid generator leads to the same ultimate color, but at different rates of formation.

10. Absorbance Spectra of Photoacid Generators and Films

At this point, it was considered that adequately stable triphenyl sulfonium triflate (TPST)-based formulations using UV absorbers might be impractical as being difficult to achieve. It appeared that the UV absorbers were simply absorbing the same wavelengths used for imaging, and not selectively absorbing the UVA-UVB from sunlight and fluorescent lighting. Therefore, the absorbance spectrum of the photoacid generators and the coating formulations were examined in order to refine wavelength regions that might be critical in these processes.

TPST was considered to be the simplest and shortest UV absorbing sulfonium-based photoacid generator available. Diphenyl iodonium hexafluorophosphate (DPI HXFP) was also considered to be a simple short UV absorbing photoacid generator. The absorbance spectra, of these two photoacid generators, shown in FIG. 13, have a maximum at approximately 200 nm, with a tail into the mid-UV.

Figure 35:
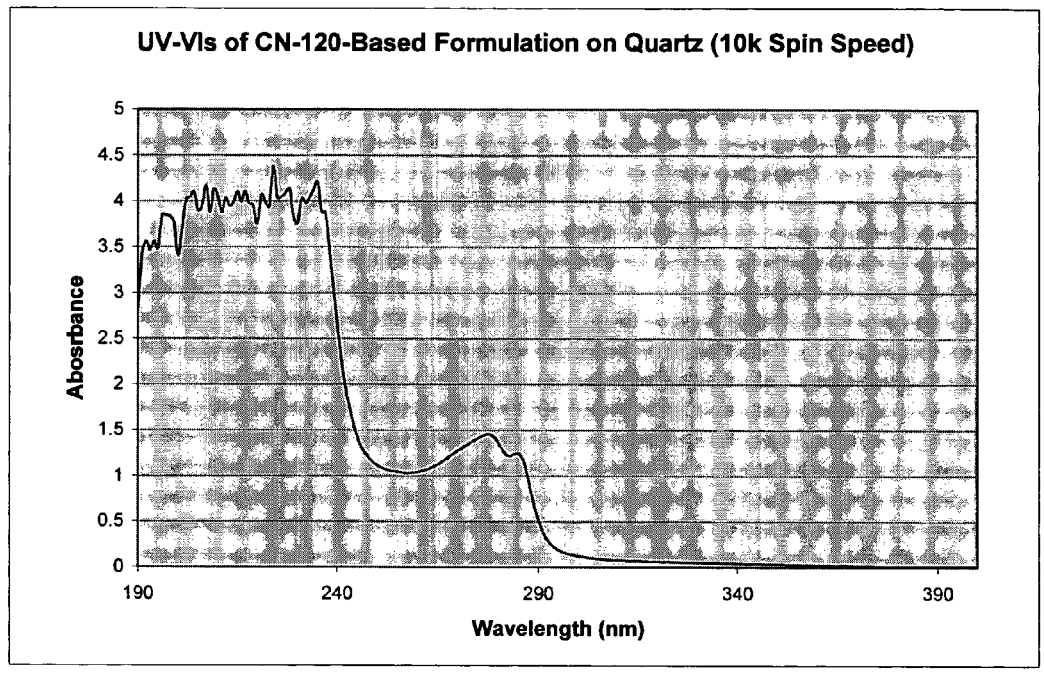
FIG. 35 depicts the absorbance of a CN-120 based formulation.

The spectrum of the CN-120-based formulation is shown in FIG. 35. Unlike the earlier formulations that were all aliphatic, these formulations had a considerable UV absorption in the mid-UV range, from about 250 nm to about 300 nm. It was also clear that the majority of the sensitive range of wavelengths for photoacid generators shared the high absorbance range of the acrylate matrix. Therefore, it was considered to be quite possible that the wavelengths most responsible for color formation through the depth of the coating 100 were not the short wavelengths (<250 nm), but the mid to long wavelengths, where the matrix optical density is low.

Since the short wavelengths were inefficient for image formation in the UV stabilized formulations, the ability to generate short wavelength UV in the laboratory as an advantage for imaging at greater speeds than with sunlight or fluorescent light did not appear to be practical for the formulations tested. Therefore, for these formulations, use of higher intensities is preferred to provide for faster imaging. One could conclude that the addition of UV absorbers slows down imaging to the same degree as background color formation from fluorescent lights or sunlight. Therefore, it was considered that if UV fluence of 10,000 times greater than the ambient sunlight could be produced, and imaging could be performed in three seconds, this would be the equivalent of the sun generating the color in 30,000 seconds, or about 8 hours. Given that an unacceptable level of background color may be as low as 5% of the maximum color, the effective sunlight exposure forming an unacceptable level of background color could only be about 30 minutes. Therefore, it was considered that even using a fluence of 10,000 times, or greater, than the ambient sunlight (an unacceptably high dose from a materials stability standpoint), then light stability would only be extended to about 5 hours.

Figure 36:
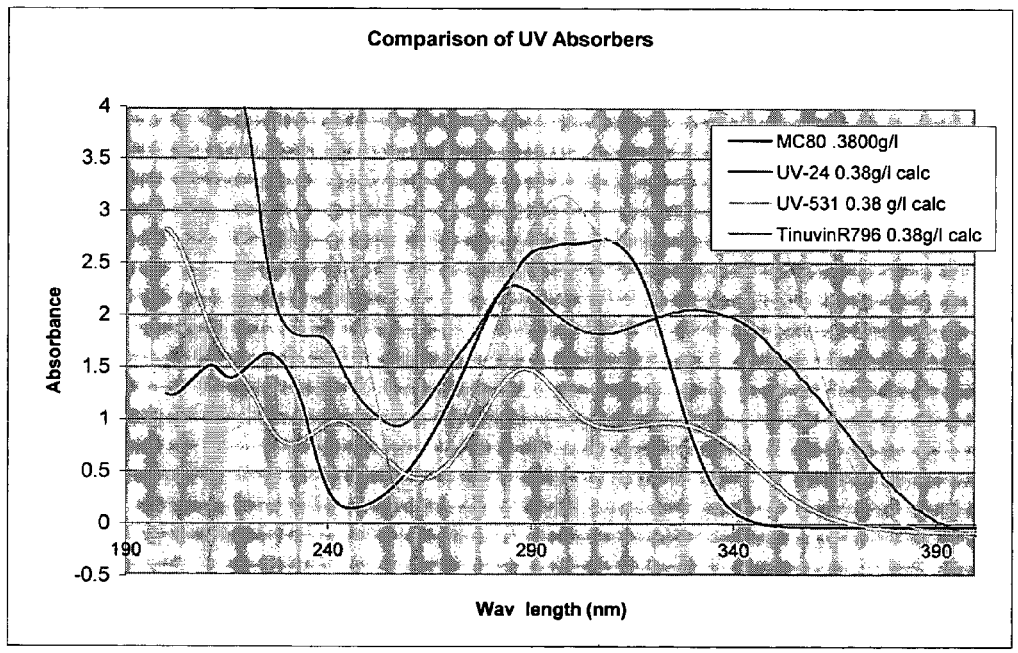
FIG. 36 compares absorbance spectra for various UV absorbers.

In looking at the UV absorbance spectrum of the matrix and UV absorbers, as shown in FIG. 36, one potential approach for overcoming problems with light stability was to look not for the shortest absorbing photoacid generator, but possibly for a photoacid generator with a maximum absorption wavelength closer to the mid-UV, where the coating 100 exhibited some degree of transmissive behavior. It was hoped that this would provide for UV blocking protection for the UV-A and UV-B regions, while sponsoring some imaging speed through effective use of UV-C radiation. A series of photoacid generators with longer UV transition were screened with this in mind. As used herein, it is considered that the wavelengths of UV-A are generally between about 320 nm to about 400 nm; UV-B wavelengths are generally about 270 nm to about 320 nm, and UV-C wavelengths are generally below about 270 nm. These bands of wavelengths, and other bands of wavelengths, may also be referred to as a "set of wavelengths."

11. Photoacid Generator Screening for Imaging Speed

Figure 37:
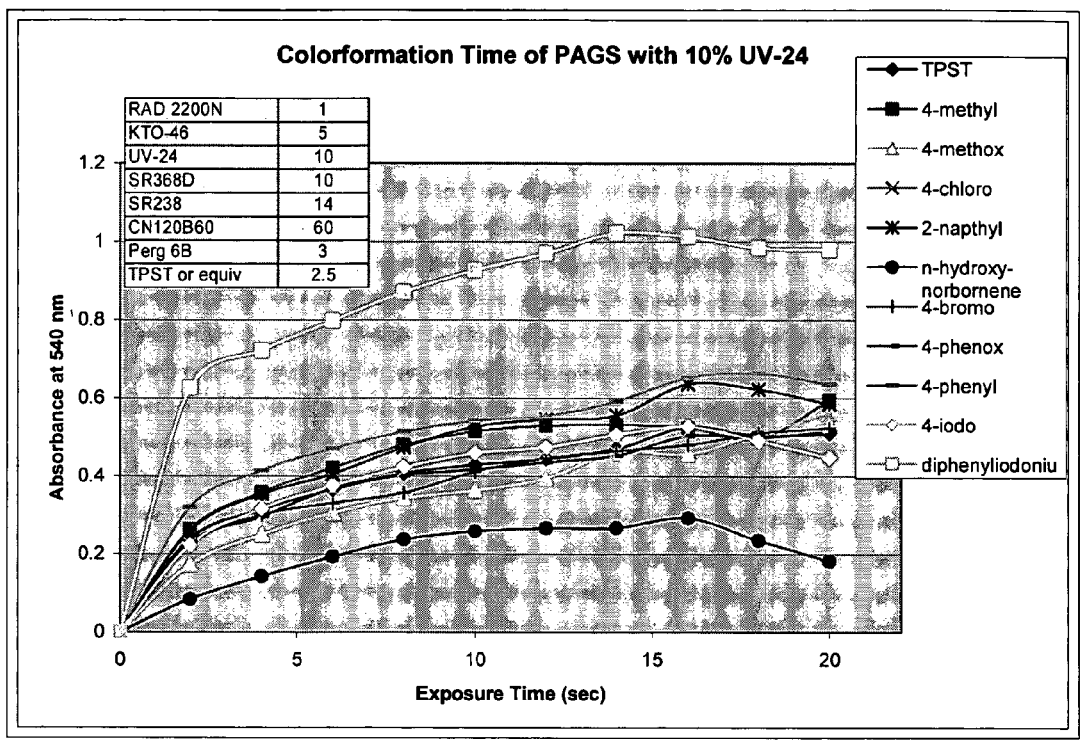
FIG. 37 depicts color formation times for combinations having various photoacid generators.

A formulation using 10% UV-24 as a UV absorber was prepared. The concentration of each photoacid generator was adjusted to be equivalent to 2.5% TPST on a molar basis. FIG. 37 shows the color formation curves for each formulation prepared. The samples shown in FIG. 37 were exposed at a distance of one inch from the XENON lamp. Some photoacid generators demonstrated faster color formation (writing) times than TPST, most notably the 4-phenoxy derivative.

Figure 38:
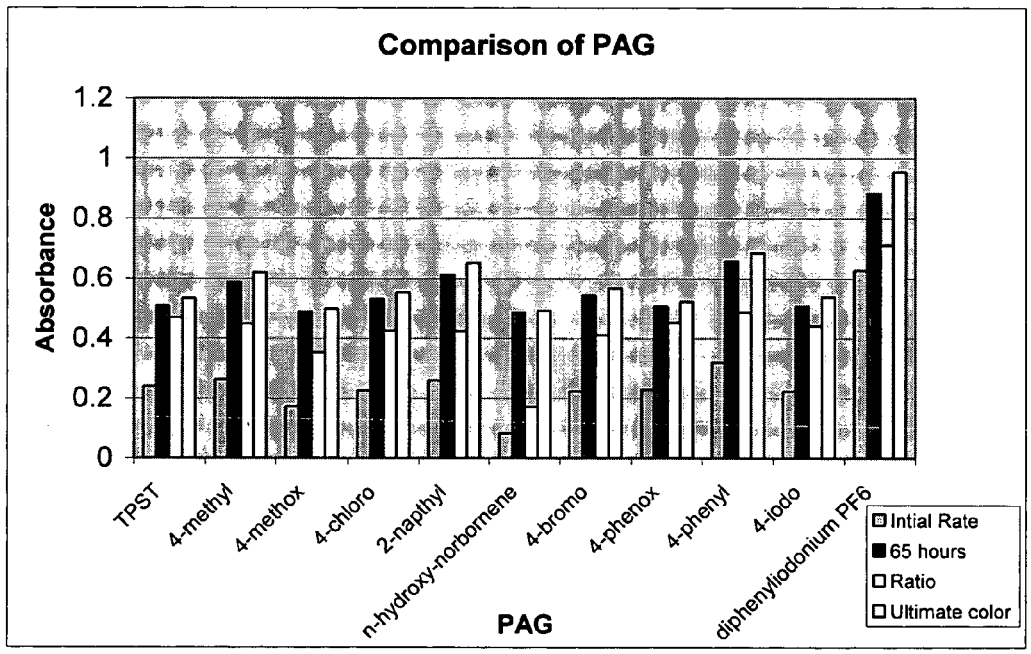
FIG. 38 depicts aspects of color generation as a function of photoacid generator.
Figure 39:
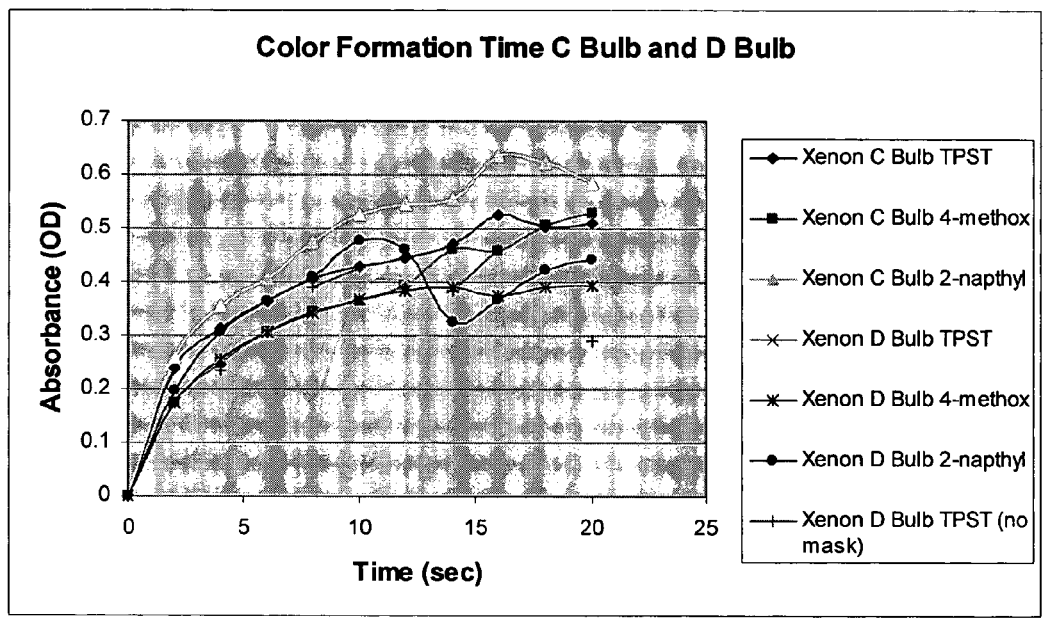
FIG. 39 depicts color formation as a function of illumination type.

While these different photoacid generators provided for different writing speeds and color density, a more important performance parameter was considered to be whether or not the photoacid generators would provide for increased writing speed or color density without increased susceptibility to fluorescent and sunlight exposure. To examine this, discs 10 of each photoacid generator formulation were prepared and exposed for about 65 hours under the fluorescent light fixture. FIG. 38 shows that while each photoacid generator gave different writing speeds and ultimate colors, none significantly outperformed TPST in terms of the ratio between color formation time and subsequent fluorescent light stability. In fact, the data seemed to support that writing time with the XENON lamp was a direct predictor for subsequent light stability. Therefore, it was apparent that most of the light used to image from the XENON lamp is not the short UV (having wavelengths below about 250 nm) but the UVB (about 270 nm to about 320 nm) portion of the spectrum. This conclusion is also supported by the observation that the XENON "D" bulb does not improve writing times, as shown in FIG. 39. Although the "D" bulb produced more UV-C radiation than the "C" bulb, no increase in color formation time was noted.

Figure 40:
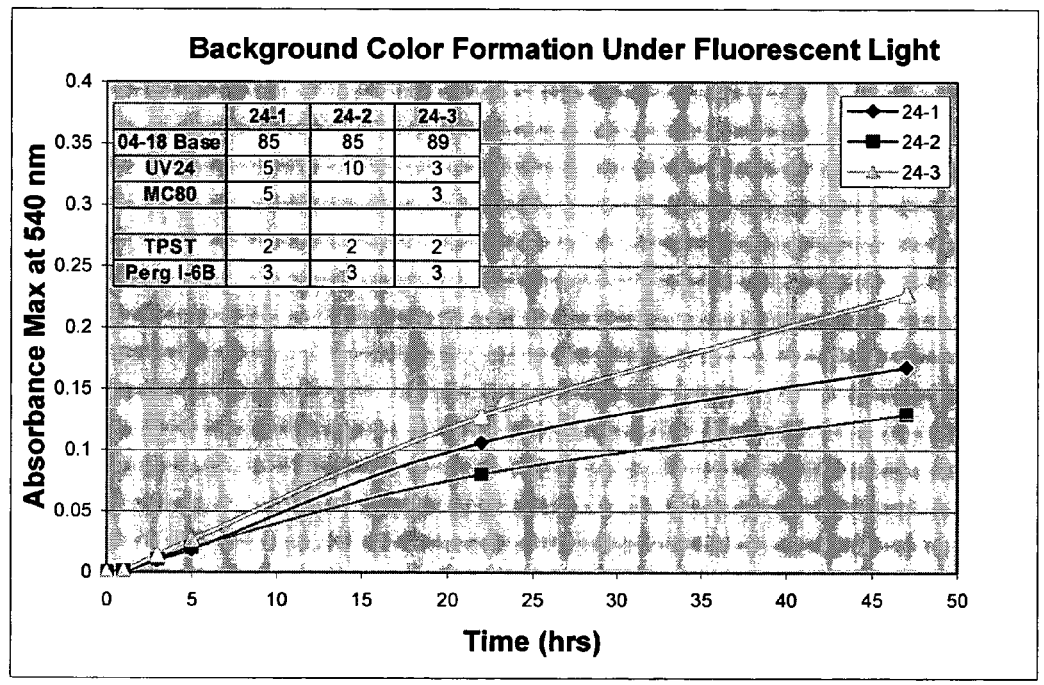
FIG. 40 depicts color formation as a function of UV absorber.

The use of higher concentrations of UV-24, as well as a combination of UV-24 and another absorber, MC80, were examined. The results, depicted in FIG. 40, show that higher concentrations of UV-absorber decrease sensitivity and that UV-24 alone is superior to a combination with MC80 at the same weight loading.

Figure 41:
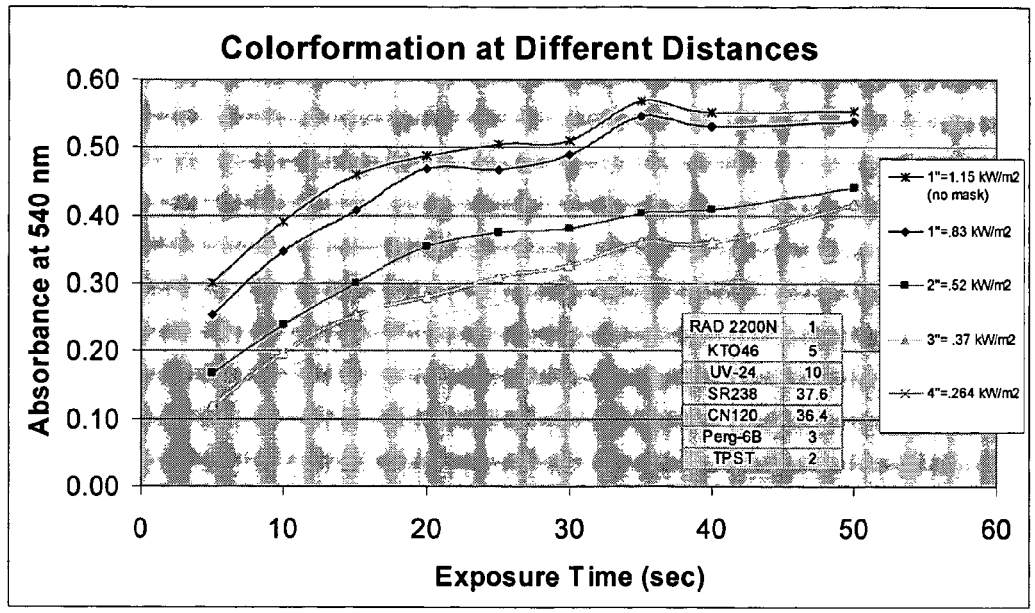
FIG. 41 depicts color formation as a function of illumination fluence.

A further experiment was conducted to measure color formation times for a 10% UV-24 formulation. The UV-B power levels were measured at various distances from the lamp housing through a plastic mask. Also, at the closest distance of about one inch, a quartz mask was used to increase the UV-B power, mostly at the short end of the spectrum. The results, depicted in FIG. 41, show that for a 10% UV absorber formulation, the XENON lamp was not capable of developing an adequate fluence rate to produce an acceptable optical density within the desired cycle time close to three seconds. In fact, most of the coating 100 samples cracked or warped significantly. Also, it was noted that the elimination of the plastic mask lead to approximately 40% more UV-B, but only a slight increase in writing speed, again supporting the theory that the coating was optically dense in the short UV (<300 nm).

12. Color Enhancing Additives

Figure 42:
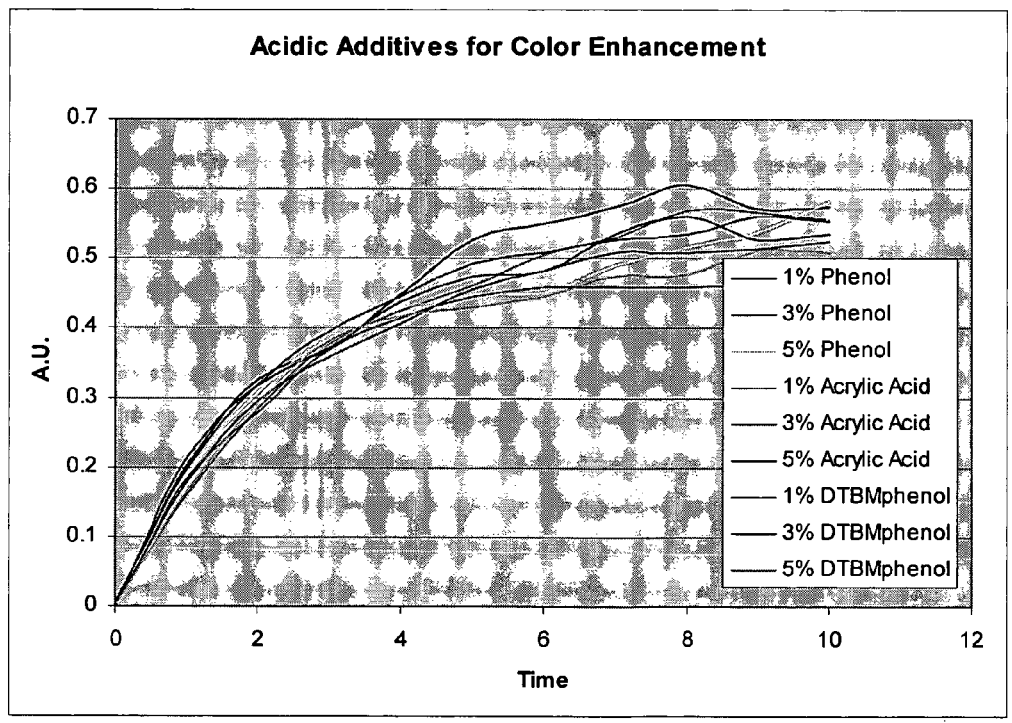
FIG. 42 depicts color formation as a function of additives for enhancement.

Several additives were tried in an attempt to decrease writing time in the UV absorber loaded coatings without a proportional increase in fluorescent and sunlight sensitivity. The first attempt involved a re-examination of color enhancing additives to make the acid generated more efficient. These efforts focused on the use of acids to "prime" the coating for color formation. The matrix used was formulation 10, which contained alkoxylated monomers. As shown in FIG. 42, both the concentration and composition of the acid used did not dramatically effect the writing speed, or ultimate color of the coatings. An additional experiment was tried using 2-acrylamido-2-methyl-1-propanesulfonic acid, a crosslinkable sulfonic acid. However, even at 1% loading, this acid was too strong and turned the coatings red without any UV exposure. Therefore, it seemed unlikely that doping with acids of various strengths or concentrations would help with color formation.

Figure 43:
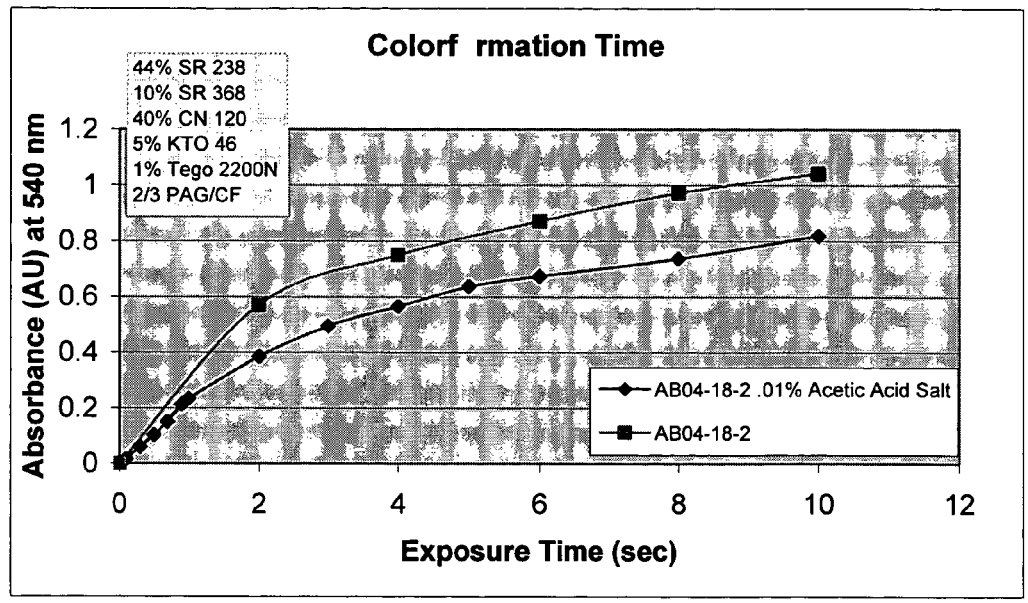
FIG. 43 depicts color formation in a buffered system.

An additional approach to decreasing light sensitivity was evaluated, where a buffered system would be used. Using a buffered system, it was thought that low doses of UV would generate small amounts of additional acid which would be absorbed by the buffer. In this case, as triflic acid is an extremely strong acid, almost any base would be capable of scavenging (neutralizing) the acid generated. Initial experiments used acrylated amines, such as CN-384 from Sartomer Corporation. These amines proved to be too strong a base, and color formation was completely inhibited. In subsequent experiments, when smaller amounts of CN-384 were used, the background color was kept low, but the image stability was terrible and the color faded under ambient conditions in 24 hours or less. Therefore, use of a weak base was examined. Examples of weak bases included acetic acid and sodium salt. Unfortunately, these compounds were not very soluble in acrylates, and only 0.1% loading was achieved. However, even at this low loading, an effect was observed. The salt did act as a buffer, but it also reduced the rate of color formation and the overall color of the coating as well. Aspects of the use of buffers are depicted in FIG. 43.

13. Spin Coating, Film Thickness and Optical Density.

The purpose of this experiment was to correlate coating spin speed (rpm), optical density (absorbance at 540 nm) and film (coating 100) thickness (microns). Clear polycarbonate disks 10 were coated on a spin coating machine, known as the Headway Spin Coater. Formulation 3 was used, which had a viscosity of approximately 60 cps. Disks 10 were coated and spun for 10 seconds at 4,000 to 10,000 rpm (1.0K) increments. The disks were cured for two seconds using the XENON Pulse Lamp, in a nitrogen environment, and an L-37 UV filter. Half of each disk 10 was then exposed for 10 seconds under the lamp. UV scans were taken of each disk on both the cured and exposed sides and film thickness measurements were taken.

Figure 44:
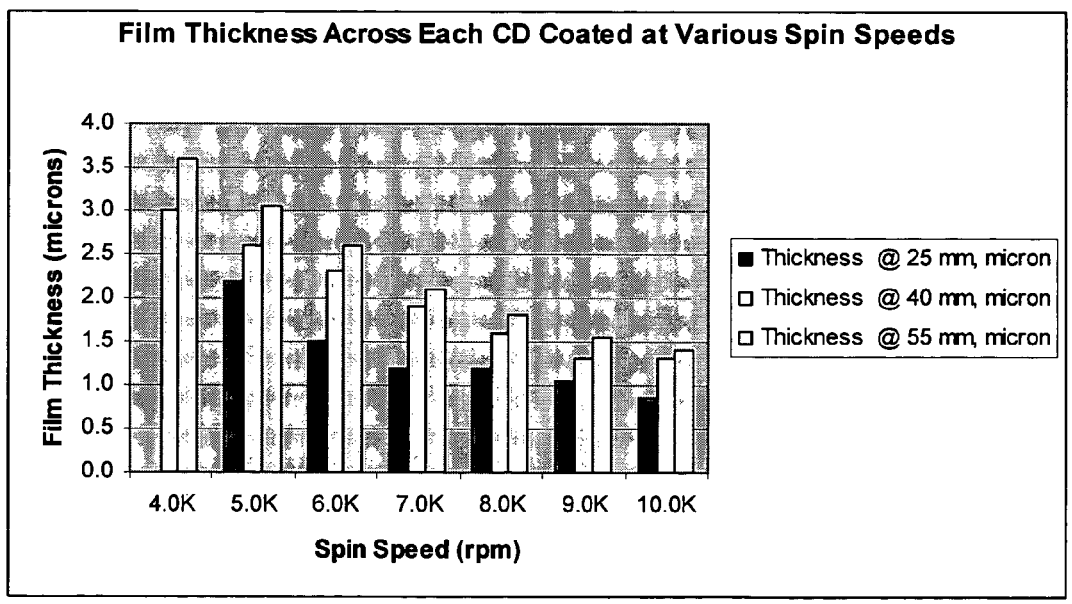
FIG. 44 depicts film thickness as a function of spin speed.
Figure 45:
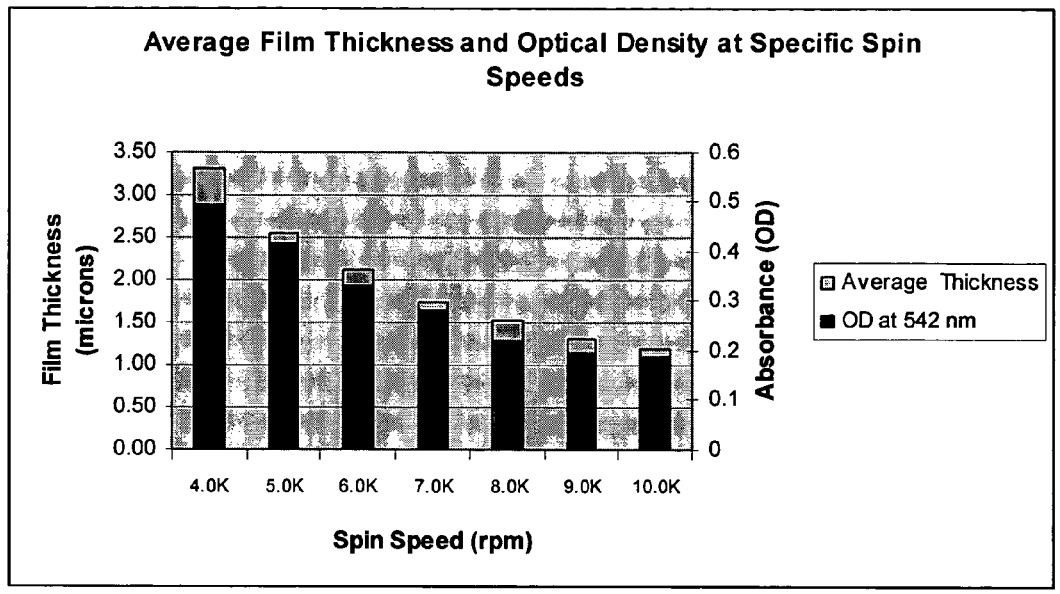
FIG. 45 depicts film thickness and optical density as a function of spin speed.

Measurements revealed that the film thickness varied from thinner to thicker from the dispense area out to the edge of the disc. The optical density of the discs 10 also scaled directly with thickness for various spin speeds. It was apparent that at the highest speeds (greater than about 8K rpm) these was a diminished effect on film thickness, as expected. Results are depicted in FIG. 44. In FIG. 44, the thickness of the film at selected distances from the dispense area is shown. Assessments of optical density and film thickness for various spin coating speeds is shown in FIG. 45.

Figure 46:
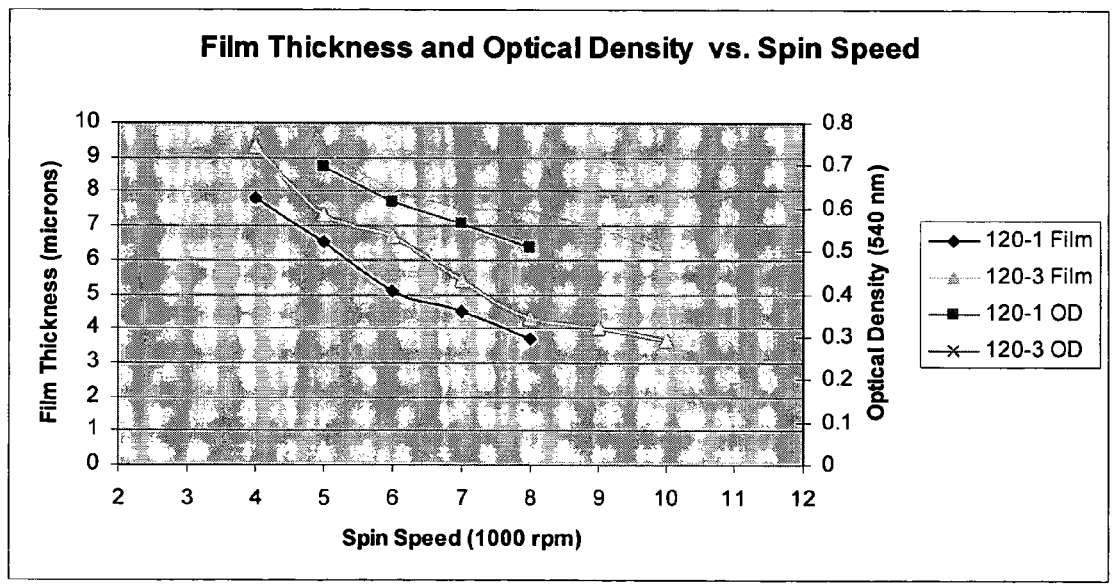
FIG. 46 depicts film thickness and optical density as a function of spin speed.

Formulations 58 (375 cps) and 61 (504 cps) were coated at incrementing spin speeds 5-10K. Optical Density and film thickness determinations were performed, and the results are shown in FIG. 46. As expected, the more viscous formulation produced a thicker film. Also of interest is that both of these more viscous formulations produced a more linear response of film thickness to spin speed. In the finished product, methods for controlling color may include controlling exposure time or varying the formulation, however, it is considered that will be less attractive that varying film thickness will typically be preferable. That is, varying film thickness has a beneficial aspect of permitting an end user to dispense a minimum amount of material needed for a given color density, thereby providing for reduced costs and reducing light sensitivity.

Figure 47:
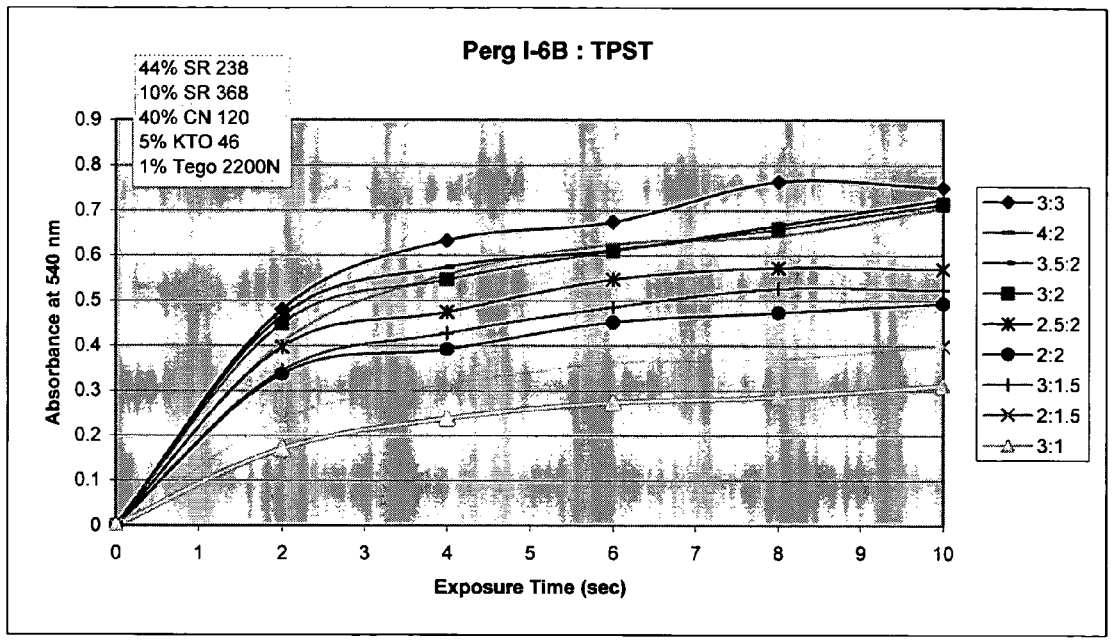
FIG. 47 depicts color formation for varying ratios of photoacid generator to color former.

A further optimization of photoacid generator concentration was undertaken, and is depicted in FIG. 47. FIG. 47 shows the relation ship between photoacid generator (TPST) and color former (PERGASCRIPT I-6B) concentrations and optical densities for a constant film thickness. Optical densities were measured on discs 10 cured for 2 seconds, in a nitrogen environment at about one inch from the lamp. These samples were then exposed at one inch from the lamp, for the indicated times.

B. Multiple Coating Development

It became clear that an acceptable balance between cycle time, UV fluence and subsequent light sensitivity was not going to be reached in a single coating formulation. It was considered that an alternative could be the use of two coatings, one designed to give fast color formation and image stability, and a second overcoat to give the desired UV stability. The second overcoat could provide for further beneficial effects, such as scratch resistance and added environmental stability to humidity and bases.

1. Color Coating and Overcoat Development

The first step in development of the color forming coating 100 was to evaluate the properties that could be divided between the color forming layer 101 and the overcoat layer 102 to provide for simplified formulations. For the color forming layer 101, adhesion to polycarbonate, good color formation, photoacid generator and color former solubility, were desired. For the overcoat 102, good curing to a hard mar resistant surface, high optical density in the UV, and adhesion to the underlying color forming layer 101 were desired. Both layers 101, 102 would ideally cure quickly without nitrogen, be low shrinkage, and work together to increase environmental stability of the image (i.e., resistance to the influence of heat, humidity or the introduction of additional chemicals).

Considering prior development, the CN-120-based formulations produced the best environmental results, but exhibited higher optically denser for the color forming wavelengths than all of the aliphatic formulations such as formulations 1 and 9. However, since the addition of an overcoat 102 might be used to enhance the stability of the image in heat/humidity testing, non-CN-120 formulation were again examined, with a goal of decreasing writing times and decreasing shrinkage.

Initial experiments showed that the removal of the wetting agent from the color forming layer 101 would be necessary to let the second coating 102 wet and adhere to the color forming layer 101. A quick series of formulations were screened. These are presented in Table 19.

TABLE 19

Initial Color Coating Formulations for Two Layer System

| | Color Forming Layer | | | Overcoat | |
|---|---|---|---|---|---|
| | C1 | C2 | C3 | O1 | O2 |
| Wetting Agent | | | | | |
| TEGO RAD 2200 N | 0 | 0 | 0 | 2 | 2 |
| Photoinitiator | | | | | |
| KTO/46 | 5 | 5 | 5 | 5 | 5 |
| Diluents | | | | | |
| SR-238 | 10 | 35 | 35 | 20 | 30 |
| Main Components | | | | | |
| SR-9021 | | | 30 | | |
| SR-368D | 20 | 30 | 30 | 73 | 30 |
| CN-120B60 | 65 | 30 | | | 33 |
| TOTAL | 100 | 100 | 100 | 100 | 100 |
| UV-24 | | | | 10 | 10 |
| TPST | 2.5 | 2.5 | 2.5 | | |
| Pergascript Red 6B | 3.5 | 3.5 | 3.5 | | |

Formulations C1 and C2 contained reduced CN-120 content and increased SR-368 content for increased clarity in the UV and decreased shrinkage for adhesion. Formulation C3 contained SR-9021 and SR-368 to provide for a low shrinkage, high adhesion, fast curing, and UV transmissive coating. Formulations O1 and O2 contained a SR-238 and SR-368 combination to provide for good adhesion and cure, with CN-120 in formulation O2 for additional hardness and UV opacity. In formulations O1 and O2, UV absorber UV-24 was used at 10% loading. An immediate observation was that, as before, the photoacid generator was minimally soluble in the alkoxylated monomer SR-9021. (As may be apparent, formulations designated with a "C" indicate a formulation for the color forming layer 101, while an "0" designation indicate a formulation for the overcoat layer 102.)

Sample discs 10 were prepared by spin coating color forming layers 101 with formulations C1, C2, and C3 onto substrate 17 at 4K rpm, curing in a nitrogen environment, through a L37 UV filter with a "D" bulb, at a distance of about one inch, for three seconds. Imaging through a quartz mask was performed at about five inches from the lamp for 10 seconds. The overcoat layers 102 (formulations O1 and O2) were applied over the color forming layer 101 by spincoating at 2.5K rpm. The overcoat layers 102 were cured in a nitrogen environment, using a L37 UV filter with a "D" bulb at about one inch from the lamp for 3 seconds. Color forming layers 101 made of formulations C2 and C3 wet and spun nicely, while formulation C1 did not perform as well. Both formulations O1 and O2 for the overcoat layer 102 wet nicely and coated all the color forming layer 101 well. All finished discs 10 were mar resistant to a plastic pen tip.

A tape pull test utilizing a 2.5 mm spacing blade was performed using SCOTCH tape as a light adhesive tape. (PERMACEL #99 did not adhere well enough to the coating to be used). Color forming layer 101 formed of formulation C1 failed, while color forming layers 101 formed of formulations C2 and C3 passed the test. Both overcoat layers 102 (O1 and O2) adhered to the color forming layers 101 without any problems. When adhesion of the overcoat layer 102 was problematic, it was noted that failures occurred at the interface of the substrate layer 17 and the color forming layer 101 (as expected).

From these initial experiments, a candidate two layer coating 100 was designed. These formulations are presented in Table 20. The color forming layer 101 was modified to decrease the concentration of CN-120 and to increase transparency and adhesion. The photoacid generator to color former ratio was increased to 3:4.5 to increase writing speed and color intensity. The overcoat layer 102 was a formulation of SR-368 and SR-238.

TABLE 20

Initial Two Coating System

| Component | Formulation No. | |
|---|---|---|
| | C4 | O1 |
| Wetting Agent | | |
| TEGO RAD 2200 N Photoinitiator | 0 | 2 |
| KTO/46 Diluents | 5 | 5 |
| SR-238 Main Components | 20 | 20 |
| SR-368D | 40 | 73 |
| CN-120B60 | 35 | |
| TOTAL | 100 | 100 |
| UV-24 | | 10 |
| TPST | 3 | |
| Pergascript Red 6B | 4.5 | |

2. Initial Testing

Figure 48:
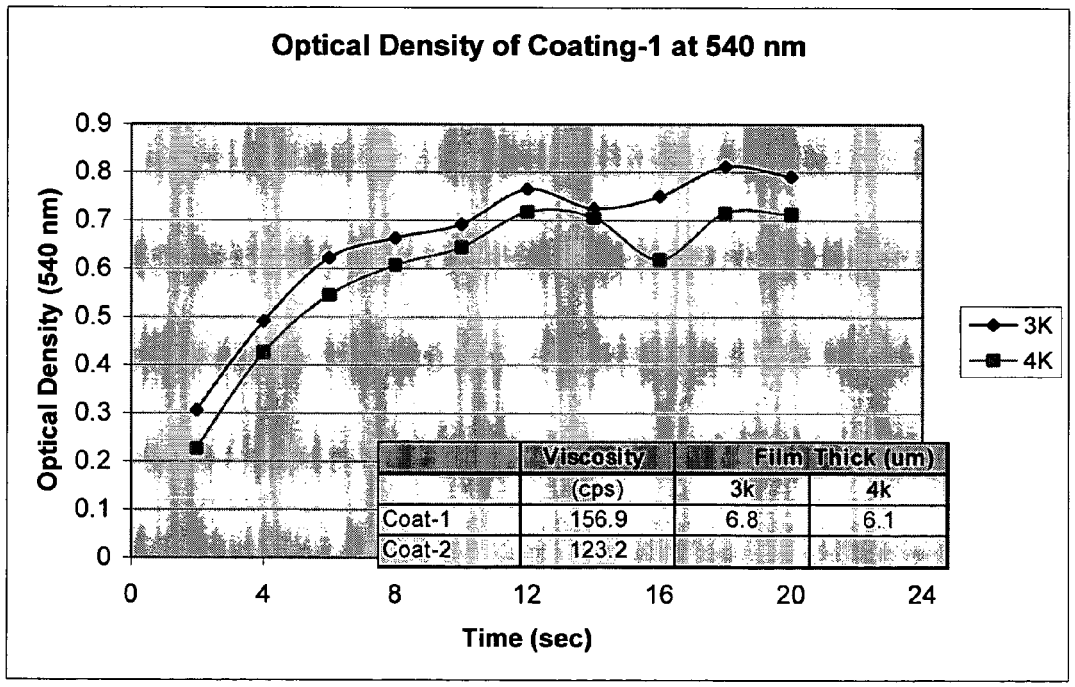
FIG. 48 depicts optical density for two coatings.

Experiments proceeded for testing the two layer coating 100. Discs 10 were coated with color forming layer 101 by spin coating at 3K and 4K rpm, as shown in FIG. 48. The discs 10 were imaged at about 5" from the lamp for various times to examine color intensity. The overcoat 102 was then applied by spincoating at 3K rpm. The use of nitrogen and filters were also examined in this study. Nitrogen was not required to cure the color forming layer 101 to an acceptable level to provide for application of the overcoat 102. It is considered that foregoing use of nitrogen for curing the color forming layer 101 may have the added advantage of forming a seamless bond between the color layer 101 and the overcoat 102. The overcoat 102 was then cured at about one inch from the lamp for 1.5 seconds without nitrogen and without the use of a filter, thus giving the full spectrum of lamp radiation to enhance surface cure. The underlying color forming layer 101 did not appear to form any noticeable color from the curing of the topcoat 102.

The 3:4.5 photoacid generator to color former ratio proved to be high and lead to very strong color. Optical densities of approximately 0.8 were achieved in short times at 5¼ inches on the XENON "D" bulb.

More importantly, a qualitative exposure test (63 hours) using the fluorescent light fixture showed that the overcoat performance in the light test was far superior to the single coating solution. Also of interest was that images which appeared too dark (too much contrast) at first, now appeared better with some background color which reduced the contrast.

Most importantly, separation of the UV stabilizing layer and color forming layer 101 allows the efficient use of shorter UV wavelengths (<320 nm) for color formation. This allows for efficient exposure of the color forming layer 101 using these wavelengths, then shielding the layer 101 from these and wavelengths found in typical illumination such as sunlight and fluorescent lighting.

However, it was noted that using this combination of layers 101, 102 required further investigation into adhesion properties. The color forming layer 101 did not adhere to the underlying polycarbonate in the substrate layer 17, failing the tape pull test using the light adhesive tape. The adhesion failure was only encountered at the interface of the polycarbonate substrate 17 and color forming layer 101, so an assessment of color forming layer 101 to overcoat layer 102 adhesion was not possible.

3. Environmental Testing

At this point, the knowledge gained from the preliminary two coating experiments was condensed and provided a basis for the development of a further series of formulations. These formulations were to be examined for quantitative environmental testing, and are set forth in Table 21.

Formulation C5 was the previous SR-9021 based formulation 3 (Table 14) which had excellent properties but failed environment testing. It was considered that an overcoat 102 might improve the environmental stability of a color forming layer 101 which used formulation C3, and provide enough protection to avoid the use of the high shrinkage, UV absorbing CN-120. Formulation C6 was a modification to Formulation C5, where SR-368 was used in place of SR-494. It was theorized that this substitution would decrease the alkoxylation content and lead to a harder but still low shrinkage film 101 or color forming layer 101. Formulation C7 was a modified formulation containing CN-120, SR-368, SR-238 designed to meet adhesion requirements. It was considered that a color forming layer 101 containing formulation C7 should pass environmental testing with ease, albeit at the expense of writing time and shrinkage. It was expected that formulation O3 would yield a hard, UV absorbing overcoat which may have shrinkage issues, due to the CN-120. Formulation O4 was predominantly formed of SR-368, with use of SR-339 as the diluent for added UV absorption. Formulation O5 was a SR-9021 based overcoat with CN-120 added for hardness. Formulation O5 was devised with the hope that the SR-9021 would manage shrinkage without sacrificing hardness and scratch resistance. Overcoats 102 were formulated using both 10% and 20% UV-24. The 20% loadings noticeably affected the viscosity.

TABLE 21

Formulations from Preliminary Two Coating Experiments

| Component | Formulation No. | | | | | |
|---|---|---|---|---|---|---|
| | C5 | C6 | C7 | O3 | O4 | O5 |
| Wetting Agent | | | | | | |
| TEGO RAD 2200 N Photoinitiator | 0 | 0 | 0 | 1 | 1 | 1 |
| KTO/46 Diluents | 5 | 5 | 5 | 5 | 5 | 5 |
| SR-238 | 25 | 20 | 35 | | | 14 |
| SR-339 Main Components | | | | 34 | 10 | |
| SR-9021 | 35 | 35 | | | | 50 |
| SR-494 | 35 | | | | | |
| SR-368D | | | 40 | 30 | 10 | 84 |

TABLE 21-continued

Formulations from Preliminary Two Coating Experiments

| Component | C5 | C6 | C7 | O3 | O4 | O5 |
|---|---|---|---|---|---|---|
| CN-120B60 | | | | 30 | 50 | |
| CN-132 | | | | | | 30 |
| TOTAL | 100 | 100 | 100 | 100 | 100 | 100 |
| UV-24 | | | | 10-20 | 10-20 | 10-20 |
| TPST | 2 | 2 | 2 | | | |
| Pergascript Red 6B | 3 | 3 | 3 | | | |
| Viscosity | 61 | 83 | 68 | 134 | 200 | 162 |
| 20% UV 24 | | | | 102 | 404 | 236 |

In terms of solubility for the photoacid generator and the color former, both formulations C5 and C7, which contained alkoxylated SR-9021, had problems dissolving the solids without heat and ultrasound. Both C5 and C7 required filtration. Formulations O4 and O5 had trouble solubilizing the 20% concentration of UV-24. Formulations O4 and O5 were also filtered.

The color coat formulations were applied by spin coating at 4K rpm and then cured in ambient air at about one inch under the lamp, using the L37 filter for 2 seconds. It was noted that the discs 10 cured with a varying amount of "pinkness." The pinkness ranged from no color for C5, to very slight color for C6, to slight color for C7. It was hypothesized that this most likely tracked the optical density of the coatings, since C7 had the highest aromatic content, C6 contained SR-368 which absorbs some UV, and C5 was the most UV transmissive of the coatings.

Imaging was performed at about 4" from the lamp, with the "D" bulb for 10 seconds, through a chrome-on-quartz mask. Top coats 102 were applied by spin coating at 4K rpm and cured at about one inch from the lamp, using a "D" bulb with full spectrum. Curing was for 1.5 seconds (for the 10% UVA set) or 2.0 seconds (for the 20% UVA set).

Figure 49:
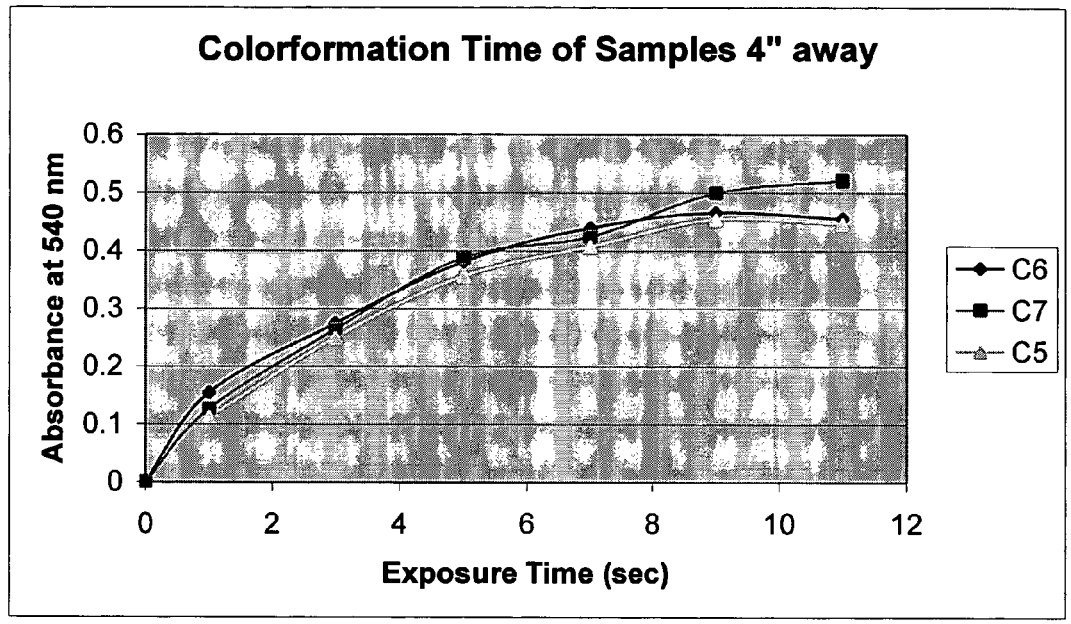
FIG. 49 depicts color formation as a function of time one geometry.

Environmental testing was performed at about 70° C. and 90% relative humidity for 78 hours. Overcoats 102 which contained 20% UV absorber either partially or completely delaminated. The mechanism appeared to be shrinkage or swelling of the overcoat 102, which then caused delamination of the color coating 101 from the substrate layer 17 of the disc 10. The second observation was that the composition of the color layer 101 was the major driving factor in determining image stability. Formulation C7 outperformed versions C6 and C5 by a wide margin. Coating C5 completely failed as before, regardless of the over coating 102 used. Coating C6 was better than C5, but still not even close to C7, again regardless of the over coating 102. Formulation C7 outperformed the other coatings 101 even without an overcoat 102. Results are depicted in FIG. 49.

Regarding overcoat 102 applications having 10% loading, each sample appeared to remain stable in terms of adhesion and hardness. Further, a trend of underlying image stability was noted in regard to the 1c undercoated samples. That is, formulation O3 performed better than O4, which performed much better than O5, which performed better that no overcoat 102. This again tracks with the lack of alkoxylation and potentially the glass transition temperature and hydrophobicity of the coating 100.

Figure 50:
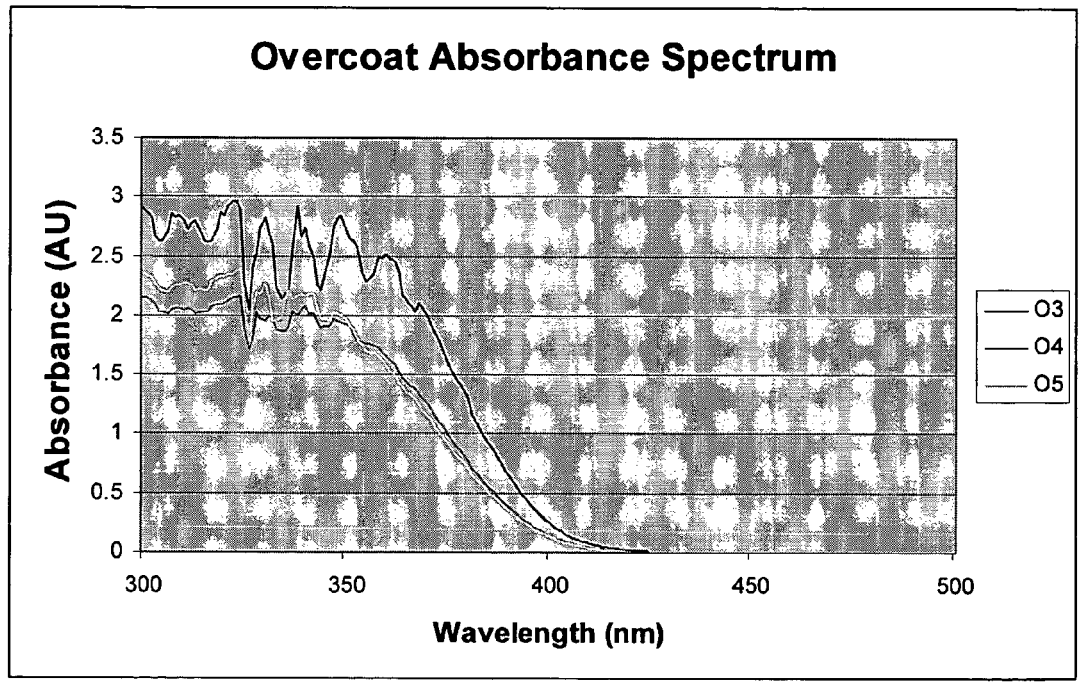
FIG. 50 depicts absorbance spectra for three embodiments of overcoat layers.

All the samples performed very well under the fluorescent lamp fixture as determined by visual inspection. After a week of exposure to the fluorescent light some background color developed, and after several weeks of exposure to the fluorescent light the image was still discernable, but degraded due to background color intensity. The 20% loading samples performed well for limiting background color development, were considered to be of limited use due to the environmental issues discussed above. The CN-120 based formulation O3, which had the highest aromatic content, gave the highest optical density in a coating 100, and provided for the best performance in the lightfastness as well. Absorbance spectra for the overcoat formulations O3, O4, O5 are depicted in FIG. 50.

4. Adjustments to Two Coating Formulations

A series of acrylated urethanes from Sartomer Corporation were also tested in order to examine their applicability to use in the coating 100. The series is shown in Table 22. All of the coatings using acrylated urethanes gave soft, easy to mar finishes that did not look as though they would perform well. No further testing was performed.

TABLE 22

Evaluation of Acrylated Urethanes in an Overcoat

| Component | O6 | O7 | O8 | O9 |
|---|---|---|---|---|
| Wetting Agent | | | | |
| TEGO RAD 2200 N Photoinitiator | 0 | 0 | 0 | 1 |
| KTO/46 Diluents | 5 | 5 | 5 | 5 |
| SR-238 | 20 | 20 | 20 | |
| SR-339 Main Components | | | | 20 |
| CN963B80 | | | | 50 |
| CN965 | 50 | | | |
| CN966B85 | | 50 | | |
| CN981B88 | | | 75 | |
| SR368D | 25 | 25 | | 20 |
| TOTAL | 100 | 100 | 100 | 96 |
| UV-24 | | | | 10 |
| TPST | 2 | 2 | 2 | |
| Pergascript Red 6B | 3 | 3 | 3 | |

CN965 is an aliphatic polyester based urethane diacrylate oligomer. It is a flexible oligomer offering good weatherability. CN966B85 is an aliphatic polyester based urethane diacrylate oligomer blended with 15% SR238, hexanediol diacrylate. CN981B88 is an aliphatic polyester/polyether based urethane diacrylate oligomer blended with 12% SR238, hexanediol diacrylate monomer. All three are products of Sartomer Corporation.

Since it appeared that the CN-120 formulations were not going to be replaced by any other monomer class, further experimentation was undertaken to adjust for other components and to improve aspects of performance. The formulations and with an explanatory note for the rationale behind each adjustment are presented in Table 23.

TABLE 23

Adjustments to CN-120 Formulations

| | Formulation No. | | | | | | | | |
|---|---|---|---|---|---|---|---|---|---|
| Component | C8 | C9 | C10 | C11 | C12 | O10 | O11 | O12 | O13 |
| Wetting Agent | | | | | | | | | |
| TEGO RAD 2200 N | | | | | | 1 | 1 | 1 | 1 |
| Photoinitiator | | | | | | | | | |
| KTO/46 | 5 | 5 | 5 | 5 | 5 | 7.5 | 7.5 | 7.5 | 8 |
| CN-384 | | | | | | 10 | | | |
| Diluents | | | | | | | | | |
| SR-506 | | | | 15 | 35 | | | | |
| SR-238 | | | 35 | 20 | | | | | |
| SR-339 | 35 | 35 | | | | 30 | 39 | 30 | 26 |
| Main Components | | | | | | | | | |
| SR-368D | 30 | 30 | 30 | 30 | 30 | 10 | 10 | 18 | 20 |
| CN-120B60 | 30 | | | 30 | 30 | | | | |
| CN-120M50 | | 30 | 30 | | | 41.5 | 22.5 | | 25 |
| SB520M35 | | | | | | | 20 | 43.5 | 20 |
| TOTAL | 100 | 100 | 100 | 100 | 100 | 100 | 100 | 100 | 100 |
| PIGMENTS | | | | | | | | | |
| UV-24 | | | | | | 10 | 10 | 10 | 10 |
| TPST | 2 | 2 | 2 | 2 | 2 | | | | |
| Pergascript Red 6B | 3 | 3 | 3 | 3 | 3 | | | | |
| Viscosity | 93.19 | 93.54 | | | | 128 | 88 | 217 | 187 |
| Adhesion | Terrible | Terrible | moderate | Terrible | Terrible | GOOD | GOOD | GOOD | GOOD |
| Cure/hardness | good | good | | | | good | soft | soft | good |

Synergists cause terrible loss of color in environmental testing, probably due to acid migration and quenching
Explanatory notes for Table 23
C8 Reduced SR-238 content with SR-339, reduced shrinkage, writing time might go up
C9 Eliminated SR-238, with SR-339, reduce shrinkage, increase in writing time
C10 Reduced SR-238 with SR-339, reduced shrinkage, writing time might go up
C11 Reduced SR-238 with SR-506 reduced shrinkage, no increase in writing speed
C12 Eliminate SR-238 using SR-506 to reduce shrinkage, increase Tg, and retain writing speed
O10 Eliminate SR-238 to increase optical density and reduced shrinkage, also use synergist for curing.
O11 Addition of Acid functionality to improve ink resistance, no synergist
O12 All acid topcoat, low shrinkage, hard, UV absorbing.
O13 Harder version of O11

The study led to the recognition that a moderate reduction in SR-238 concentration in the color coatings led to loss of adhesion to polycarbonate. However, the overcoat layers 102 could be based on SR-339 as the diluent, which would provide for excellent UV absorbing properties, reduced shrinkage, and lower skin irritation. This study also provided for an observation that inclusion of an amine synergist in the topcoat 102 still leads to complete loss of an image as a result of environmental testing in as little as 24 hours. This was considered unfortunate since addition of a synergist to the topcoat 102 led to fast and complete curing at 7.5% loading of KTO-46.

SR-339, 2-phenoxyethyl acrylate, is a low volatility monofunctional, aromatic monomer which offers good adhesion properties. CN120M50 is a difunctional bisphenol A based epoxy acrylate blended with 50% SR-339, phenoxy ethyl acrylate. CN120M50 provides a good balance of water properties and high reactivity. SB520M35 is a moderately functional, carboxylic acid containing acrylate oligomer blended in SR-339, phenoxy ethyl acrylate monomer. Reactive solids are 100%. SB520M35 offers a fast cure rate, excellent adhesion to metals and plastics, and good wetting and flow characteristics. SB520M35 also contains carboxylic acid functionality, which leads to improved amine fading resistance. These three acrylates are products of Sartomer Corporation.

After the various screening studies were completed, concluding testing was performed on a preferred color coat formulation with two preferred overcoat formulations. The overcoat formulations selected were chosen because the inclusion of an acidic oligomer, such as SB-520, had not been tested in the environmental studies, nor had the utility of the acid in imparting resistance to ink fading been confirmed. The final formulations are shown in Table 24.

TABLE 24

Final Formulations for Two Coat System

| | Formulation No. | | | |
|---|---|---|---|---|
| Component | C13 | C14 | O14 | O13 |
| Wetting Agent | | | | |
| TEGO RAD 2200 N | | | 1 | 1 |
| Photoinitiator | | | | |
| KTO/46 | 5 | 5 | 8 | 8 |
| CN-384 | | | | |
| Diluents | | | | |
| SR-506 | | | | |
| SR-238 | 35 | 35 | | |

TABLE 24-continued

Final Formulations for Two Coat System

| Component | C13 | C14 | O14 | O13 |
|---|---|---|---|---|
| SR-339 |  |  | 26 | 26 |
| Main Components |  |  |  |  |
| SR-368D | 30 | 30 | 20 | 20 |
| CN-120B60 | 30 | 30 |  |  |
| CN-120M50 |  |  | 45 | 25 |
| SB520M35 |  |  |  | 20 |
| TOTAL PIGMENTS | 100 | 100 | 100 | 100 |
| UV-24 |  |  | 10 | 10 |
| TPST | 2 | 2.5 |  |  |
| Pergascript Red 6B | 3 | 4 |  |  |
| Viscosity | 68 |  |  | 187 |

Two concentrations of photoacid generators and color formers were studied, since the final photoacid generator and color former ratio and concentrations weren't precisely established as yet. Two spin speeds were used for both coatings, which were 3K and 4K rpm. Bottom coats were cured for three seconds through an L37 filter, without nitrogen. Exposure was for 10 seconds at about 4" from a Xenon "D" bulb. Top coats were cured in three seconds without filter or nitrogen.

Figure 51:
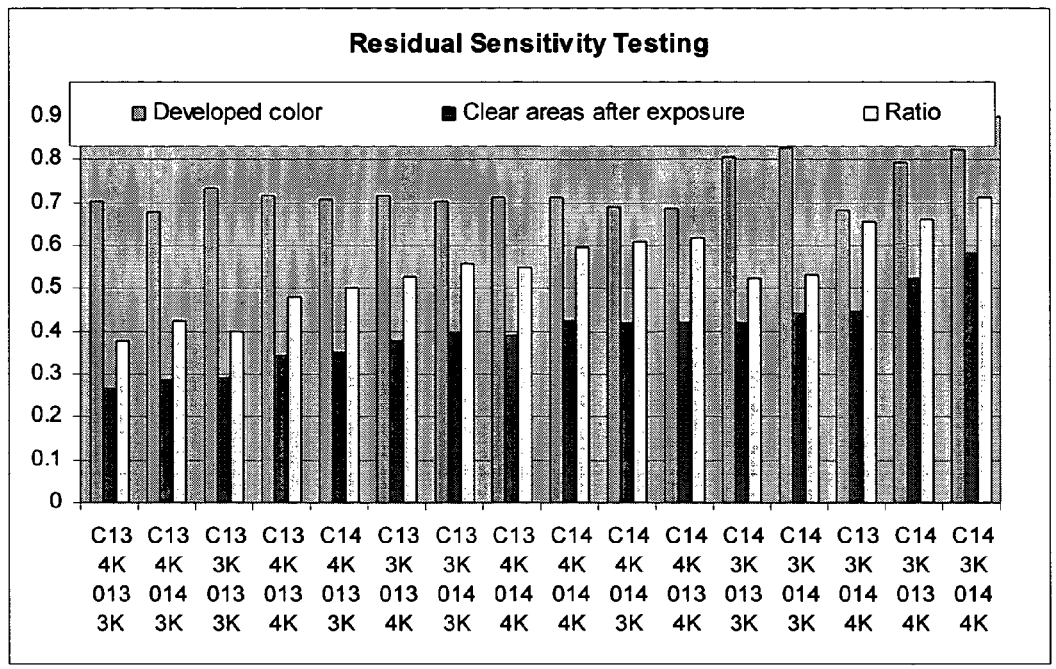
FIG. 51 depicts residual sensitivity in a two coating system.
Figure 52:
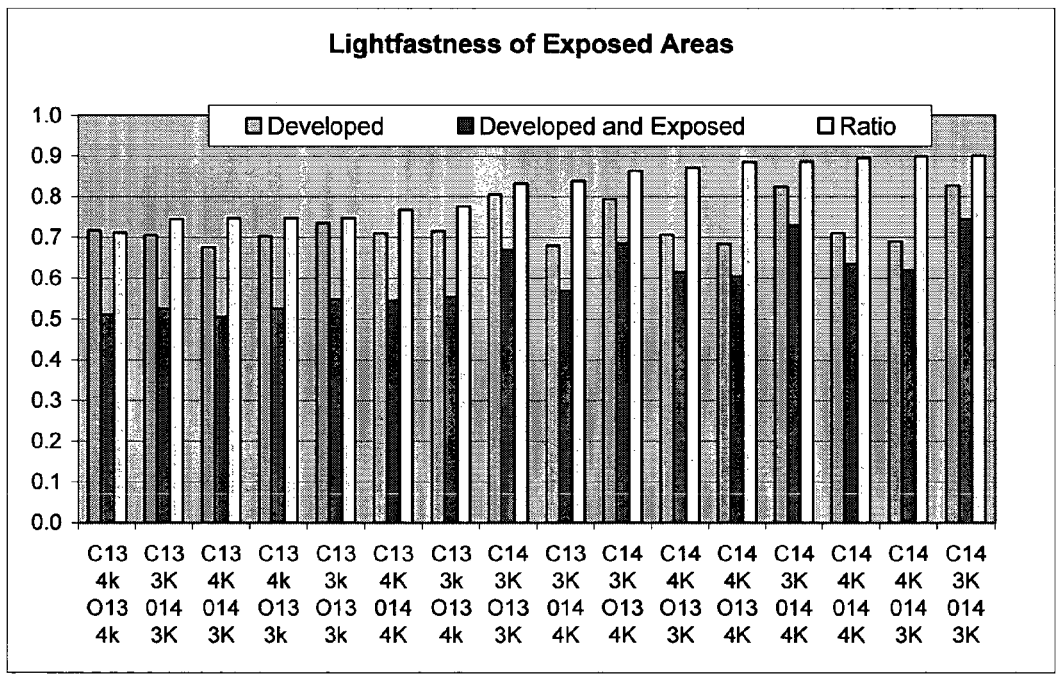
FIG. 52 depicts lightfastness in exposed areas.

Residual sensitivity of the coating 100 is shown in FIG. 51. The samples break up into two main groups depending on photoacid generator concentration. It was noted that in both cases, Overcoat (013) appeared to provide better UV protection than Overcoat (014). The formulation C13 appeared to have the least residual sensitivity and appeared to provide the best optical density ratio for unexposed areas to exposed areas. Further, it was noted that the results for this ratio may, however, include some bias. This bias may result from not exposing the C14 formulation for an adequately long time so as to more fully develop the ultimate color, and thereby effectively reducing the developed color of the C14 formulations. Also, as might be expected, the coatings 101 with the highest amounts of photoacid generators and color formers retained a larger amount of their color upon prolonged light exposure. This effect is shown in FIG. 52.

Figure 53:
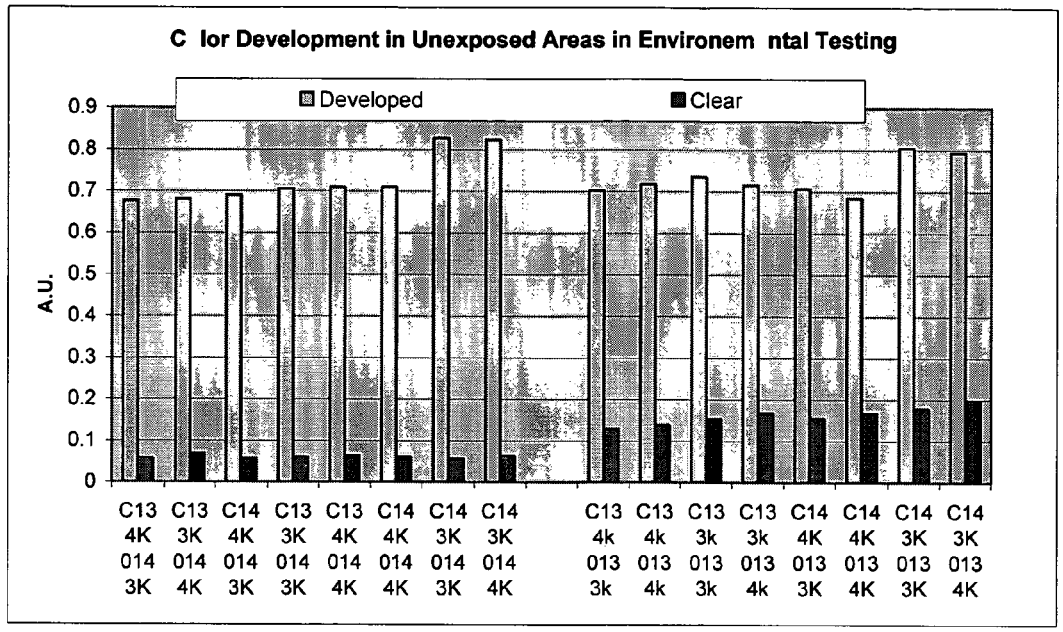
FIG. 53 depicts color development from environmental testing.

Environmental testing at 70° C. and 90% relative humidity showed that acid migration from the topcoat to the bottom coat is possible. Results are provided in FIG. 53. A clear split in the level of background color is seen in the formulations which do not contain acid (Overcoat O14) and the acid containing coating (Overcoat O13). Therefore, the utility of the acid in the amine/ink test will have to be confirmed before SB-520 or equivalents are included in the formulation. If necessary, a trade-off/optimization study may be performed to minimize color development form this topcoat 102 while still imparted ink resistance.

Figure 54:
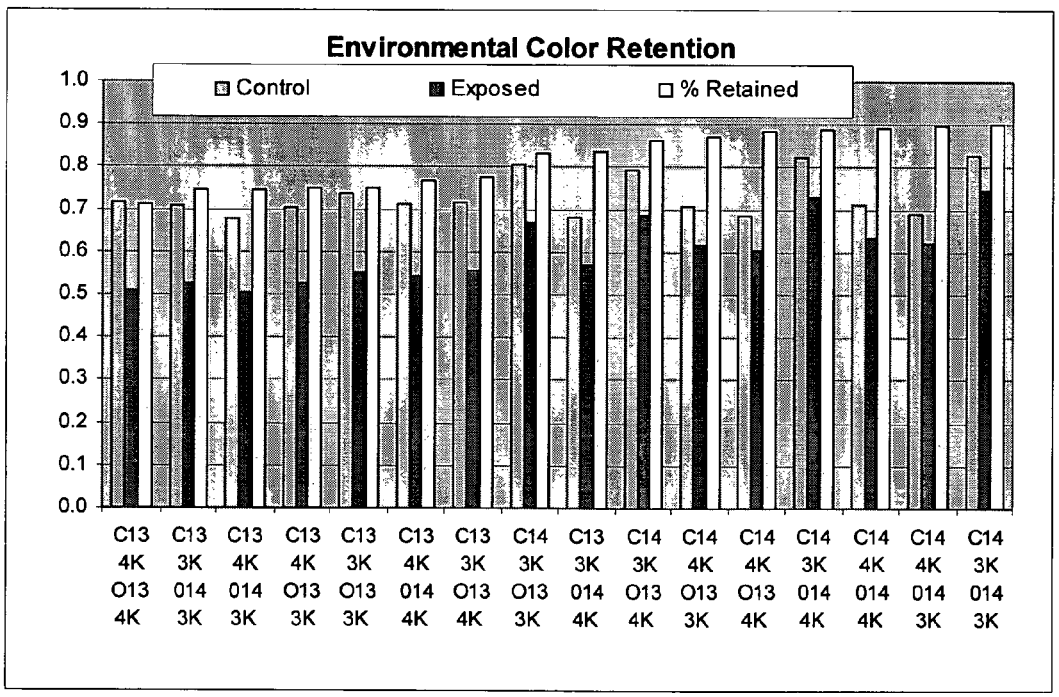
FIG. 54 depicts environmental color retention.

Finally, the level of color retained after environmental exposure was substantially governed by the photoacid generator and color former concentrations, and not the thickness of the film 101 or compositions used in the overcoat 102. Results are provided in FIG. 54. Results show that optimization of the photoacid generator and color former ratios and concentrations in order to achieve the desired color density and writing cycle time will affect much of the lightfastness and environmental stability.

5. Amine Testing

Amine testing was repeated using the new formulation. At first, the applications of new formulations for the color forming layer 101 appeared to hold up to the amine test without an overcoat 102 and without any degradation. However, a DVD 10 marked with a first pattern of images showed some significant fading after prolonged storage in a first DVD storage case 180 with the insert materials included. The storage case 180 used was actually one purchased from a retailer, and considered representative of a commercially available DVD storage case 180. This provided a hint that perhaps the previously conducted triethyl amine (TEA) based test was inadequate for the revised formulations. Therefore, a new test was performed using a larger amount of TEA in a standard plastic DVD box 180 similar to the first DVD storage case 180. A large piece of filter paper 181 was used to replace the insert, and 1 ml of TEA was distributed around the filter paper 181. This test failed to induce any fading in the pattern of images in the coating 101. It was then thought that perhaps a more volatile and mobile base was needed, such as ammonia.

A first attempt at this test consisted of placing a 200 µl drop of concentrated ammonium hydroxide in the middle of the filter paper 181 and sealing the discs 10 in a storage case 180. This led to complete destruction of the images on all discs 10, with or without any overcoating. The amount of ammonium hydroxide used proved to be excessive and practically was most likely well beyond what would be encountered in a package. Accordingly, a second test was performed using 25 µl of ammonium hydroxide. Within two hours the discs 10 without an overcoat 102 and the overcoat 102 without acid were both completely faded (the overcoat may have been slightly better), while the overcoat 102 containing acid did retain most of its original color, except for the areas closest to the ammonium hydroxide spot (which were around the stacking ring). Over the next several hours, these discs 10 also deteriorated significantly from the inner ring radially outward. Again, the amount of ammonium hydroxide used may have been excessive when compared to the environment of a typical optical media package 180, such as for a CD or a DVD.

The test was repeated with 10 µl of concentrated ammonium hydroxide. The disc 10 without the overcoat 102 deteriorated within an hour, as before. However, this time the disc 10 with the overcoat 102 formed from the O14 formulation retarded the fading by a few hours. The disc 10 with the overcoat 102 formed from the O13 formulation was essentially unchanged and only showed signs of fading near the middle of the disc 10 after a day.

Three more samples were placed in the original 200 µl packages after the packages had been sitting closed for a few days. After 24 hours, the unprotected disc 10 showed moderate fading, while the discs 10 having overcoat layers 102 were both still robust. In order to complete further testing, additional DVD storage cases 180 were obtained. Samples of each overcoated disc 10 were placed into the new packages to see if more gradual fading would be induced. Neither overcoat samples showed any signs of fading after three days.

6. Quantitative Study

Metalized substrate 17 were coated using the color coating formulation containing a photoacid generator to color former ration of 2.0% TPST:3.5% CF. The components for each of the formulations tested in the quantitative study are presented in Table 25. The formulations were applied to the substrate 17 by spin-coating at 4K rpm for 10 seconds. The disks 10 produced were cured under the L-37 UV filter, in a nitrogen environment, and using the XENON D-bulb for 2 seconds at a distance of about one inch. Each disk 10 was then exposed Under the D-bulb for 10 seconds at a four inch distance to produce color. Finally, a topcoat 102 was manually applied to each disk 10 using various formulations on the HEADWAY. This Topcoat 102 was cured under the D-bulb for 3 seconds at a distance of one inch.

TABLE 25

Formulations for the Quantitative Study of Amine Degradation

| Component | Formulation No. | | | | | | |
|---|---|---|---|---|---|---|---|
| | O14 | O13 | O15 | O16 | O17 | O18 | O19 |
| Wetting Agent | | | | | | | |
| TEGO RAD 2200 N | 1 | 1 | 1 | 1 | 1 | 1 | 1 |
| Photoinitiator | | | | | | | |
| KTO/46 | 8 | 8 | 8 | 8 | 8 | 8 | 8 |
| CN-384 | | | | | | | |
| Diluents | | | | | | | |
| SR-339 | 26 | 26 | 26 | 26 | 23.5 | 21 | 16 |
| Main Components | | | | | | | |
| SR-368D | 20 | 20 | 18 | 20 | 20 | 20 | 20 |
| CN-120M50 | 45 | 25 | 17 | 35 | 45 | 45 | 45 |
| SB520M35 | | 20 | 30 | 10 | | | |
| Acrylic acid | | | | | 2.5 | 5 | 10 |
| TOTAL PIGMENTS | 100 | 100 | 100 | 100 | 100 | 100 | 100 |
| UV-24 | 10 | 10 | 10 | 10 | 10 | 10 | 10 |

Figure 55:
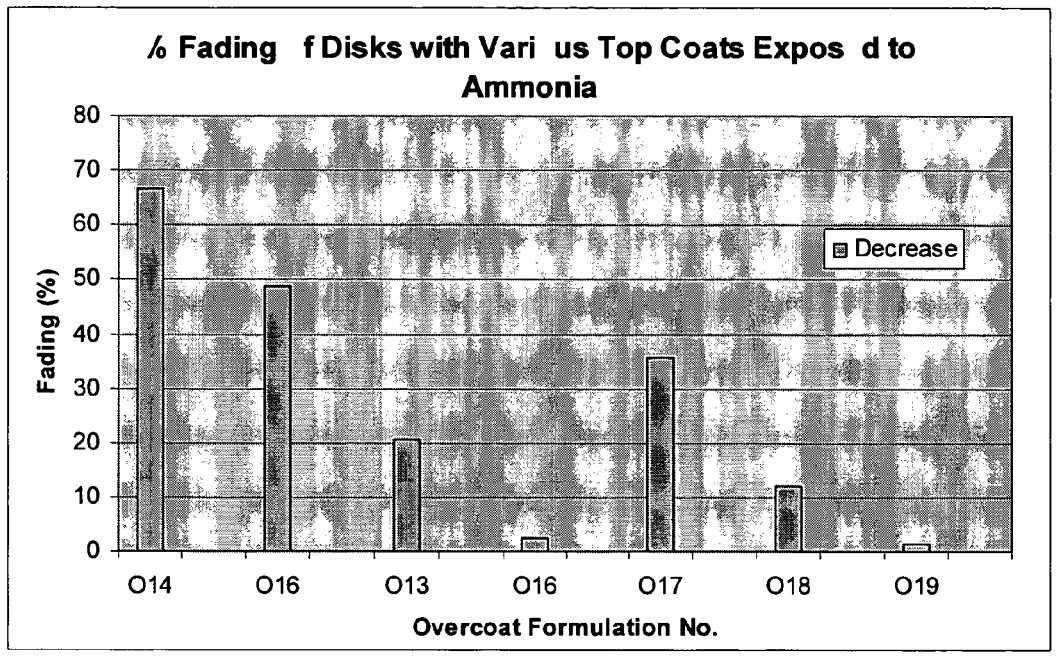
FIG. 55 depicts fading from an amine study.

Optical density of each disk 10 was measured using an Ocean Optics Spectrometer. The absorbance at 540 nm was measured. The disks 10 were placed into individual DVD cases 180 and exposed to 10 μl of ammonium hydroxide. The ammonium hydroxide was placed in the center of a piece of filter paper 181 that had been fixed to the inside cover of each case 180. The cases 180 were closed and left to sit. Periodically, each disk 10 was removed from each case 180, and optical density measurements were performed to evaluate the loss of color. Resulting data is presented in FIG. 55.

7. Physical Properties of the Coatings

Figure 56:
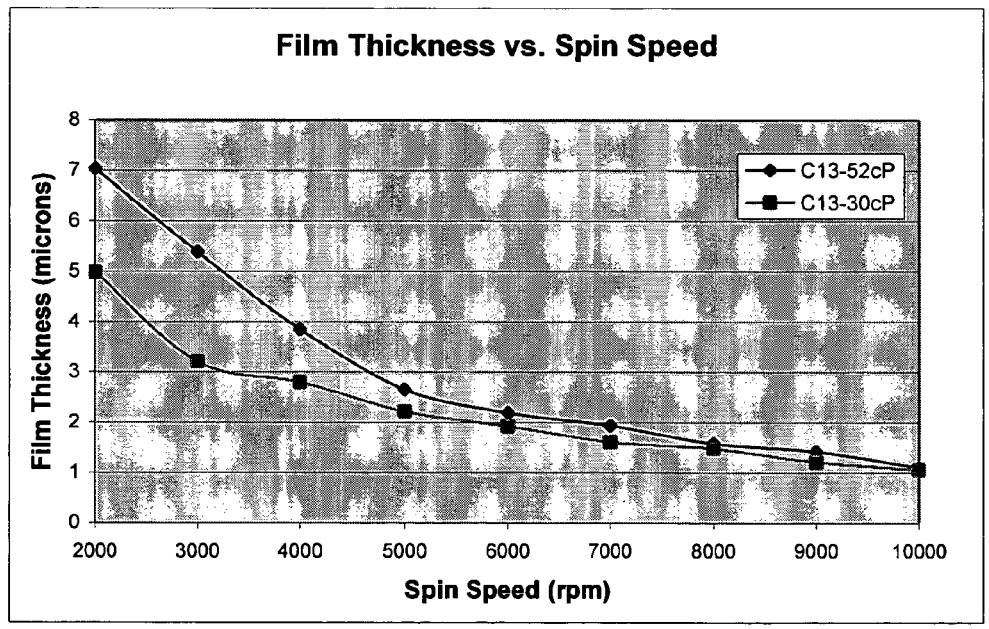
FIG. 56 depicts film thickness as a function of spin speed.

A modified version of the formulation for the color forming layer 101 was prepared by diluting the formulation with 30% by weight of a 5% KTO-46 in SR-238 diluent. Film thickness versus spin speed curves were generated for both formulations. Each formulation was then spun coat onto borosilicate glass discs from 2K-10K rpm in intervals of 1K rpm. The color forming layer 101 on the discs 10 was then cured for two seconds under L37 with the Xenon D bulb in a nitrogen atmosphere. Tape was then applied to the disc 10 to remove the coating and then tested on the WYKO to determine the thickness of the film 101 in two different areas on the disc. FIG. 56 shows the results of the average film thickness for each spin speed. This experiment shows that the original color coat, C6, has a greater film thickness when applied using spin speeds (S.S.) from about 2K-5K rpm. After that, however, the two samples proved to be very similar.

8. Viscosity vs. Temperature

Figure 57:
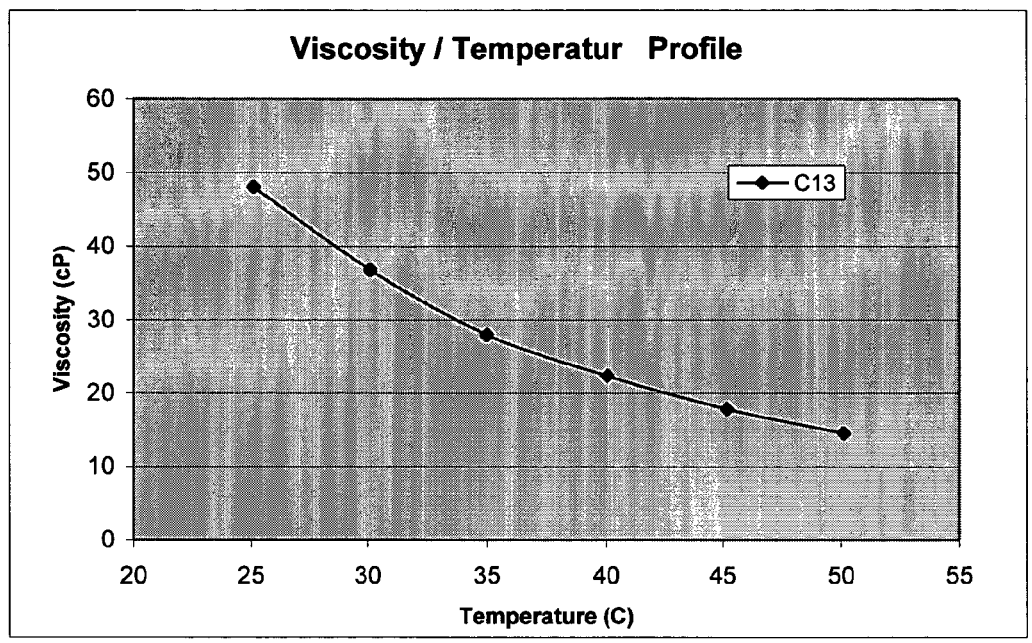
FIG. 57 depicts viscosity as a function of temperature.

In typical replication machines, the lacquer for the color coating can be dispensed at different temperatures. Accordingly, the viscosity as a function of temperature was determined. Viscosity measurements were performed at a temperature range of about 25° C. to about 50° C. in intervals of about 5° C. Measurements were performed with the Brookfield LVDV-III+CP rheometer and spindle CPE-40 at 4.75 rpm. The viscosity and temperature profile is shown in FIG. 57 for color coat C6. As expected, the viscosity of the lacquer decreases with increasing temperature.

9. Viscosity vs. Shear Rate

The spin-coating process imposes varying shear rates upon the lacquer. Since viscosity is a function of shear rate, obtaining this profile was also desired. Certain practical limitations prevented determining the exact values of the shear rates during spincoating. However, a range of viscosity and shear rate measurements were taken to assess properties of the lacquer. The measurements were performed over a range from a low rate to the maximum shear rate available using the Brookfield LVDV-III+CP and spindle CPE-40. The maximum shear rate achieved with this particular lacquer was 45/second. It is considered that if higher shear rates are desired, exchanges of some of the hardware components in the spin coating system may be performed. For example, using spindles CPE-51 and CPE-52 should provide for higher shear rates than the CPE-40 spindle. These spindles are compatible with this rheometer and are capable of producing higher shear rates.

Therefore, a program was designed to obtain low and high shear rates by varying the speed of the spindle. Speeds from 1K to 6K rpms, in intervals of 1K rpm, were used to increase the shear rate. Then, the speeds were taken from 6K rpm back down to 1K rpm. The rheogram in FIG. 58 shows the viscosity and shear rate relationship.

Figure 58:
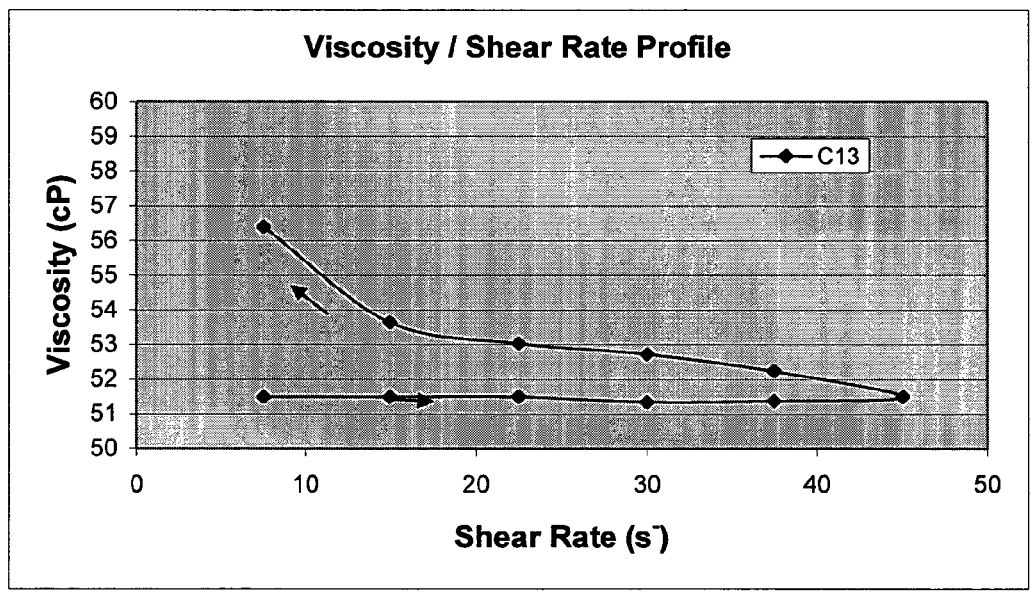
FIG. 58 depicts a shear rate profile.
Figure 59:
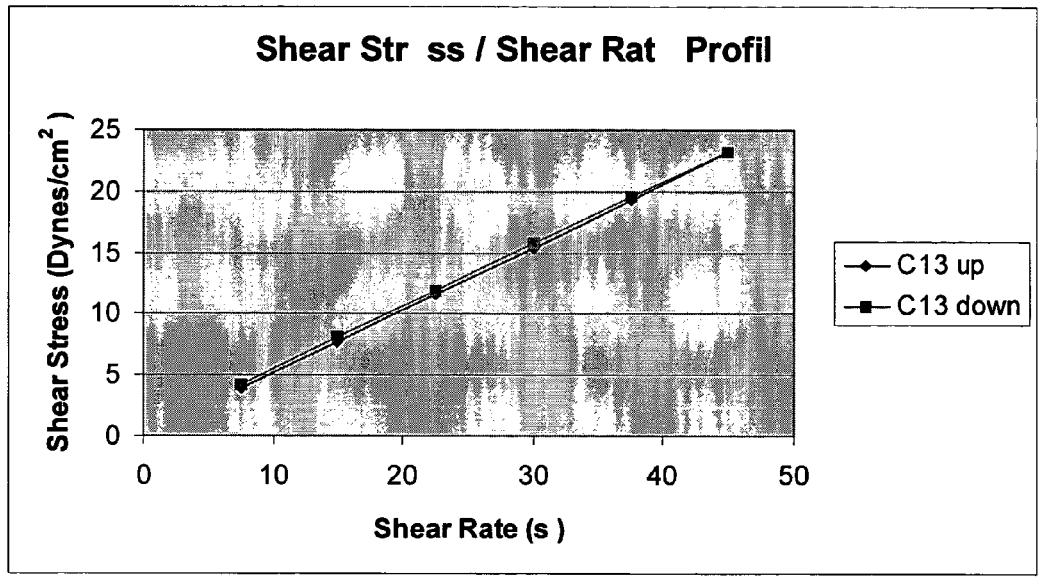
FIG. 59 depicts a shear stress and shear rate profile.

FIG. 58 shows that the bottom layer 101, (containing formulation c6), viscosity was nearly constant with increasing shear rates. However, with increased time of shearing, the viscosity increased. The increasing shear curve implied the formulation is a Newtonian fluid. However, the decreasing curve implied the fluid rheology is time dependent. Another type of graph that shows how the fluid behaves is a shear stress and shear rate profile is provided in FIG. 59. In FIG. 59, the linear relationship between shear stress and shear rate confirms that the fluid is Newtonian, in both shearing directions.

Figure 60:
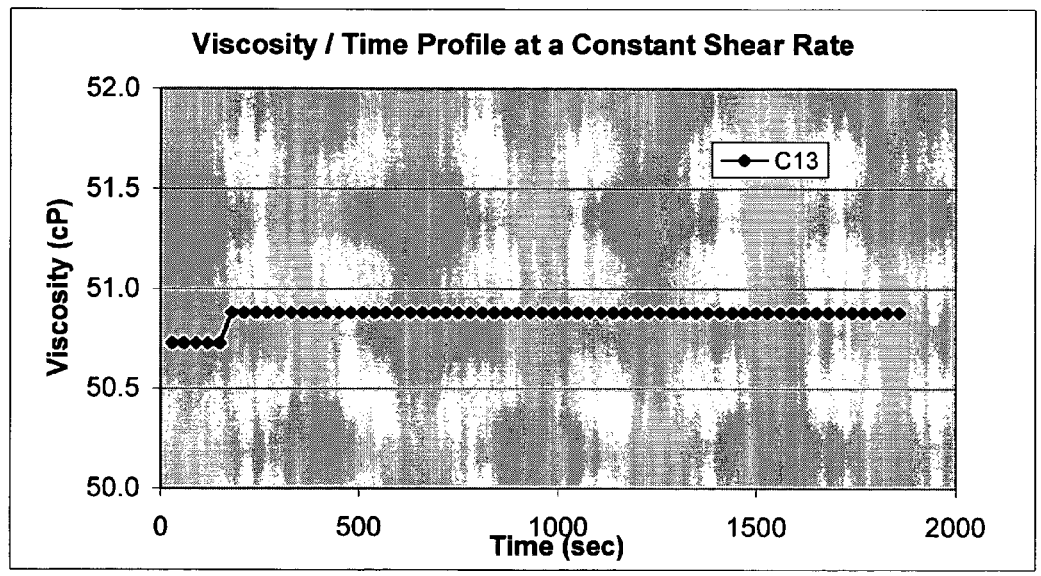
FIG. 60 depicts viscosity for a constant shear rate.
Figure 61:
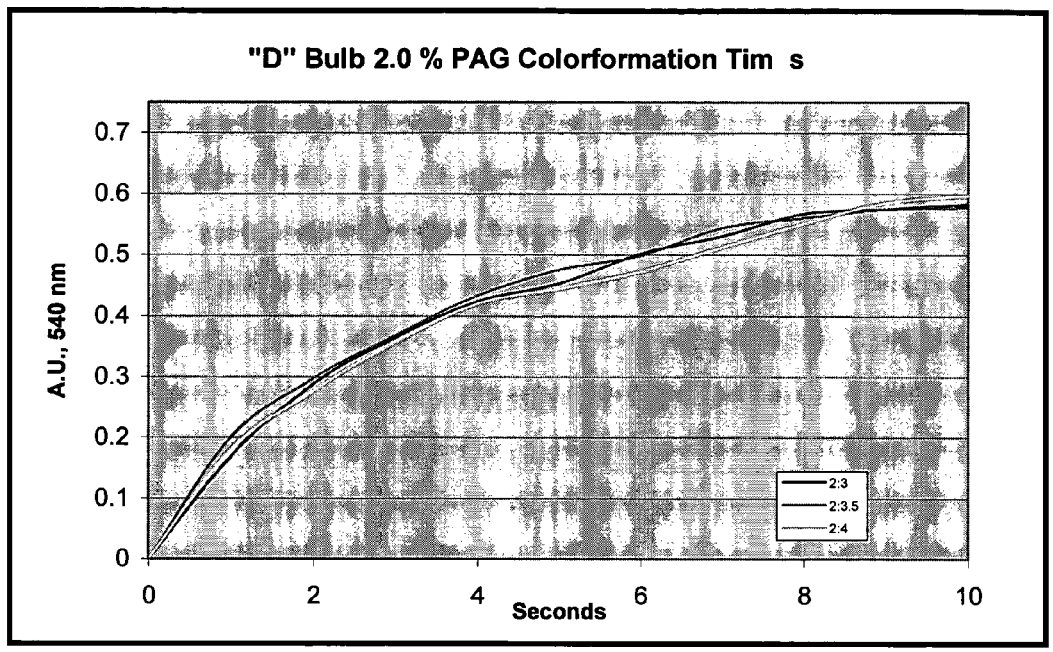
FIG. 61 depicts color formation for a set of photoacid generators and color formers.
Figure 62:
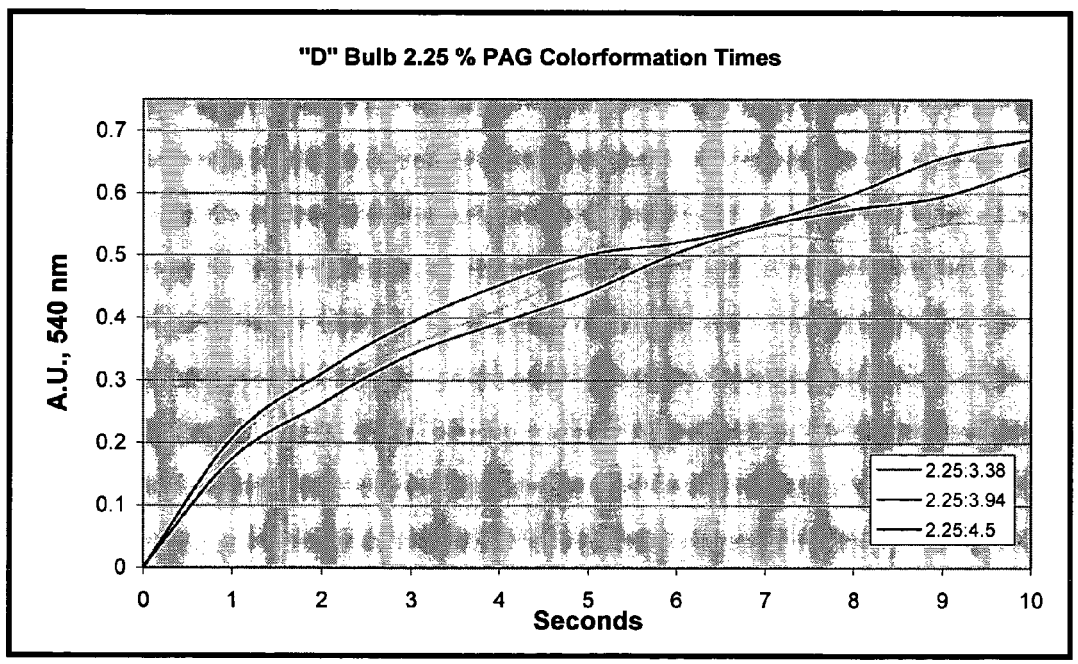
FIG. 62 depicts color formation for a set of photoacid generators and color formers.
Figure 63:
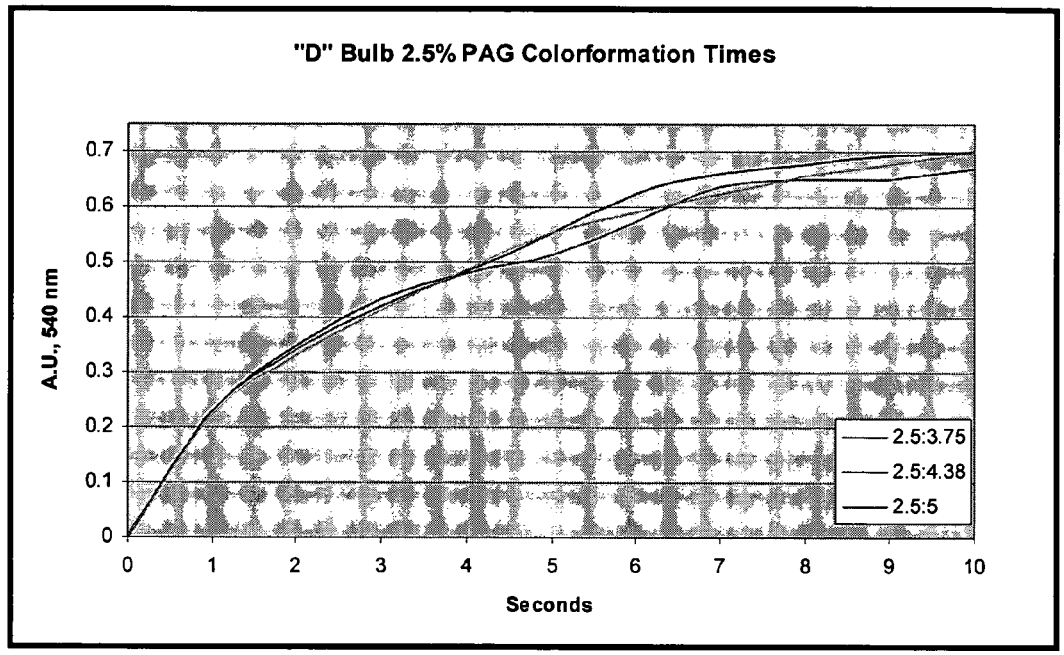
FIG. 63 depicts color formation for a set of photoacid generators and color formers.
Figure 64:
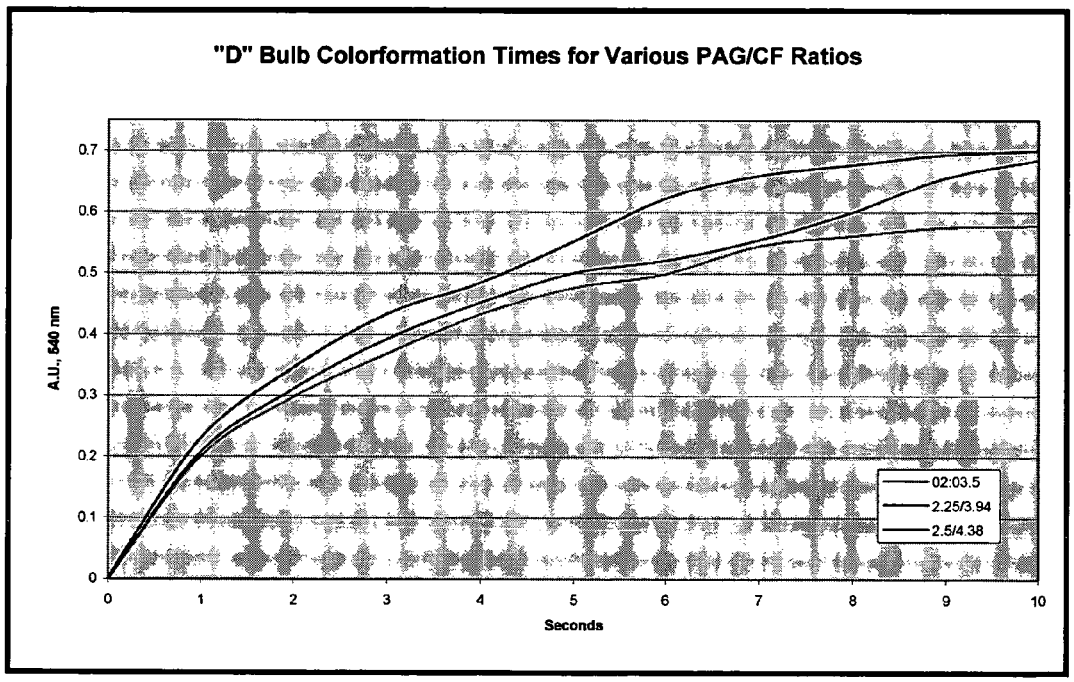
FIG. 64 depicts color formation for a set of photoacid generators and color formers.

Another experiment was conducted to see if the color coat rheology was time dependent, which the decreasing viscosity and shear rate curve showed could be possible. To investigate this, viscosity measurements were taken while the shear rate and temperature were kept constant over a period of time. Again, the LVDV-III+CP and spindle CPE-40 were used. The spindle speed was set to 2K rpm. The time profile shown in FIG. 60 verifies that the viscosity will remain constant with time, concluding that formulation C6 exhibits Newtonian flow behavior.

10. Color Formation with Various Lamps.

Color formation experiments were done with the 9 samples shown in Table 26 with three different light sources. Each of the photoacid generator and color former combinations shown were included in the coating base for formulation C7 (containing 5% KTO, 35% SR-238, 30% SR-368D, and 30% CN-120B60). Three sets discs 10 containing the formulations were made and exposed separately using the XENON D Bulb, XENON C Bulb, and HONLE lamp. Exposure times ranged from 1 to 10 seconds in intervals of 1 second. A metallized substrate 17 was placed beneath each disc 10 to provide a reflective background. All samples were prepared by spincoating the formulations onto clear polycarbonate substrate 17, at speeds of 4K rpm on HEADWAY. The formulations were cured in a nitrogen environment, using a XENON D Bulb and the L37 UV filter for two seconds.

TABLE 26

Formulations for Color Formation Experiments with Varying Lamps

|  | 1 | 2 | 3 | 4 | 5 | 6 | 7 | 8 | 9 |
|---|---|---|---|---|---|---|---|---|---|
| TPST | 2 | 2 | 2 | 2.25 | 2.25 | 2.25 | 2.5 | 2.5 | 2.5 |
| PERG I-6B | 3 | 3.5 | 4 | 3.38 | 3.94 | 4.5 | 3.75 | 4.38 | 5 |

This study was designed to test several variables. The first was the effect of modifying the ratio of photoacid generator to color former. Typically, a 2:3 ratio had been used, but this was not known to be the preferred ratio. Second of all, preferred concentrations of photoacid generators and color formers were to be evaluated. This included assessing the effect varying concentrations had on color formation time. Further, the use of different bulbs on color formation time was to be evaluated. The XENON "D" and "C" bulbs put out different amounts of short UV. It was recognized that the effect of short UV on color formation was not characterized well. In addition, the HONLE "H" bulb was a continuous wave mercury vapor solution with a line spectrum quite different from a xenon lamp, and it was considered that testing this lamp could prove informative. The HONLE lamp being available from Hönle UV America, Inc., of Marlboro, Mass.

11. Photoacid Generator to Color Former Ratio

FIGS. 61-64 illustrate the effect of photoacid generator to color former ratio on color formations. Looking at each different photoacid generator concentration as a set, it appeared that a general trend is followed. FIGS. 61-64 show that color formation in samples having a ratio (or equivalent thereof) of 2:3.5 perform better than samples having ratios of 2:3, which perform better than samples having ratios of 2:4.

It was considered that the apparent poorer color formation for the higher color former ratio could have been due to higher absorption of UV light, resulting from unactivated color formers in the formulation. While this trend appeared to hold for each concentration of photoacid generators, it was noted that a higher color former concentration may lead to better environmental or lightfastness. Also, it was noted that the difference in performance between these ratios was small, so any added benefit from a higher color former ratio would most likely be justified.

Assuming that the optimal ratio of photoacid generator to color former is close to 2:3.5, a direct comparison of the effect of photoacid generator concentration on color level can be made. The increase in color tracks roughly with the increase in photoacid generator to color former concentration.

12. Lamp Effects

The efficiency of writing for the three lamps was examined using both 2:3 and 2:4 photoacid generator to color former ratios. For simplicity, the lamps were compared at the 2.5% photoacid generator: 5% color former loadings, and the times were converted to fluence values using the combined UVA and UVB intensities measured on the GIGAHERTZ OPTIK power meter. The power levels are shown in Table 27.

TABLE 27

Lamp Power Levels

|  | C @ 4" | D @ 4" kW/m² | H @ 4" |
|---|---|---|---|
| UVA | 0.73 | 0.62 | 0.40 |
| UVB | 0.40 | 0.44 | 0.57 |
| UVA + B | 1.13 | 1.06 | 0.97 |

Figure 65:
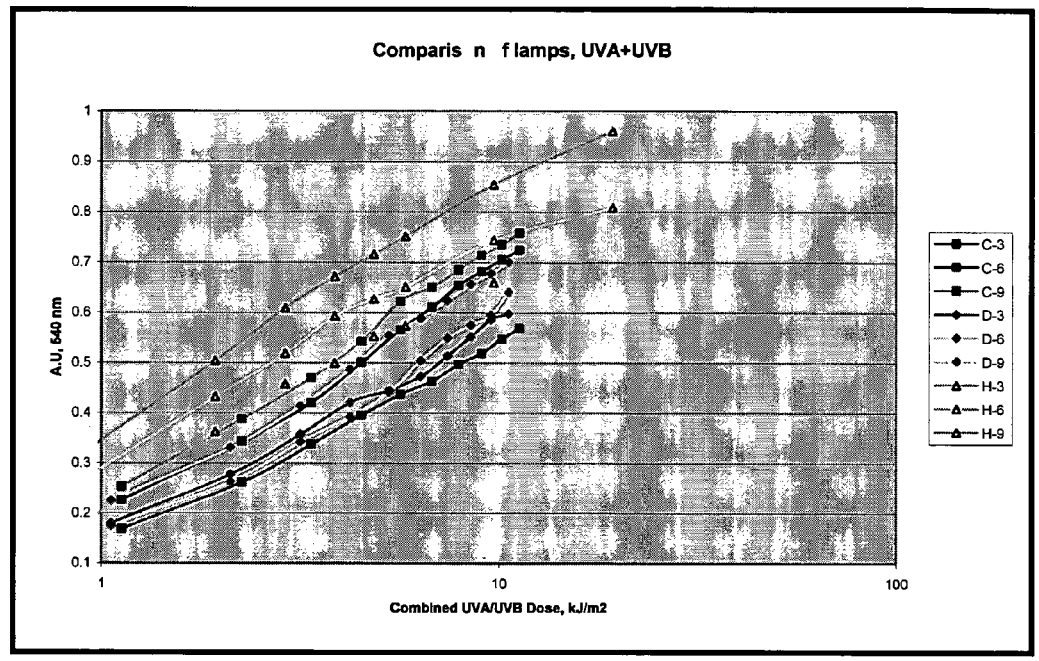
FIG. 65 depicts a comparison of light sources.
Figure 66:
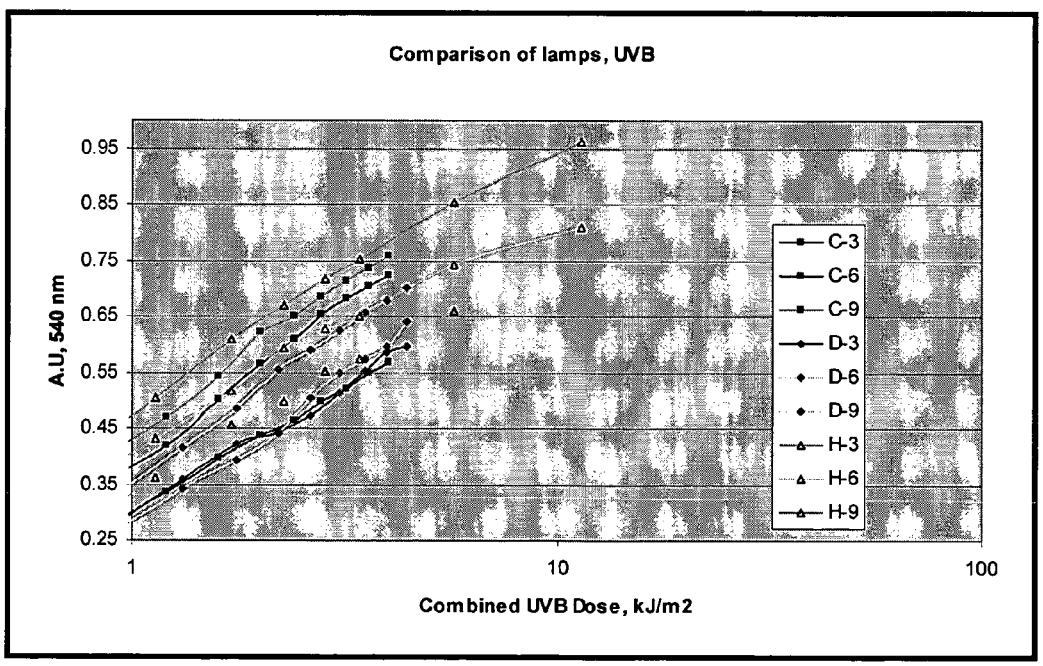
FIG. 66 depicts a comparison of light sources.
Figure 67:
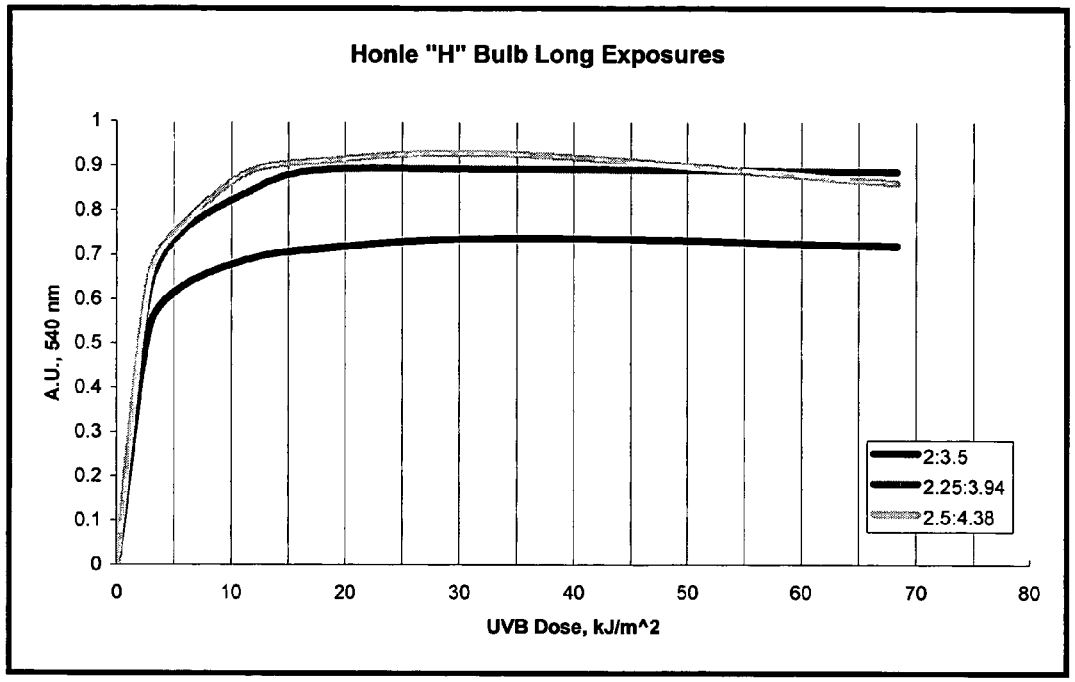
FIG. 67 depicts color formation as a function of fluence.

In general, the HONLE "H" bulb performed best on a fluence basis for the combined UVA/UVB levels, as shown in FIG. 65. However, it should be noted that the HONLE did put out more UVB than either XENON bulb. When only the UVB levels were used to plot the curves, as shown in FIG. 66, the HONLE lamp showed less of an advantage, but still appeared to be superior to the XENON bulbs. At any level, the HONLE and "C" bulbs are superior to the "D" bulb. Finally, the HONLE "H" bulb was used to perform long exposures to examine the maximum useful fluences for imaging the coatings. As seen in FIG. 67, a typical formulation begins to reach a maximum after about 5 kJ/m² of UVB exposure. In some embodiments, a full spectrum of UV is used to cure the overcoat 102.

13. Overcoating: Light Fastness of the Overcoat with Various UV Absorbers

Overcoat (O1) formulations were made with various UV absorbers at. 10% concentration. The various absorbers used are shown in Table 28. TINUVIN-327 did not go into solution, and the formulation using TINUVIN-R796 crystallized after 24 hours. TINUVIN-R796 is 2-(2'hydroxy-5'methacryloxyethylphenyl)-2H-benzotriazole, and is a reactive UV absorber capable of crosslinking into the coating.

TABLE 28

UV Absorbers Used in Overcoating

| UV Absorber | Formulary Viscosity (cps) | Physical Form | Edge Cure |
|---|---|---|---|
| UV 24 | 145 | Powder | No |
| MC80 | 99 | Liquid | Yes |
| T-171 | 110 | Liquid | Yes |
| T-213 | 141 | Liquid | Yes |
| T-327 | did not dissolve | Powder | Yes |
| T-571 | 119 | Liquid | Yes |
| T-R796 | Crystallized | powder | Yes |

Clear polycarbonate disks 10 were coated with formulation C6 and cured for 2 seconds in a nitrogen environment and using a L-37 UV filter at a one inch distance from the XENON C Bulb. The disks 10 were then imaged for 10 seconds at a distance of four inches from the lamp. Each topcoat 102 was applied over three disks 10 containing images. The disks 10 were cured under the XENON for 3 seconds at a distance of 1 inch. Each of the discs 10 cured nicely and exhibited good surface quality. Each of the formulations edge cured with the exception of the UV-24 formulation. The formulation containing MC80 had a pink coloration after curing.

Figure 68:
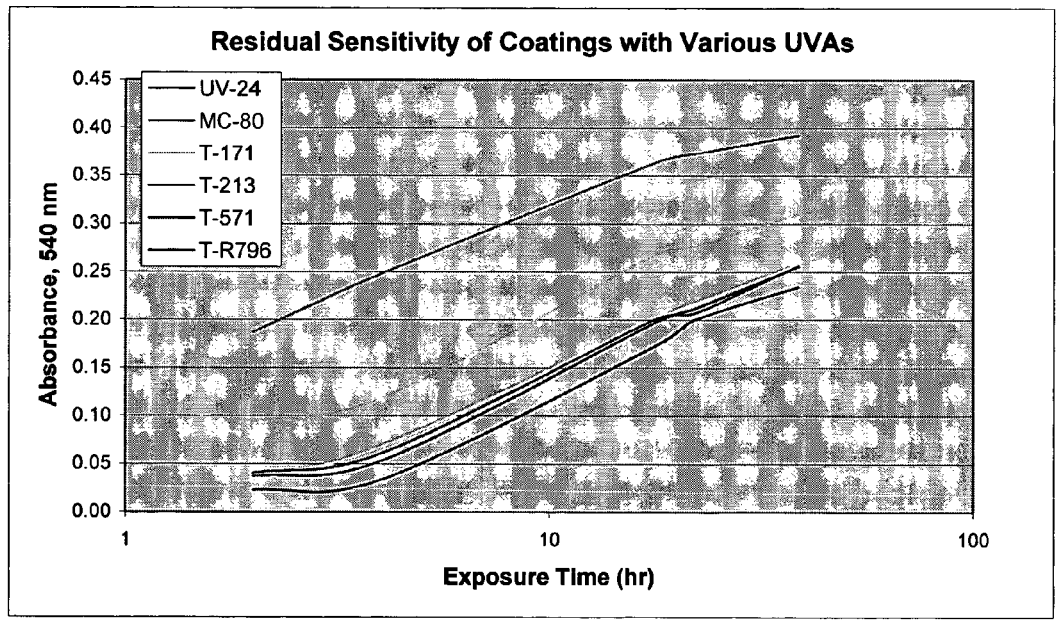
FIG. 68 depicts residual sensitivity of coating with various UV absorbers.
Figure 69:
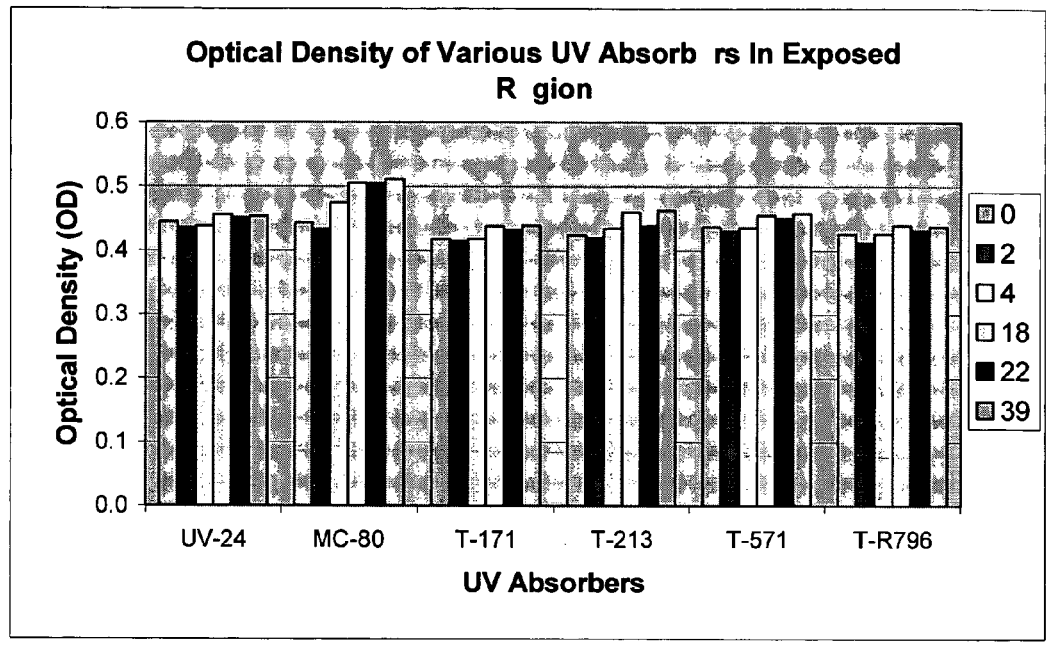
FIG. 69 depicts the optical density of exposed regions as a function of UV absorber.

Viscosity was measured for each of the formulations and optical density was measured on both cured and exposed regions of the disk 10. The disks 10 were placed in a light chamber and periodically removed and measured for optical density at 540 nm. Results are depicted in FIG. 68. It was noted that the UVA composition had almost no effect on the lightfastness of the exposed areas of the disks 10, as shown in FIG. 69.

The result of the foregoing development work is that a variety of formulations, and techniques for development of further formulations has been developed. These formulations, and the techniques for development thereof, provide for color forming materials that can be cured with wavelengths of light, and stimulated with wavelengths of light to produce and retain images, patterns, and other desired markings. These formulations may be advantageously applied over data features appearing in optical media. Most advantageously, aspects of the images may be controlled so as to avoid interference with readout apparatus used to interpret data stored in the data features. It should be recognized that the foregoing is illustrative of the formulations, and not limiting of embodiments that may be practiced. For example, it is considered that the introduction of other constituents, such as acid functionality to act as base scavengers in the overcoat 102 may further aid in the stability of image retention.

While all this work has supported the development of a set of coatings that give long lived images, the generation of temporary images is also of interest for some applications, such as security markings, limited-time promotional information, or novelty effects. In such cases, heat, humidity, ambient light, or other environmental conditions may be relied upon to degrade the image. The formulations reported herein, especially those without a protective overcoat 102, are capable of generating this time dependant degradation. In a preferred embodiment, this occurs once the optical media 10 is removed from the controlled environment provided by the packaging.

Having discussed aspects such formulations, and the development thereof, further aspects of the application and use of these formulations will now be discussed.

C. Embodiments of Coatings on Optical Media 10

It should be apparent to one skilled in the art that formulations having efficacy for use as described herein are not limited to the foregoing embodiments. Accordingly, further discussion of the coating 100, and properties thereof, are not limited by the particular aspects of the foregoing embodiments.

1. Two Layer Coating

Referring to FIG. 9 and FIG. 10, a review of the two embodiments of a coating 100 thus far is provided. In FIG. 9, a single layer coating is shown, wherein color forming materials are included with other components to produce a coating 100. In this embodiment, the coating 100 provides color forming attributes, as well as environmental stabilizers (such as UV absorbers). FIG. 10 provides a second embodiment, wherein components are separated into two layers 101, 102. In FIG. 10, the coating 100 is formed of a color forming layer 101 and an overcoat 102 (with the exception of FIG. 10B). In the two layer system, components of the color forming layers 101 are advantageously separated from components in the overcoat 102, thus providing for improved performance in regards to some of the properties of the coating 100. For example, the removal of UV absorbers from the color forming layer 101 and attendant use of the UV absorbers in the over coat layer 102 provides for selection of more robust UV absorbers that do not interfere with the imaging process.

UV absorbers are but one example of image enhancing agents that may be used in an over coat layer 102. Other non-limiting examples include materials that limit the effects of humidity, or enhance color (as described elsewhere herein).

2. Multiple Layer Coating

Figure 70:
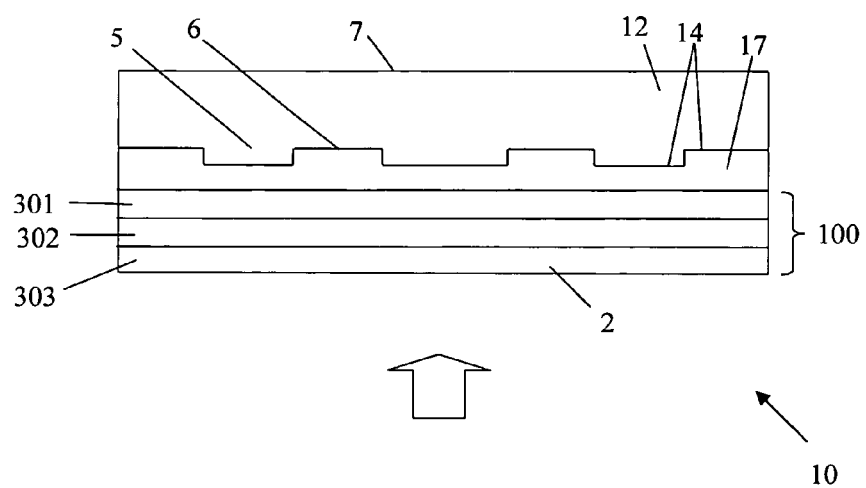
FIG. 70 is a cross section of an optical media having multiple layers applied over the reflective layer.
Figure 71:
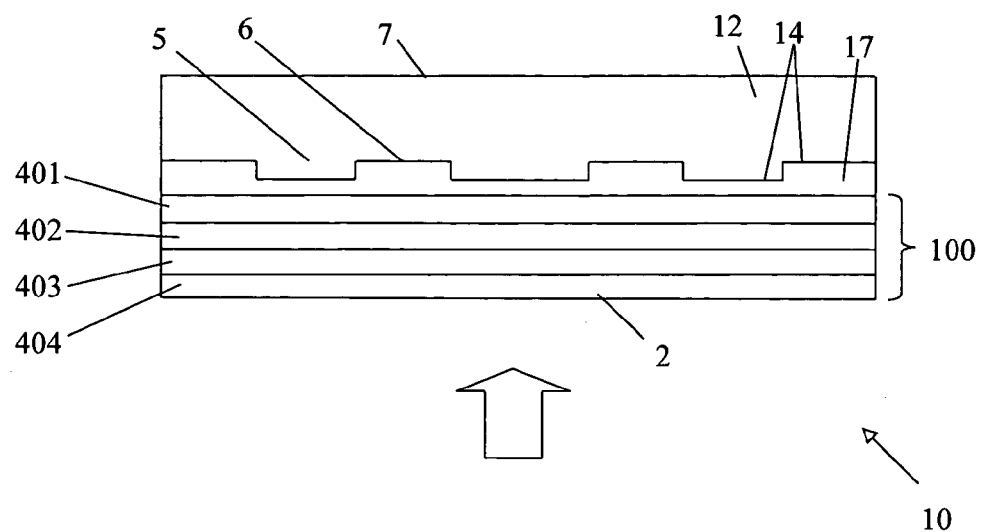
FIG. 71 is a cross section of an optical media having multiple layers applied over the reflective layer.
Figure 72:
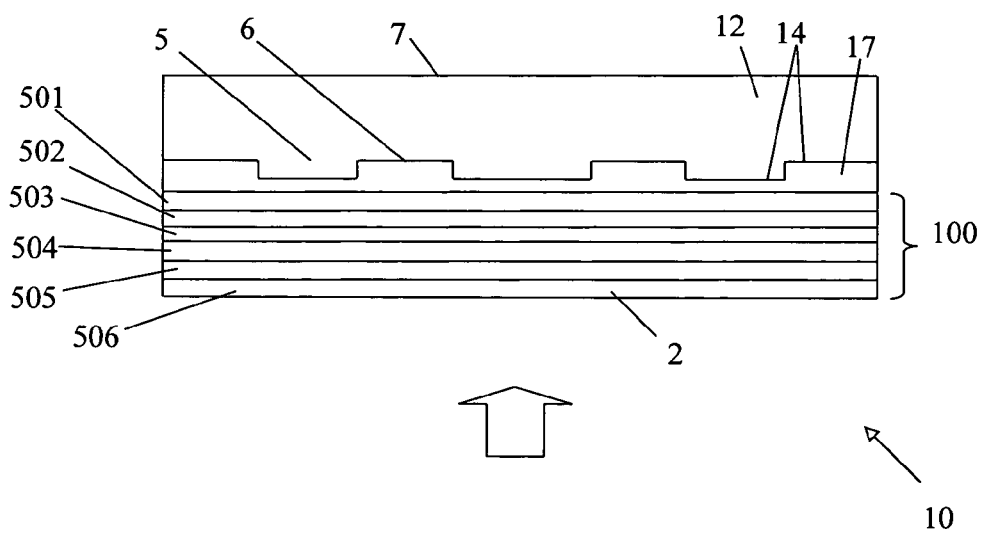
FIG. 72 is a cross section of an optical media having multiple layers applied over the reflective layer.

Further, non-limiting, embodiments are presented in FIGS. 70-72. In a further embodiment, shown in FIG. 70, three layers 301, 302, 303 are employed. In one embodiment depicted by FIG. 70, the first layer 301 and the second layer 302 are color forming layers 101, where each color forming layer 101 produces a distinct color, such as red in the first 301, and green in the second 302. The third layer 303 is deployed as an overcoat 102, which is designed to protect against environmental factors. In another embodiment, the optical media 10 shown in FIG. 70 is formed so that the first layer 301, the second layer 302, and the third layer 303 are applications of formulations for single layer embodiments. In these other embodiments, each layer 301, 302, 303 produces a distinct color, such as one of red, green, and blue.

In FIG. 71, a coating 100 containing four layers 401, 402, 403, 404 is shown. In one embodiment, the first layer 401 is a color forming layer 101, while the second layer 402 is a protective overcoat 102. The third layer 403 is also a color forming layer 101, while the fourth layer 404 is another protective overcoat 102. Alternatively, each of the first layer 401, the second layer 402, and the third layer 403 are color forming layers 101, while the fourth layer 404 is a protective overcoat 102. In this alternate embodiment, the color formed in each of the first three layers 401, 402, 403 may correspond to a primary color, such that upon completion of imaging, a multi-color image is apparent.

In FIG. 72, a further embodiment of a coating 100, a six layer embodiment, is shown. In one instance, alternate layers 501, 503, 505 are color forming layers 101, while overcoat layers 102 are inlcudes as layers 502, 504, 506. In this embodiment, each of the alternate layers 501, 503, 505 correspond to a specific color, such as one of the primary colors. Imaging of each of the layers 501, 503, 505 provides for the collective appearance of a multi-color image.

In some embodiments, such as those shown in FIGS. 70-72, at least a portion of the target layer materials is used. That is, in FIGS. 70-72, a portion of the substrate layer 17 contains polycarbonate, without any color forming materials. This embodiment is preferable where compositions used in the color forming layers 301, 401, 501 include materials having properties that might degrade the underlysing metalized layer 14. For example, at least a portion of the polycarbonate is retained as a barrier layer to protect the metalized layer 14 from acids in the color forming materials that could lead to oxidation (change in the reflectivity) of the metalized layer 14.

3. Multi-Color Disc

To make a disc 10 with multicolor images on it, multiple color forming layers 101 were applied. A study was performed to make a red and orange multicolor disc 10. The formulations used throughout the study are shown in Table 29.

TABLE 29

Color Forming Layers in a Multi-Color Disc

| Color | Red | Orange |
|---|---|---|
| Perg Red | 4 | |
| Perg Orange | | 3 |
| TPST | 2 | 3 |
| Base | 1b | 1b |
| KTO | 5 | 5 |
| SR-238 | 35 | 35 |
| SR-368D | 30 | 30 |
| CN-120B60 | 30 | 30 |

First, a metallized disc was spun coat at 4000 rpm for 10 seconds with the orange formulation. The orange formulation was then cured with the Xenon 'C' bulb for 3 seconds 1" away under window glass. A quartz mask was then placed over the disc 10 and exposed for 10 seconds 4" away with the same Xenon 'C' bulb. The resultant disc 10 had an orange image on it with a clear background. Next, the disc 10 was taken and spun coat again with the red formulation at 4000 rpm for 10 seconds on the Headaway. The red formulation was then cured for 3 seconds with the Xenon 'C' bulb 1" away under window glass. Finally, a photomask was placed over the disc 10 and exposed for 10 seconds 4" away with the Xenon 'C' bulb. The final product was a disc 10 with red and orange colored images on it with a clear background.

Spectra of the orange and red formulations were taken. These samples were spun coat on clear polycarbonate discs at 4000 rpm and cured and exposed as described above. Also, spectra of the different combination of layered colors were taken, whether the disc 10 was layered with a first coat of orange or red, and then with the other color on top.

Figure 73:
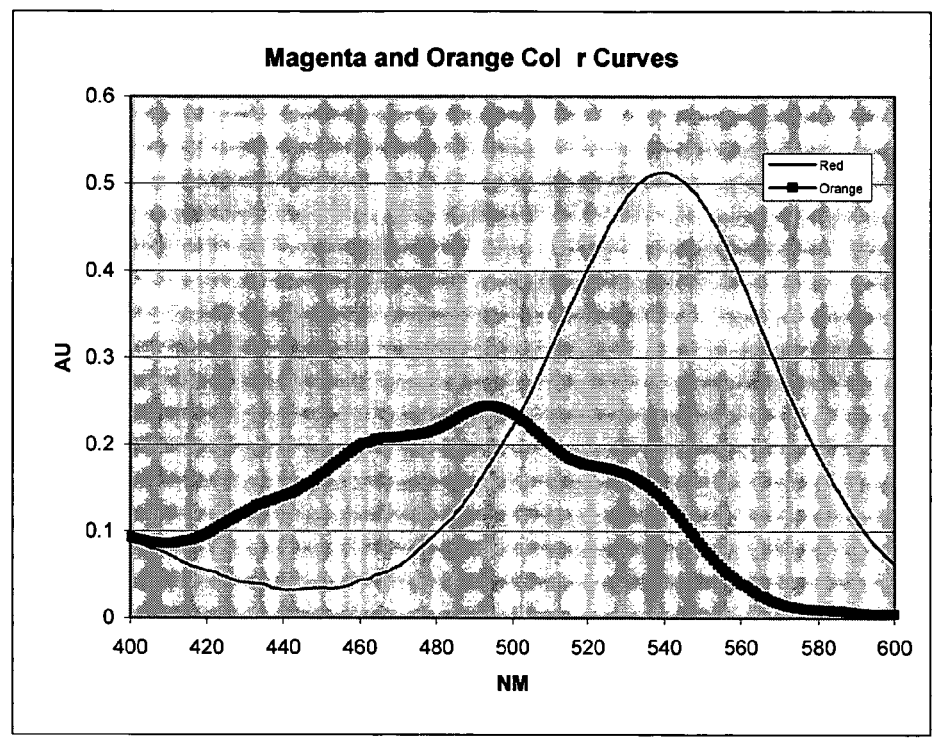
FIG. 73 is a graph depicting absorbance curves for orange and red color forming layers.
Figure 74:
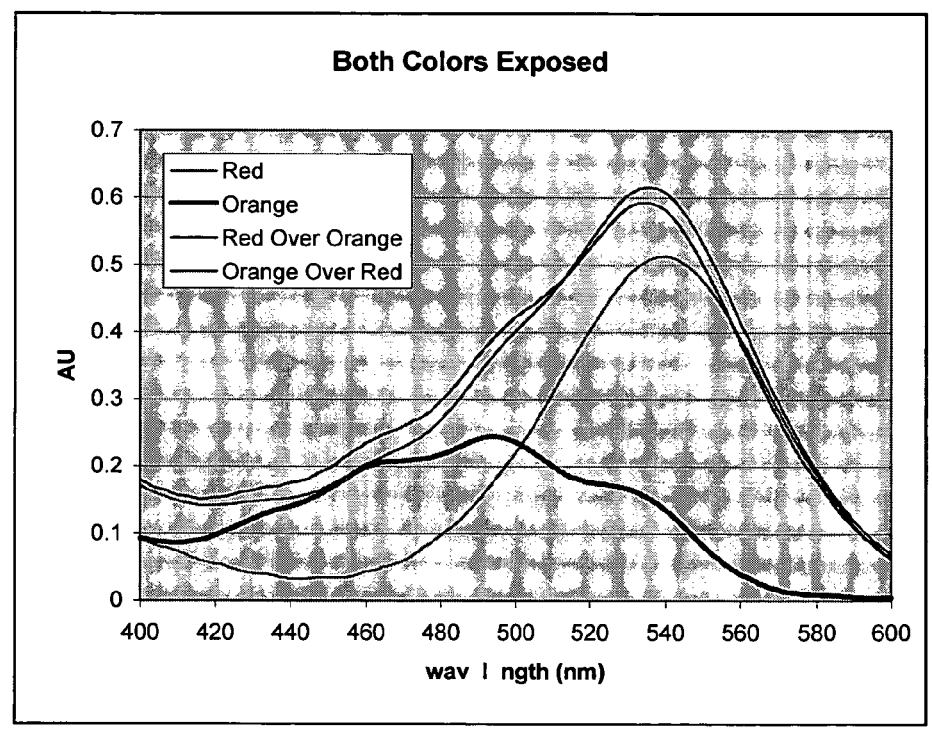
FIG. 74 is a graph depicting absorbance curves for a multicolor embodiment.
Figure 75:
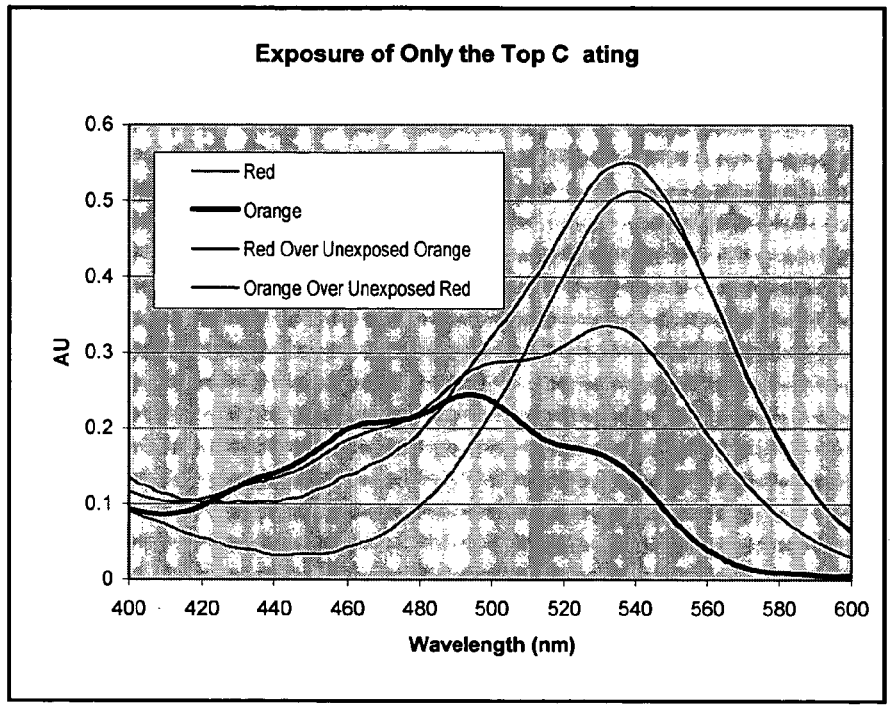
FIG. 75 is a graph depicting absorbance where only a top color forming layer is exposed.

FIG. 73 depicts the spectra of a red disc 10 and an orange disc 10, where each color has been evaluated separately. FIG. 74 shows that when the red layer and the orange layer are exposed together, the spectrum of the color obtained is essentially the same. This is without regard for the order with which the coatings are placed. Further, FIG. 75 shows that the top layer 101 in a series of layer 101 can be selectively exposed without fully developing the underlying layer. One may note the majority of the color developed in the top layer 101, while the underlying layer 101 remains relatively unexposed.

Figure 76:
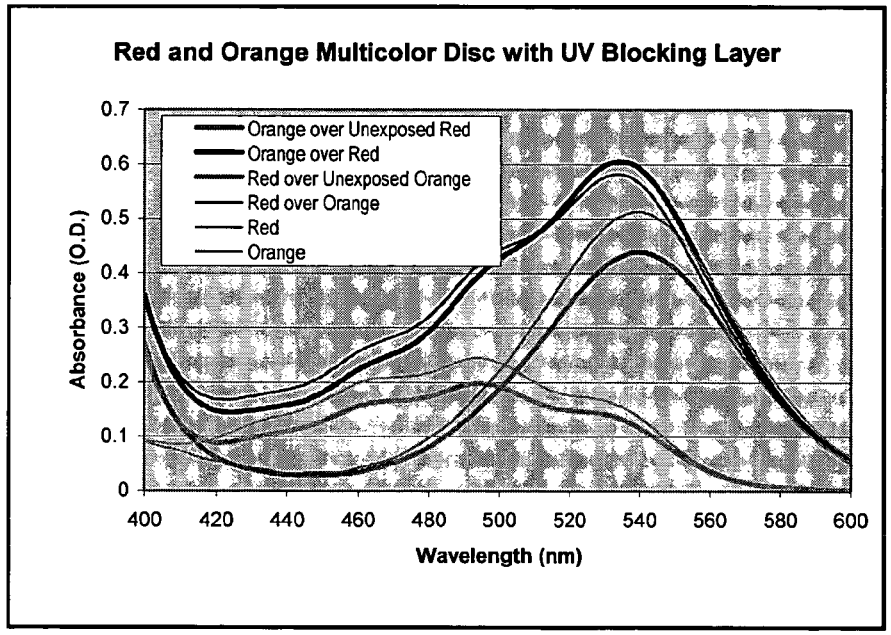
FIG. 76 is a graph depicting absorbance in a multi-color system having a UV blocking layer.

If desired, the selective development of the upper color layer 101 can be enhanced by adding a UV blocking layer 102 between the color forming layers 101. Table 30 provides a formulation for a UV blocking layer. This formulation was spun coat between the orange and red color forming layers 101. In this example, the UV blocking layer 102 allowed even better reproduction of only the single topmost color. Again, exposure of both color forming layers 101 led to the same total color regardless of the order in which the layers 101 were applied. Results are depicted in FIG. 76.

TABLE 30

UV Blocking Layer Used in Multi-Color Disc Study

| Wetting Agent | |
|---|---|
| TEGO RAD 220 N | 1 |
| Photoinitiator | |
| KTO/46 | 8 |
| Diluents | |
| SR-339 | 26 |
| Main Components | |
| SR-368D | 20 |
| CN-120M50 | 45 |
| TOTAL | 100 |
| PIGMENTS | |
| UV-24 | 10 |

As should be apparent, the foregoing embodiments make use of coatings that include color forming layers 101, overcoat layers 102, single layers 100, and a variety of combinations thereof. As one can surmise, many combinations may be developed. These can provide for a variety of effects, such as single or multi-color images.

Further, one may also surmise that staged application and imaging of layers in a coating 100 may provide certain advantages. For example, in one embodiment, a first layer 401 is applied and then has an image recorded therein. Subsequently, a protective overcoat layer 102 is applied as a second layer 402, and a third layer 403 is applied as a second color forming layer 101. The second layer 402 is used to limit exposure of the first layer 401 during the imaging of the second color forming layer 403, by use of materials that absorb imaging wavelengths. In this manner, one image is recorded in the first layer 401, with a second image recorded in the third layer 403. Recording of the second image proceeds without substantial interference with aspects of the first image. Similar techniques may also be used with single layer formulations where color forming materials are mixed with UV (or other wavelength) absorbers. Multiple wavelengths for curing and imaging may be used. In summary, a variety of application techniques, formulations, curing and imaging techniques may be used to achieve multiple effects in the collective appearance of the coating 100 upon an optical media 10.

4. Considerations for Use of Coatings in Existing Formats

Figure 83:
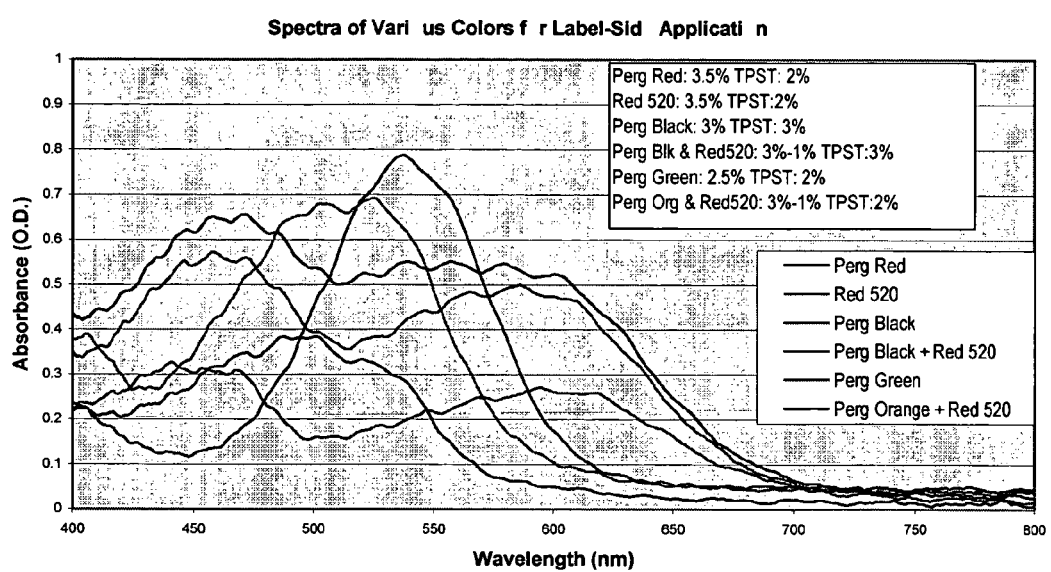

A coating 100 may be used advantageously in prior art optical media 8 shown in FIGS. 1-8. For example, in FIG. 1, one embodiment calls for use of a coating 100 to replace or lie over the acrylic protective layer 12 in the CD 8. A preferred formulation for this application would include C13 or C14. In this application, interference with the laser read out is not an issue so the use of additional color formers is possible. Therefore, the use of PERGASCRIPT Red 6B in C13 and C 14 can be replaced by a number of other colors. The spectra and ratios of color formers to TPST in the C13/C14 base coat is shown in FIG. 83.

Figure 2:
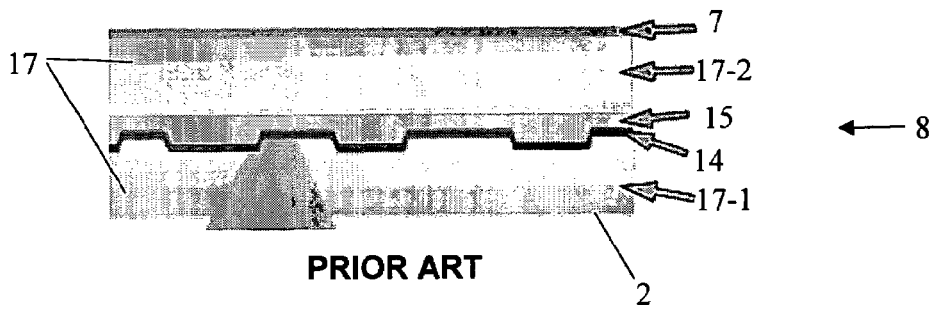
FIGS. 2-5 depict aspects of prior art optical media known as a DVD.

In the DVD-5, as depicted in FIG. 2, a color forming layer 101 could be placed in the bonding layer 15. The substrate layer 17-2 could be augmented with an over coat layer 102. A related embodiment would be where the reflective layer 14 is replaced by a semi-reflective layer 14-1, and the marking 620 is read through the semi-reflective layer 14-1, as viewed from the read side 2. This embodiment has an advantage of leaving room for a conventional label on the label side 7. In another embodiment, the coating 100 is used to replace the bonding layer 15 of a DVD-9, as shown in FIG. 3. For these embodiments, laser read out is still the major consideration, and formulas C13 and C 14 would be preferred.

Figure 4:
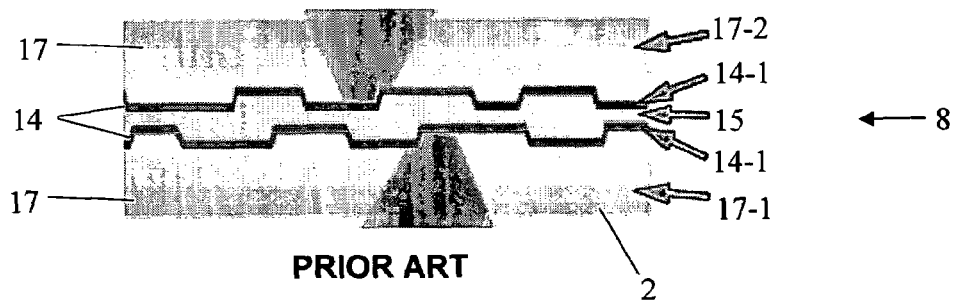

Referring to FIG. 4, it is recognized that such double sided discs 8 cannot be printed except on the hub inside the lead-in area. Labeling is therefore a problem with such discs 8. This can be overcome by use of a semi-transparent reflective layer. The color forming layer 101 is disposed in the bonding layer with imaging done in this layer. One could also image a dual internal label, where color forming layers 101 are used over each of the semi-reflective layers 14, with a third color forming layer 101 used in the bonding layer 15. In a further embodiment, one side is fully reflective so the image may only be seen from one side.

Figure 5:
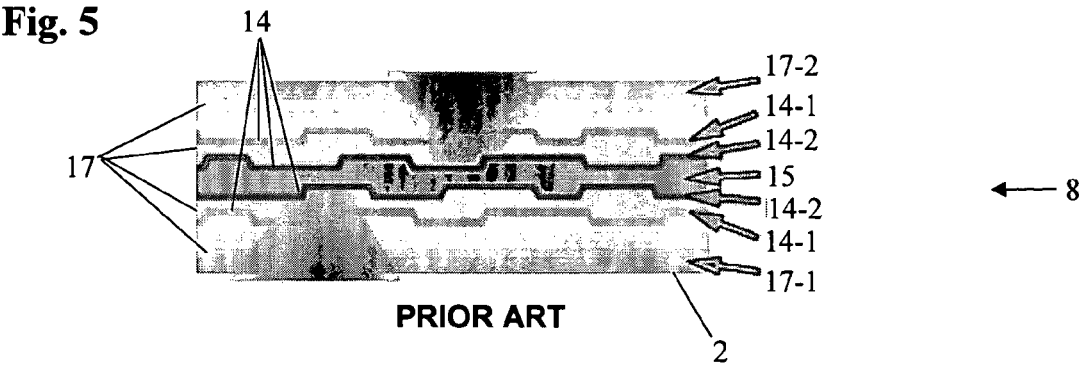
Figure 6:
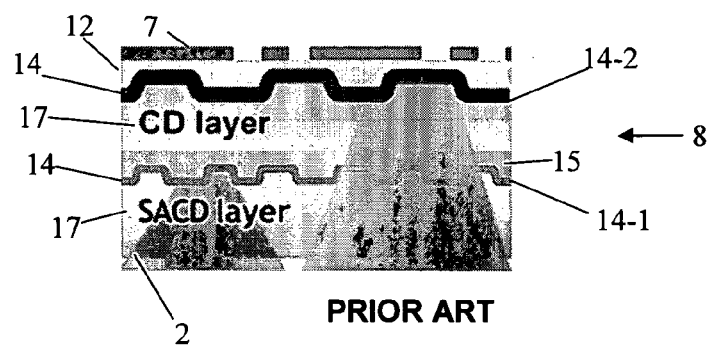
FIG. 6 depicts aspects of a prior art optical media known as a hybrid SACD.
Figure 7:
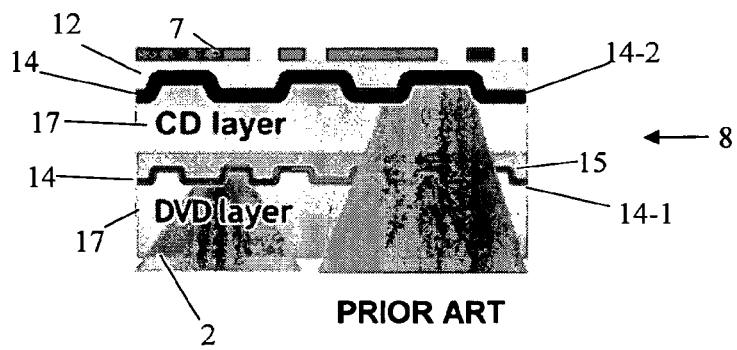
FIG. 7 depicts aspects of a prior art optical media known as a hybrid DVD.
Figure 8:
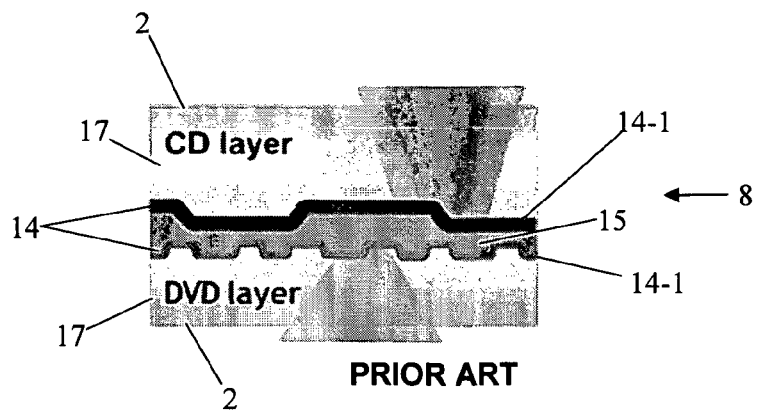
FIG. 8 depicts aspects of a prior art optical media known as a DVD Plus.

Referring to FIG. 5, the coating 100 could be used between the semi-reflective and the reflective layers. Referring to FIGS. 6-8, in preferred embodiments, coatings 100 are used in the bonding (adhesive) layer 15.

In some embodiments, use of a coating 100 in direct contact with a metal or other reflective layer 14 requires use of a protective portion (such as is shown in FIGS. 70-72, where a portion of the target layer in a CD incorporates polycarbonate), or modification to the reflective materials. For example, silver or gold may be used in the reflective layer 14 to protect against degradation by the photoacid. Therefore, it is recognized that in some embodiments, materials compatibility must be considered. As a further example, in DVD-18, the bonding involves use of a cationic resin (which uses a photoacid as an initiator). A UV curable acrylate is used to coat the reflective layer 14 before bonding. In embodiments, such as a DVD-18, where such construction is employed, intermediate steps might be required to provide for a final product 10 that properly exhibits the desired markings 620.

II. Forming a Marking

A. Curing the Coating

Figure 77:
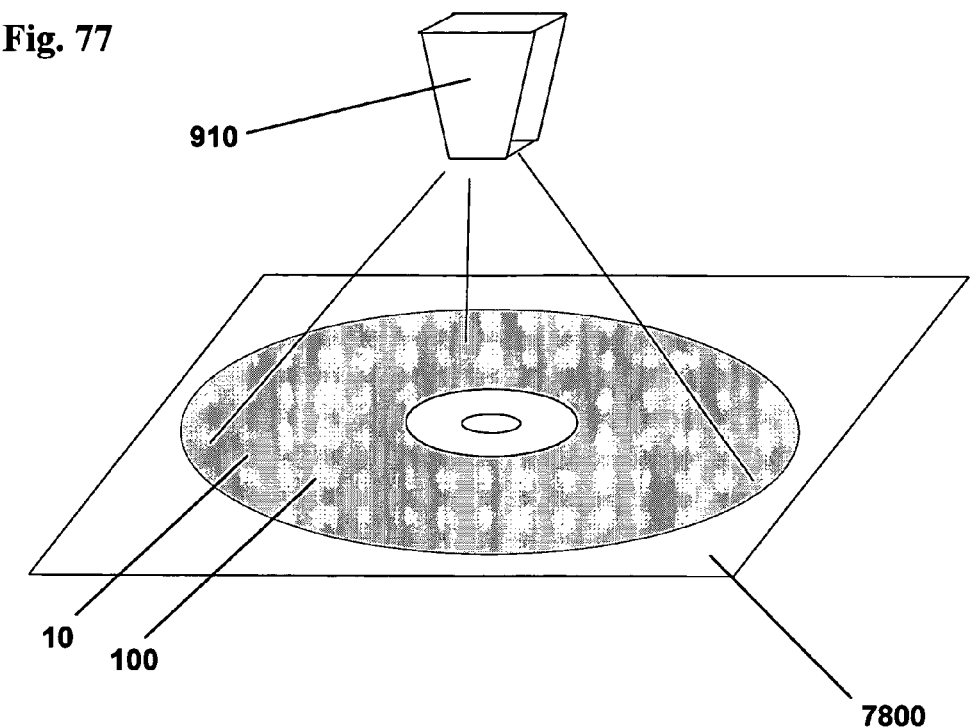
FIG. 77 depicts a system for curing the coating.

Prior to forming a marking in the coating 100, the coating 100 must be appropriately incorporated into the optical media 10. As previously discussed, the coating can be applied using compounding techniques, or other techniques such as spin coating. Where spin coating is used, the coating 100 is preferably cured by use of a first light. FIG. 77 depicts a first light 910 used for curing the coating 100 upon an optical media 10. In this example, the optical media 10 is part of a production line 7800.

B. Equipment for Forming a Marking

Figure 78:
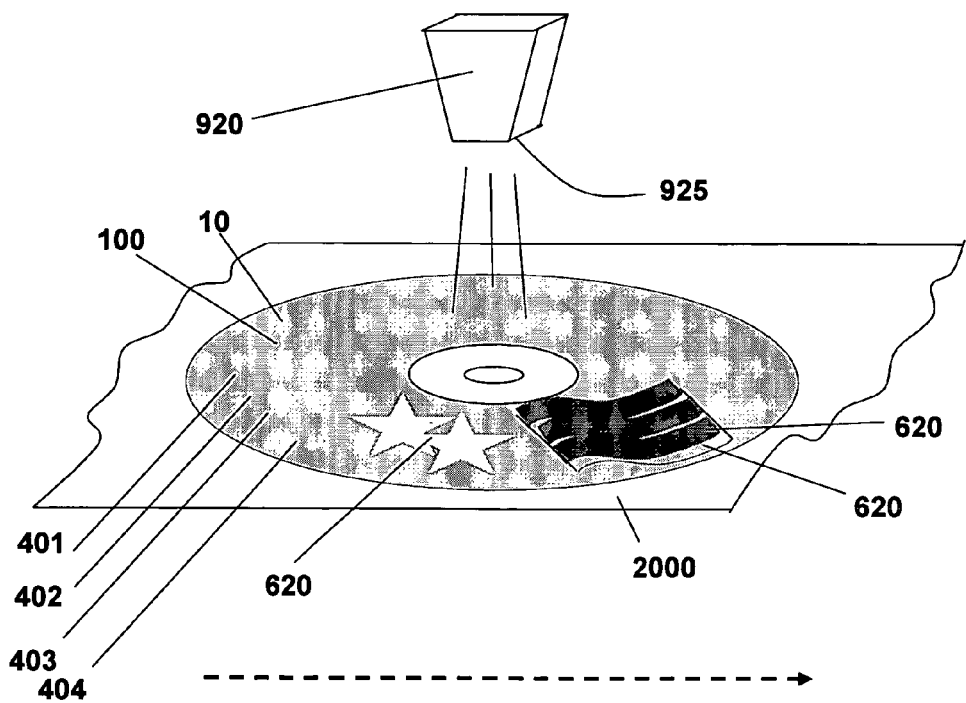
FIG. 78 depicts markings on an optical media formed by illumination with a marking lamp.

FIG. 78 depicts aspects of apparatus for forming a marking in the coating 100. In FIG. 78, the selective irradiation of color forming materials in the coating 100 with a second light 920 is used to record images 620 (markings) into the optical media 10. In the preferred embodiment, wavelengths of UV are used to provide for the second light 920. In this depiction, the optical media 10 is produced in a production line 2000.

Selective irradiation of the optical media 10 may be used to provide for varying degrees of contrast with the unexposed, or lesser exposed, regions of the optical media 10. That is, varying shades within an image 620 may be created. For example, increased UV exposure in one part of the coating 100 will cause greater absorption than exhibited in another part of the coating 100. Shading effects, or any other marking technique, may therefore be achieved using image creating units such as a positive, negative, or electronic photomask, a direct writing laser (a laser galvo system) or through other techniques. A marking 620 be realized as a single marking (e.g. a marking in a single color forming layer 101), of through the collective appearance of a series of markings (e.g., a series of markings in various color forming layers 101). The example provided in FIG. 78, including both types. That is, one marking 620 includes stars of a single color. Another marking 620, includes stripes having two distinct colors.

In the example of FIG. 78, a four layer coating 100 has been applied to the optical media. A first layer 401 provides supports the generation of color for the stars 620, while a second layer 402 and a third layer 403 support generation of colors for the stripes. A fourth layer 404 is applied to stabilize the markings 620 applied to the optical media 10.

One embodiment of a photomask 925, the electronic photomask, makes use of a programmable liquid crystal display, which preferably exhibits a high optical density at wavelengths of about 355 nm. In some embodiments, the electronic photomask is reconfigured between marking routines, thereby providing for unique markings 620 upon each of the optical media 10 in a series.

It should be noted that one convention used herein is that regarding the terms "image" and "marking." Where these terms are used together, image may be taken to mean a production of the marking, where the marking 620 is the manifestation (i.e., record) of the image within the coating 100. It should be recognized that the two terms are closely related, and may be considered interchangeable as appropriate.

C. Types of Markings

The marking 620 may convey any desired information, in any desired format. For example, the marking 620 may present content that includes identification information (such as a serial number), authentication information, and/or instructional information. The content may also include advertising, branding, or promotional information, referred to collectively herein as "promotional information." The content may include a decryption key for decryption of data stored in the optical media 10. Further embodiments may involve other arrangements of encryption information. The information included in the marking 620 may include, but is not limited to, any of the foregoing types of information, or combinations. For convenience, the term "content" as used herein refers to content of the marking 620. The content may be presented, in non-limiting examples, as an image, alphanumeric characters, and other symbols, graphics, and combinations of images and symbols. The content may be presented as a data code symbology (such as a bar code), and may present at least one digital watermark.

The marking 620 may appear at wavelengths above or below the band of visible wavelengths. For example, the marking 620 may be invisible to an unaided human observer.

In some embodiments, the marking 620 is self-destructing. For example, the marking 620 disappears when introduced to ambient environmental conditions, such as ambient lighting. Use of a marking 620 that is self-destructing may be particularly useful for some applications, such as in some embodiments of authentication schemes.

An example of a technique for varying the contrast in a transferred image includes engaging techniques used in gray-scale printing. That is, using a collection of properly sized colored shapes or patterns, on uncolored background, or alternatively, uncolored shapes or patterns on fully colored background. Regulating the size and density of the shapes or patterns provides for control over the visual perception of color intensity in any specific region of the marking.

In one embodiment, the marking 620 begins to degrade, and may ultimately disappear, blend, or become substantially distorted, after the passage of "an initiating event." For example, the marking 620 may begin to degrade and ultimately disappear after the optical media is introduced to ambient conditions, such as ambient light. Such embodiments may be used advantageously with other techniques, such as in conjunction with limited play optical media (e.g., optical media that self destruct once exposed to ambient conditions). As one example, an optical media 10 may include a symbol 620 indicative of readability. Examples of limited play optical media are disclosed in U.S. Pat. No. 6,434,109 "Machine-Readable Optical Disc with Reading-Inhibit Agent" issued Aug. 13, 2002 to Rollhaus et al.

As noted elsewhere herein, the marking 620 is transmissive, or substantially transmissive at wavelengths of interest. For example, the marking 620 is substantially transmissive (substantially non-interfering) at wavelengths for a readout laser for the optical media 10. For example, the marking 620 is substantially non-interfering with wavelengths of about 400 nm, about 440 nm, about 630 nm, about 650 nm and about 780 nm.

III. Coating Inspection

A. Exemplary Inspection Equipment

Once the coating 100 has been applied to the optical media 10, it may be inspected for conformity with desired specifications. Likewise, aspects of the marking 620 are subject to inspection. In some embodiments, inspection is optional or omitted. One example of appropriate equipment includes VERICAM from Spectra Systems, Inc. of Providence, R.I. Another exemplary inspection system is the XIRIS PI-1500, commercially available from Xiris Automation, of Burlington Ontario, Canada. Another system for analyzing the quality of the optical media 10 is the CATS SA3 System, available from AudioDev USA of Woodland Hills, Calif. This system tests the readability and playability of optical media by measuring numerous signals and parameters. The levels of these parameters can then be analyzed to draw conclusions about the stability of the disc manufacturing process and possible playability issues.

B. Coating Parameters and Radial Noise Study

A study was conducted to evaluate performance of the coated optical media 10. Disks 10 were coated on a HEADWAY PWM32-PS-R790 Spinner System with the HDP98 Fluid Dispenser and MA24WEA dispensing arm. Formulation 3 (9021) was used (see Table 14). Varying spin speeds and various coating parameters were employed to examine the effect of spin coating parameters on electrical specification of the disks 10. Programs using more than one, or incrementing spin speeds were tested. Preferred coating parameters were determined to use a single spin at 4K rpm for 10 seconds. The spin coating program used for the HEADWAY system is presented in Table 31.

TABLE 31

Headway System Program for Final Testing

| STEP | PURPOSE | SPEED (RPM) | RAMP (RPM/SEC) | F 6 (24 V) | ARM DIRECTION | SPEED (%) | TIME (SEC) |
|---|---|---|---|---|---|---|---|
| 1 | Start Program | 90 | 1000 | N | POS | 40 | 3 |
| 2 | Dispense lacquer | 90 | 1000 | Y' = ON | NONE |  | 3.5 |
| 3 | Spin for thickness | 4000 | 2000 | N | HOME | 40 | 10 |
| 4 | Terminate | 0 | 2000 | N | HOME |  | 0.5 |

Increasing dispense time to maintain a 2.0 ml dispense volume (viscosity dependant) required a decrease in spin speed (rpm) used in steps 1 and 2. Dispense volume on the HEADWAY Spin Coating systems is a function of dispense time and dispense pressure. Therefore, dispense time was set to 3.5 seconds with a constant pressure of 50 psi which resulted in a dispense volume of 1.9-2.0 ml. This amount of lacquer provided the desired coating 100.

Figure 79:
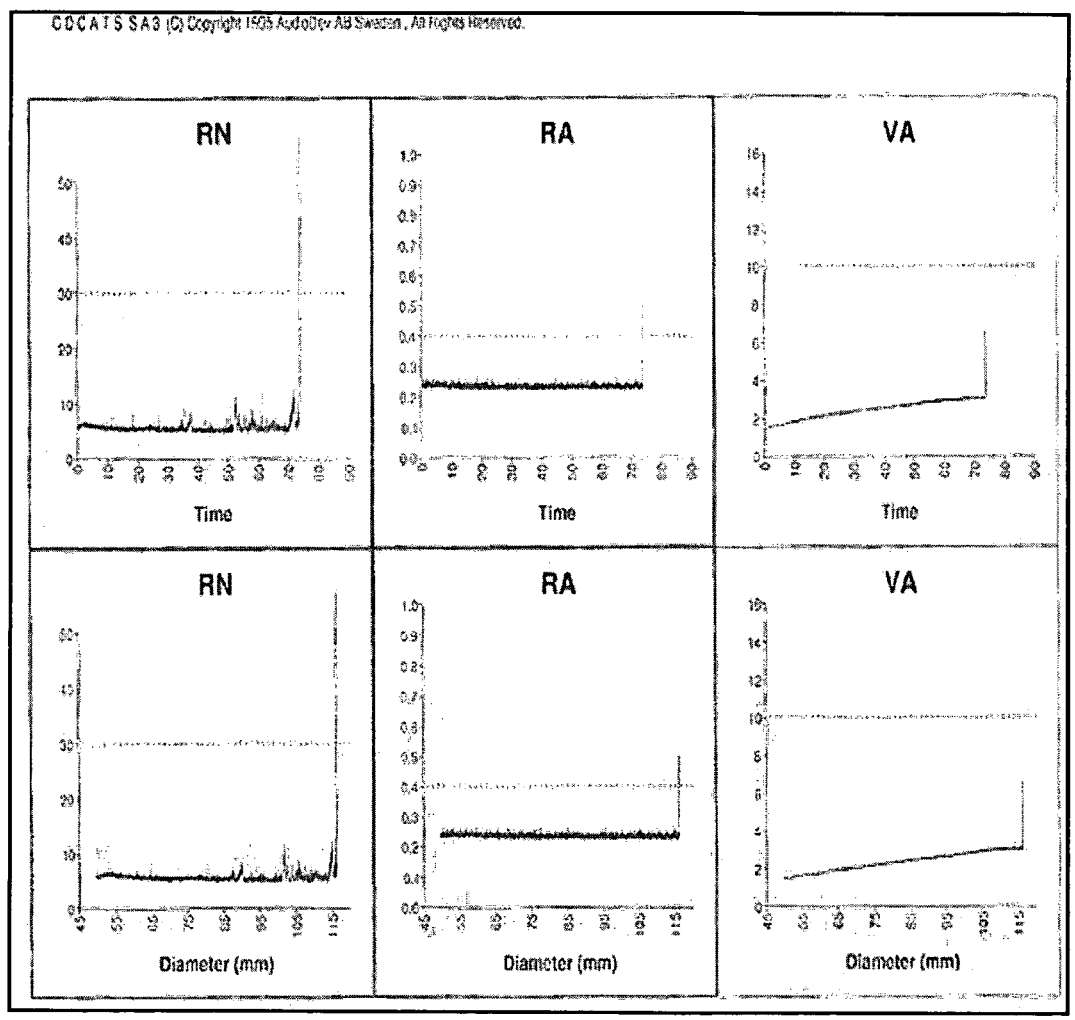
FIG. 79 depicts test data for an uncoated disk.
Figure 80:
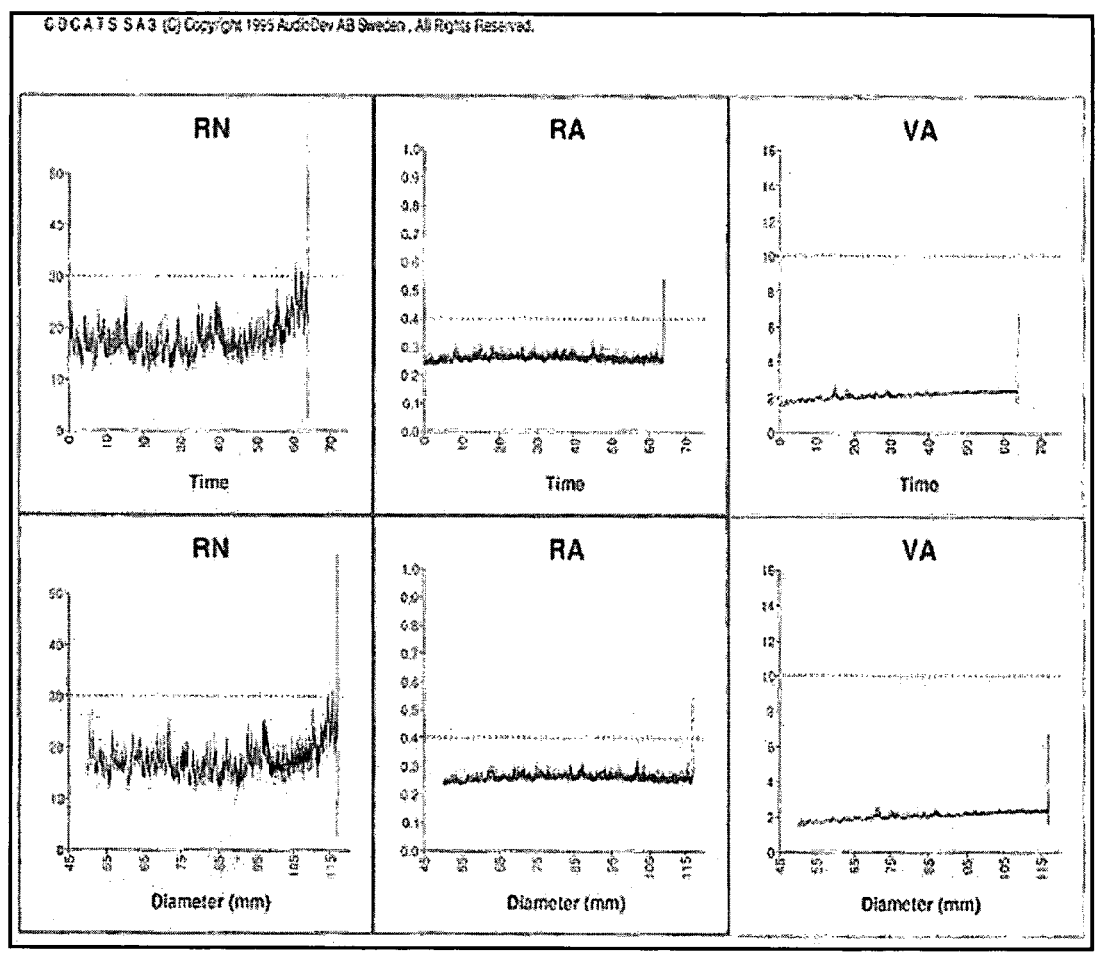
FIG. 80 depicts test data for a coated disk.
Figure 81:
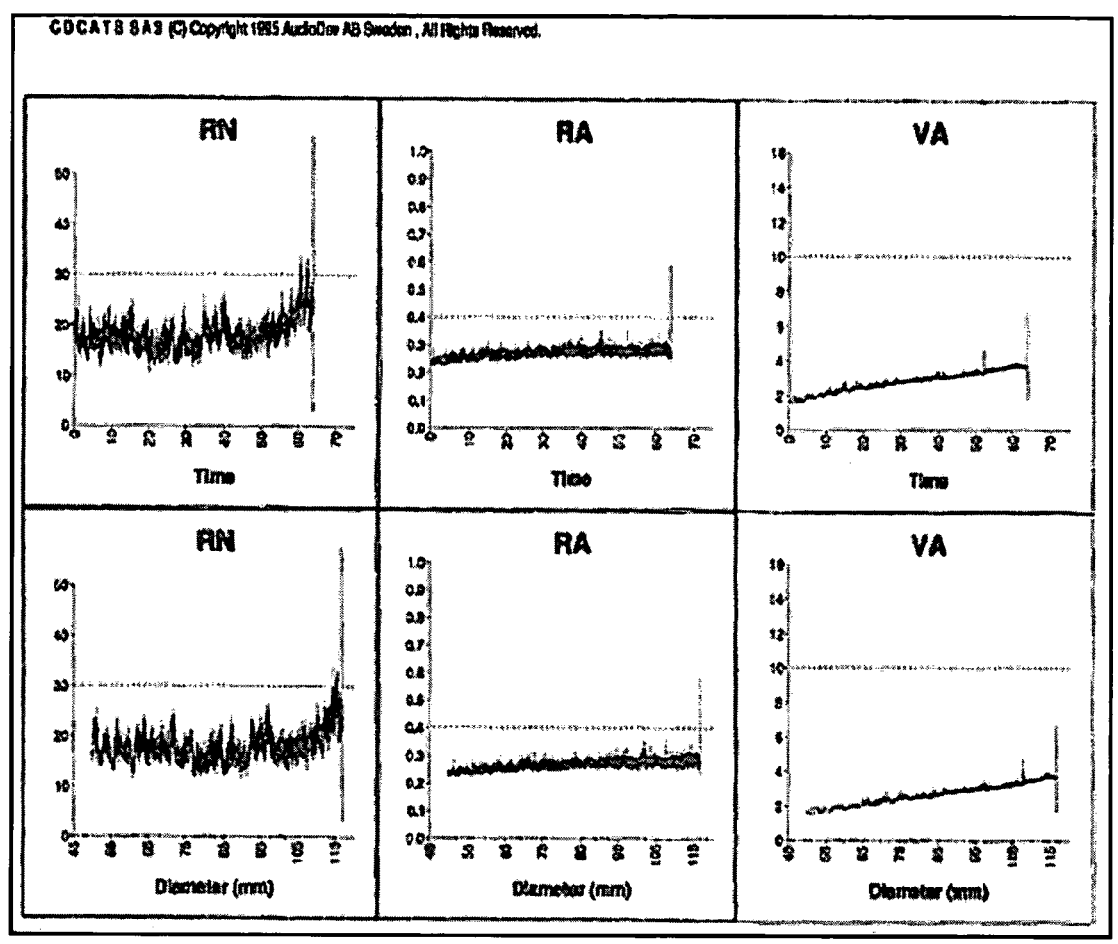
FIG. 81 depicts test data for a coated disk with at least one image recorded thereon.
Figure 82:
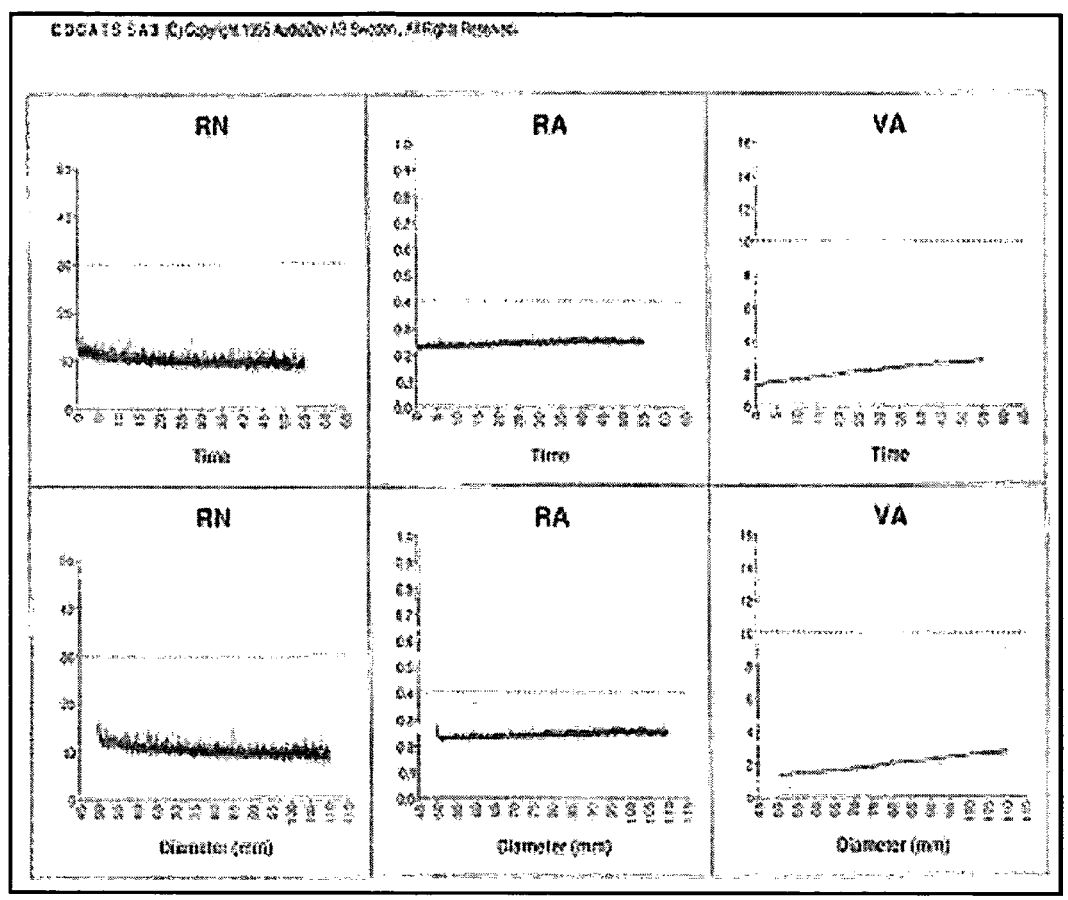
FIG. 82 depicts test data for an optical media produced in a production system; and, FIG. 83 depicts spectra of various formulations applied to the label side of an optical media.

In order to examine the effect of the imaging process on performance parameters, a single disk 10 was coated, cured and then tested on the CATS system. The same disk 10 was then imaged and tested on the CATS system a second time. There differences in the CATS test results were insubstantial. Data produced by the CATS system are included in FIG. 79, wherein data from an uncoated disk 10 is shown. Note the large spikes at the end of each test are due to data ending, which is not an inherent error in the disc 10 or the coating 100. FIG. 80 provides data for a coated disk 10 that had been cured, and had not been imaged. FIG. 81 provides data for a coated disk 10 that had been cured, and had been imaged. FIG. 82 depicts testing results from the CATS SA3 system for a disk 10 coated on the Singulus SKYLINE DUPLEX machine.

Analysis showed that preferred coatings were obtained using a single spin and speed. The coating parameters used for the Singulus SKYLINE DUPLEX machine are given in Table 32. These settings can be applied to the application of either coating 101, 102, with coating 100 thickness controlled by lacquer viscosity or application temperature.

TABLE 32

Singulus Set Points for Disc Production
Set Points 1

|  | Min | Max |
|---|---|---|
| Temperature | 20.00 | 40.00 |
| Lacquer Radius | 24.00 | 24.00 |
| Dosing Amount | 1.20 | 1.20 |
| Dosing Time | 0.50 | 0.50 |
| Time | 0.75 | 0.75 |
| Speed | 120 | 120 |
| Ramp Time | 0.45 | 0.3 |
| Time | 0.90 | 0.90 |
| Speed | 4500 | 4000 |
| Ramp Down Time | 0.25 | 0.25 |

D. Singulus SKYLINE DUPLEX and Lamp Curing

A study was completed to examine curing of coatings in the Singulus SKYLINE DUPLEX machine. In this study, the SKYLINE DUPLEX machine was loaded with the formulation Overcoat O1 and various lamps were tested for top and edge curing. A XENON C Bulb was used, and set at an exposure power of 1.0 kW. Exposed disks 10 were completely top and edge cured in 2.0 seconds. Time intervals of 1.0 seconds and 1.5 seconds were also evaluated, and did not cure the disks 10 sufficiently. The reflector plate on the paddle of the machine was blacked out using a felt-tip marker. Disks 10 were again evaluated, in otherwise same conditions with no apparent difference. The disks 10 cured along the top and the edge completely.

Use of an F-Bulb with metallized reflectors was also evaluated. Controls for the F-Bulb were set to the maximum exposure power of 5.0 kW and the maximum exposure time of 5.0 seconds. The exposed disks 10 did not top or edge cure. Next, a V-Bulb (gallium iodide) with metallized reflectors was evaluated. Controls for the V-Bulb were set to the maximum exposure power of 5.0 kW and the maximum exposure time of 5.0 seconds. The disks 10 did not cure along the top or the edge sufficiently.

Variations on the formulation for overcoat O1 were evaluated. In these tests, the overcoat O1 formulation was made substituting a percentage of photoinitiator KTO/46 with Irgacure 819. Four formulations were made, as shown in Table 33.

TABLE 33

Variations on Photoinitiator Combinations in Overcoat O1

| Form. No. | Photoinitiator Combination |
|---|---|
| 1 | 5% KTO/46 and 3% Irgacure 819 |
| 2 | 3% KTO/46 and 5% Irgacure 819 |
| 3 | 2% KTO/46 and 6% Irgacure 819 |
| 4 | 1% KTO/46 and 7% Irgacure 819 |

The formulations of Table 33 were manually coated onto disks 10 using the HEADWAY spin coating machine. These were tested for curing at various time intervals on the SKYLINE DUPLEX machine using the V-Bulb (gallium iodide). Results are as provided in Table 34 ("NG" represents "no good"). All disks were completely edge cured, with the reflector remaining blackened.

TABLE 34

Curing Times for Overcoat O1 Variations

|  | Curing V-Bulb (gallium iodide) | | | | |
|---|---|---|---|---|---|
| Over-1 photo-Formulation | 1 sec | 2 sec | 3 sec | 4 sec | 5 sec |
| 5% KTO/3% 819 |  | NG |  |  | OK |
| 3% KTO/5% 819 |  |  | NG | good | excellent |

TABLE 34-continued

Curing Times for Overcoat O1 Variations

| Over-1 photo-Formulation | Curing V-Bulb (gallium iodide) | | | | |
|---|---|---|---|---|---|
| | 1 sec | 2 sec | 3 sec | 4 sec | 5 sec |
| 2% KTO/6% 819 | NG | Ok | excellent | | |
| 1% KTO/7% 819 | NG | good | excellent | | |

Table 35 and Table 36 disclose preferred embodiments of the overcoat layer 102, and the color forming layer 101, respectively. These preferred embodiments have been selected to best address various goals, such as the support of high throughput manufacturing. These are not limiting of the invention.

TABLE 35

Preferred Embodiment for Overcoat Layer

| OVERCOAT FORMULATION 14 | Wt % |
|---|---|
| COMPONENTS | |
| TEGO RAD 2200 N | 1 |
| KTO/46 | 8 |
| SR-339 | 26 |
| SR-368D | 20 |
| CN-120M50 | 45 |
| TOTAL PIGMENTS | 100 |
| UV-24 | 10 |

TABLE 36

Preferred Embodiment for Color Forming Layer

| COLOR FORMING LAYER FORMULATION C15 | Wt % |
|---|---|
| BYK-333 | 0.3 |
| KTO/46 | 10 |
| SR-238 | 10 |
| SR-285 | 15 |
| SR-494 | 32.35 |
| SR-9021 | 32.35 |
| TOTAL PIGMENTS | 100 |
| TPST | 3 |
| Pergascript Red 6B | 3 |

V. Further Embodiments

A. Direct Incorporation of a Formulation in a Target Layer

In a further embodiment, a mixture was produced which included a formulation incorporated into materials used for construction of a substrate 17-1. An exemplary embodiment depicting use of the mixture is depicted in FIG. 10E. In this example, 10 grams of bisphenol A polycarbonate (produced by Aldrich Chemical, with a molecular weight of about 64,000) was dissolved in 200 grams of dichloromethane. 300 mg of triphenyl sulfonium triflate (Aldrich Chemical Corp. of St. Louis, Mo.) and 300 mg of PERGASCRIPT Red 6B were added to this mixture to form a clear and homogeneous solution. The solution was then cast onto a polycarbonate slide and dried under a stream of hot air for about 1 minute. The resulting film was clear and colorless, indicating a homogenous solid film. The film developed intense red color upon exposure to a Xenon RC747C (operating at about 1.5 kW/m$^2$, and producing wavelengths in the range of about 270 nm to about 400 nm). Unexposed regions of the film remained clear and colorless.

It was found that TPST (or similar derivative such as t-butylphenyldiphenyl sulfonium triflate) and PERGASCRIPT (or another color former(s)) may be incorporated directly into base materials, such as polycarbonate material typically used to construct an optical media 8 via the melt. This was accomplished by standard polymer compounding techniques (a non-limiting example being extrusion) to form a polycarbonate and photoacid generator/color former blend suitable for injection molding for discs. Such techniques may be referred to as "direct compounding" or "compounding" techniques. Compounding techniques, when used in combination with other aspects of the teachings herein, such as the use of an over coat layer 102, and with certain formulations disclosed herein, provide for effective incorporation of a coating 100 and markings 620 into a target layer. It is noted that other techniques are known for the forming of a photosensitive polycarbonate. However, such prior art techniques do not incorporate such aspects as disclosed, and are therefore not suited for effective incorporation of a coating 100 and markings 620 into a target layer of an optical media 10.

The direct incorporation of a formulation into a target layer by compounding is also taken to mean the incorporation of a coating 100 in the context provided for herein. More specifically, as discussed above, it is recognized that a target layer may be augmented or replaced by a coating 100. As such, the use of compounding techniques is but one non-limiting technique for application of a coating 100 in accordance with the teachings herein A variety of materials may be used for construction of a substrate 17-1. These materials are referred herein to as "disc molding materials." Non-limiting examples of disc molding materials include PLEXIGLAS VOD-100 produced by Elf Atochem of North America Inc., Philadelphia, Pa.; a similar material is ACRYLITE DQ501 from CYRO Industries, Rockaway, N.J.; Polycyclohexylethylene (PCHE), from Dow Plastics, Midland, Mich.; LEXAN products from General Electric of Pittsfield, Mass., including OQ1040L, OQ1050 and OQ1030L; all of which are in addition to many other products.

It can thus be appreciated that while the invention has been particularly shown and described with respect to preferred embodiments thereof, it will be understood by those skilled in the art that changes in form and details may be made therein without departing from the scope and spirit of the invention. For example, many variations may be undertaken in development of compositions for a coating, methods and apparatus for the application of the coating, the curing, the marking, and the quality control of the marking. It is considered that the techniques for the development of the overcoat and the color forming layers, as described herein, lend themselves to producing many other formulations suited for practice of this invention. Therefore, while the invention has generally been described in terms of the embodiments described herein, and variations thereof, this disclosure encompasses those embodiments and others not disclosed or only suggested herein.

What is claimed is:

1. A method for producing an optical disc, comprising:
selecting a formulation comprising a photocurable base material cured by exposure to ultraviolet (UV) light corresponding to a first set of wavelengths, at least one set of photoacid generators (PAGS) responsive to ultraviolet (UV) marking light corresponding to a second set of wavelengths substantially distinct from the first set of wavelengths, and a material that changes that changes its light absorption characteristics in response to a change of pH to form at least one marking is adapted for forming at least one marking upon exposure to a source of marking light, wherein the marking light is ultraviolet light corresponding to the second set of wavelengths, wherein the first layer is comprised of hexanediol diacrylate; triphenylsulfonium triflate and a color former;

applying the formulation in at least a portion of a first layer of the optical media;

curing the first layer;

forming the at least one marking by exposure to marking light having wavelengths in the second set of wavelengths; wherein the marking, when formed, appears in at least a readout area of the optical media and is substantially non-interfering with a readout light for the optical media, wherein said formulation is sensitive to only ultraviolet (UV) light, wherein the optical media is capable of storing data;

applying a second layer onto the first layer, wherein the second layer is comprised of a crosslinkable silicone polyether acrylate; tris (2-hydroxy ethyl) isocyanurate triacrylate; and a difunctional bisphenol A based epoxy acrylate; and curing the second layer.

2. The method as in claim 1, wherein the marking is substantially non-interfering with wavelengths of about 400 nm, about 440 nm, about 630 nm, about 650 nm and about 780 nm.

3. The method as in claim 1, wherein applying comprises spincoating the formulation.

4. The method as in claim 1, wherein applying the formulation comprises injection molding.

5. The method as in claim 1, further comprising forming an image by exposing the at least a portion of the first layer to patterned marking light.

6. The method as in claim 5, wherein exposing comprises one of using a photomask and a direct writing laser.

7. The method as in claim 1, the second set of wavelengths comprising wavelengths below about 320 nm, the second set of wavelengths being substantially distinct from the first set of wavelengths.

8. An optical media, comprising:

a first layer comprising hexanediol diacrylate; triphenylsulfonium triflate and a color former, the first layer being cured by ultraviolet light ultraviolet light corresponding to a first set of wavelengths, the first layer capable of forming a marking upon exposure to ultraviolet light corresponding to a second set of wavelengths, wherein the second set of wavelengths is substantially distinct from the first set of wavelengths; and a second layer comprising a crosslinkable silicone polyether acrylate; tris (2-hydroxy ethyl) isocyanurate triacrylate; and a difunctional bisphenol A based epoxy acrylate, the second layer being cured by ultraviolet light, wherein the marking, when formed, is apparent within a readout area of the optical media, the optical media is an optical data storage media, and the marking is substantially non-interfering with a readout light for reading stored data from a data readout area of the optical media.

9. An optical media as in claim 8, wherein the optical media is an optical data storage media, the marking being created by one of a uniform exposure and a patterned exposure by the second set of wavelengths.

10. The optical media as in claim 1, wherein the first layer comprises at least one of: a stable liquid mixture of trimethylbenzoyldiphenylphosphine oxide, α-hydroxyketones, and benzophenone derivatives; Bis(2,4,6-trimethylbenzoyl)-phenylphosphineoxide; an eutectic liquid mixture of: 2,4,6 trimethylbenzophenone and 4 methylbenzophenone; and a mixture of about 50% 2,4,6-trimethylbenzoyl-diphenylphosphine oxide and about 50% 2-Hydroxy-2-methyl-1-phenyl-propan-1-one.

11. The optical media as in claim 1, wherein the optical data storage media is a compact disc (CD).

12. The optical media as in claim 1, wherein the optical data storage media is a digital versatile disc (DVD).

13. The optical media as in claim 1, the first layer further comprising tris (2-hydroxy ethyl) isocyanurate triacrylate.

14. The optical media as in claim 13, wherein the readout light and marking light correspond to non-overlapping bands of ultraviolet light.

15. The optical media as in claim 8, wherein the first set of wavelengths comprises wavelengths above about 370 nm.

16. The optical media as in claim 8, wherein the second set of wavelengths comprises wavelengths in the range of between about 270 nm and about 320 nm.

17. The optical media as in claim 8, wherein the first layer comprises at least one of: 1,6 hexanediol diacrylate; tetrahydrofuifuryl acrylate; tris (2-hydroxy ethyl) isocyanurate triacrylate; a difunctional bisphenol A based epoxy acrylate; tris (2-hydroxy ethyl) isocyanurate triacrylate; 2-phenoxyethyl acrylate; a difunctional bisphenol A based epoxy acrylate blended with about 40% 1,6 hexanediol diacrylate; and a difunctional bisphenol A based epoxy acrylate blended with about 50%, 2-phenoxyethyl acrylate.

18. The optical media as in claim 8, wherein the first layer comprises a wetting agent.

19. The optical media as in claim 18, wherein the wetting agent comprises at least one of a polyether modified poly-dimethyl-siloxane; a crosslinkable silicone polyether acrylate; and a crosslinkable silicone acrylate.

20. The optical media as in claim 18, wherein a formulation of the coating comprises the wetting agent in a range of between about 0.3 weight percent and about 1 weight percent.

21. The optical media as in claim 8, wherein the triphenylsulfonium triflate is in a range of between about 1.5 weight percent to about 9 weight percent of the first layer.

22. The optical media as in claim 8, wherein the first layer comprises polyether modified poly-dimethyl-siloxane; a stable liquid mixture of trimethylbenzoyldiphenylphosphine oxide, α-hydroxyketones, and benzophenone derivatives; 1,6 hexanediol diacrylate; tetrahydrofurfuryl acrylate; ethoxylated (4) pentaerythritol tetraacrylate; and a highly propoxylated (5.5) glyceryl triacrylate.

23. The optical media as in claim 8, wherein said first layer comprises at least one of the following UV photoabsorptive materials: 2-(2H-benzotriazol-2-yl )-6-dodecyl -4-methylphenol and 2,2'-dihydroxy-4-methoxybenzophenone.

24. The optical media as in claim 8, wherein the marking is exhibited in the collective appearance of a plurality of layers.

25. The optical media as in claim 24, wherein at least two of the plurality of layers have different colors.

26. The optical media as in claim 8, wherein the marking degrades over time.

27. The optical media as in claim 24, wherein at least two of the plurality of layers are adapted to have different markings.

28. The optical media as in claim 8, wherein the marking comprises at least one of an image, an alphanumeric character, a symbol, a graphic, a datacode symbology and a digital watermark.

29. The optical media as in claim 8, wherein the first layer comprises a substrate layer.

30. The optical media as in claim 8, wherein the first layer comprises a bonding layer.

31. The optical media as in claim 8, wherein the first layer comprises a protective layer.

32. The optical media as in claim 8, wherein the marking comprises a grayscale marking.

33. The optical media as in claim 8, wherein the marking comprises a single color marking.

34. The optical media as in claim 8, wherein the marking comprises a multi-color marking.

35. The optical media as in claim 8, further comprising a third layer formed over the second layer, wherein the third layer is capable of forming a marking that is apparent in at least the readout area of the optical media and is substantially non-interfering with a readout light for the optical media, the third layer comprising a formulation sensitive only to ultraviolet (UV) light.

36. The optical media as in claim 35, wherein a frequency of the ultraviolet light said formulation of said third layer is sensitive to is different from a frequency of the ultraviolet light said formulation of said first layer is sensitive to.

37. The optical media as in claim 35, wherein a frequency of the ultraviolet light said formulation of said third layer is sensitive to is equal to a frequency of the ultraviolet light said formulation of said first layer is sensitive to.

38. The optical media as in claim 8, wherein the first layer is a substrate layer, the optical media comprising in the following order:
   a protective layer;
   a metallized layer; and
   the substrate layer.

39. The optical media as in claim 8, wherein the first layer further comprises tetrahydrofurfuryl acrylate.

40. The optical media as in claim 8, wherein the second layer further comprises 2,2'-dihydroxy-4-methoxybenzophenone.

41. An optical media as in claim 8, wherein the optical media is a compact disc (CD).

42. An optical media as in claim 8, wherein the optical media is a digital versatile disc (DVD).

43. The optical media as in claim 8, wherein the first layer has the marking formed in it after exposure to ultraviolet light.

44. An optical media as in claim 8, wherein a wavelength of the readout light is one of the group consisting of 408 nm, 440 nm, 630 nm, 650 nm, and 780 nm.

45. The optical media as in claim 8, wherein the curing light for the first and second layers has a wavelength above about 370 nm.

46. The optical media as in claim 45, wherein the marking light for the first layer has a wavelength below 320 nm.

47. The optical media as in claim 8, wherein the change in light absorption characteristics results in the marking.

48. The optical media as in claim 47, wherein the marking is machine-readable.

\* \* \* \* \*